United States Patent
Kambhatla et al.

(10) Patent No.: US 11,258,631 B2
(45) Date of Patent: *Feb. 22, 2022

(54) STREAMING ON DIVERSE TRANSPORTS

(71) Applicant: INTEL CORPORATION, Santa Clara, CA (US)

(72) Inventors: Srikanth Kambhatla, Portland, OR (US); Nausheen Ansari, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/993,620

(22) Filed: Aug. 14, 2020

(65) Prior Publication Data

US 2021/0176089 A1 Jun. 10, 2021

Related U.S. Application Data

(63) Continuation of application No. 16/175,287, filed on Oct. 30, 2018, now Pat. No. 10,791,003.

(60) Provisional application No. 62/579,107, filed on Oct. 30, 2017.

(51) Int. Cl.
*H04L 12/40* (2006.01)
*H04L 12/64* (2006.01)
*H04N 21/242* (2011.01)
*H04N 21/434* (2011.01)
(Continued)

(52) U.S. Cl.
CPC .. *H04L 12/40058* (2013.01); *H04L 12/40065* (2013.01); *H04L 12/40071* (2013.01); *H04L 12/40117* (2013.01); *H04L 12/40123* (2013.01); *H04L 12/6418* (2013.01); *H04N 21/236* (2013.01); *H04N 21/2343* (2013.01);
(Continued)

(58) Field of Classification Search
CPC ......... H04L 12/40058; H04L 12/40065; H04L 12/40071; H04L 12/40123; H04L 12/6418; H04L 12/40117; H04L 21/242; H04L 21/434; H04L 21/2343; H04L 21/236; H04L 2012/6483; H04N 21/242; H04N 21/434; H04N 21/2343; H04N 21/236; H04N 2012/6483
See application file for complete search history.

(56) References Cited

U.S. PATENT DOCUMENTS

| 6,253,245 | B1 | 6/2001 | Helbig |
| 9,197,393 | B2 | 11/2015 | Chen et al. |
| 9,524,681 | B2 | 12/2016 | Vasquez et al. |

(Continued)

OTHER PUBLICATIONS

United States Patent and Trademark Office, "Non-Final Office Action," dated Apr. 4, 2019 in connection with U.S. Appl. No. 16/175,287, 7 pages.

(Continued)

*Primary Examiner* — Nimesh G Patel
(74) *Attorney, Agent, or Firm* — Hanley, Flight & Zimmerman, LLC

(57) ABSTRACT

In some examples, a transport agnostic source includes a streaming device to stream video on diverse transport topologies including isochronous and non-isochronous transports. In some examples, a transport agnostic sink includes a receiving device to receive streamed video from diverse transport topologies including isochronous and non-isochronous transports.

35 Claims, 44 Drawing Sheets

(51) Int. Cl.
*H04N 21/2343* (2011.01)
*H04N 21/236* (2011.01)

(52) U.S. Cl.
CPC ......... *H04N 21/242* (2013.01); *H04N 21/434* (2013.01); *H04L 2012/6483* (2013.01)

(56) References Cited

U.S. PATENT DOCUMENTS

| | | |
|---|---|---|
| 10,791,003 B2 | 9/2020 | Kambhatla et al. |
| 2004/0218625 A1 | 11/2004 | Kobayashi |
| 2008/0092178 A1 | 4/2008 | McNamara et al. |
| 2009/0091656 A1 | 4/2009 | Kitaru et al. |
| 2011/0107379 A1 | 5/2011 | Lajoie et al. |
| 2012/0281704 A1 | 11/2012 | Butterworth et al. |
| 2013/0174208 A1 | 7/2013 | Lee et al. |
| 2014/0372624 A1 | 12/2014 | Wang et al. |
| 2015/0181272 A1* | 6/2015 | Lu ................... H04N 21/4104 725/61 |
| 2015/0373075 A1 | 12/2015 | Perlman et al. |
| 2017/0012798 A1 | 1/2017 | Teramoto |
| 2017/0064389 A1 | 3/2017 | Teramoto |
| 2017/0070701 A1 | 3/2017 | Nakajima |
| 2018/0183899 A1 | 6/2018 | Ansari et al. |
| 2018/0288106 A1 | 10/2018 | Ranade et al. |
| 2019/0020700 A1 | 1/2019 | Derudder et al. |
| 2019/0312915 A1 | 10/2019 | LaJoie et al. |

OTHER PUBLICATIONS

United States Patent and Trademark Office, "Final Office Action," dated Oct. 22, 2019 in connection with U.S. Appl. No. 16/175,287, 9 pages.

United States Patent and Trademark Office, "Notice of Allowance," dated Apr. 17, 2020 in connection with U.S. Appl. No. 16/175,287, 5 pages.

* cited by examiner

400

800

900

1200

1600

1700

1800

1900

2000

2300

Table 1

| OFFSET | FIELD | SIZE | VALUE | DESCRIPTION | |
|---|---|---|---|---|---|
| 0 | bMessageType | 1 | NUMBER | IDENTIFIES THE MESSAGE TYPE | |
| | | | | VALVE | MEANING |
| | | | | 0 | RESERVED |
| | | | | 0X01 | COMMAND MESSAGE |
| | | | | 0X02 | NOTIFICATION MESSAGE |
| | | | | 0X03 | ASYNCHRONOUS REPLY MESSAGE |
| | | | | 0X04-0XFF | RESERVED |
| 1 | bHandle | 1 | NUMBER | IDENTIFIES THE DESTINATION FOR A COMMAND MESSAGE, OR THE ORIGIN FOR NOTIFICATION OR ASYNCHRONOUS REPLY MESSAGE | |
| 2 | bTransactionNumber | 2 | NUMBER | A MEANS TO CREATE ASSOCIATION BETWEEN A REQUEST MESSAGE, AND ITS CORRESPONDING SRM AND ARM | |

FIG. 24A

Table 1 Cont.

| OFFSET | FIELD | SIZE | VALUE | DESCRIPTION |
|---|---|---|---|---|
| 4 | bMessageSubType | 1 | NUMBER | IDENTIFIES THE SUB-TYPE OF A COMMAND MESSAGE OR A NOTIFICATION MESSAGE. ARM REPLICATES THE bMessageSubType FIELD FROM ITS CORRESPONDING COMMAND MESSAGE. <table><tr><th>VALUE</th><th>NOTIFICATION MESSAGE</th></tr><tr><td>0X00</td><td>RESERVED</td></tr><tr><td>0X01</td><td>INDICATE HOT PLUG</td></tr><tr><td>0X02</td><td>INDICATE TAD RX EVENT</td></tr><tr><td>0X03</td><td>INDICATE TSA EVENT</td></tr><tr><td>0X04</td><td>INDICATE MONITOR EVENT</td></tr><tr><td>0X05-0XFF</td><td>RESERVED</td></tr></table> <table><tr><th>VALUE</th><th>NOTIFICATION MESSAGE</th></tr><tr><td>0X00</td><td>RESERVED</td></tr><tr><td>0X01</td><td>GET TRANSPORT CAPABILITIES</td></tr><tr><td>0X02</td><td>GET TAD RX CAPABILITIES</td></tr><tr><td>0X03</td><td>GET STREAM SINK CAPABILITIES</td></tr><tr><td>0X04</td><td>GET TAD RX STATUS</td></tr><tr><td>0X05</td><td>GET TSA STATUS</td></tr><tr><td>0X06</td><td>GET TSA BANDWIDTH</td></tr><tr><td>0X07</td><td>SET TSA BANDWIDTH</td></tr><tr><td>0X08</td><td>GET TAD RX BANDWIDTH</td></tr><tr><td>0X09</td><td>START STREAM</td></tr><tr><td>0X0A</td><td>MANAGE STREAM</td></tr><tr><td>0X0B</td><td>TERMINATE STREAM</td></tr><tr><td>0X0C</td><td>GET STREAM STATUS</td></tr><tr><td>0X0D</td><td>GET ENCRYPTION STATUS</td></tr><tr><td>0X0E</td><td>ADD DESTINATION</td></tr><tr><td>0X0F</td><td>REMOVE DESTINATION</td></tr><tr><td>0X10</td><td>CONFIGURE TAD SINK</td></tr><tr><td>0X11</td><td>RESET TAD SINK</td></tr><tr><td>0X12</td><td>INITIALIZE TSA</td></tr><tr><td>0X13</td><td>SET LOCAL TIME</td></tr><tr><td>0X14</td><td>GET TAD RX DELAY</td></tr><tr><td>0X15</td><td>GET TSA DELAY</td></tr><tr><td>0X16</td><td>TAD TX INSTANTIATED</td></tr><tr><td>0X17</td><td>TAD TX DESTROYED</td></tr><tr><td>0X18-0XFF</td><td>RESERVED</td></tr></table> |
| 5 | wPayloadSize | 2 | NUMBER | NUMBER OF BYTES IN THE CONTROL PAYLOAD |

FIG. 24B

Table 3

| OFFSET | FIELD | SIZE | VALUE | DESCRIPTION | |
|---|---|---|---|---|---|
| 0 | bMessageType | 1 | NUMBER | RESPONDER SETS THIS FIELD TO THE VALUE FROM THE SAME FIELD IN THE HEADER OF THE CORRESPONDING REQUEST MESSAGE | |
| 1 | bHandle | 1 | NUMBER | RESPONDER SETS THIS FIELD TO THE VALUE FROM THE SAME FIELD IN THE HEADER OF THE CORRESPONDING REQUEST MESSAGE | |
| 2 | bTransactionNumber | 1 | NUMBER | RESPONDER SETS THIS FIELD TO THE VALUE FROM THE SAME FIELD IN THE HEADER OF THE CORRESPONDING REQUEST MESSAGE | |
| 3 | bMessageSubType | 1 | NUMBER | RESPONDER SETS THIS FIELD TO THE VALUE FROM THE SAME FIELD IN THE HEADER OF THE CORRESPONDING REQUEST MESSAGE | |
| 4 | bStatus | 1 | NUMBER | CONTAINS THE STATUS OF THIS REQUEST | |
| | | | | VALUE | STATUS |
| | | | | 0X00 | RESERVED |
| | | | | 0X01 | SUCCESSFUL. REQUESTED DATA (IF ANY) IS PRESENT IN THE CONTROL PAYLOAD |
| | | | | 0X02 | ERROR. ADDITIONAL INFORMATION RELATED TO THE ERROR IS PRESENT IN THE CONTROL PAYLOAD |
| | | | | 0X03 | RESPONSE_PENDING. REQUESTED DATA WILL BE SENT IN A SEPARATE ARM |
| | | | | 0X04 – 0XFF | RESERVED |
| 5 | wPayloadSize | 2 | NUMBER | NUMBER OF BYTES IN THE CONTROL PAYLOAD | |

FIG. 25

Table 4

| OFFSET | FIELD | SIZE | VALUE | DESCRIPTION | |
|---|---|---|---|---|---|
| 0 | bSubEvent | 1 | NUMBER | CONVEYS WHAT IS BEING INDICATED | |
| | | | | VALUE | NOTIFICATION MESSAGE |
| | | | | 0X00 | RESERVED |
| | | | | 0X01 | PLUG EVENT |
| | | | | 0X02 | UNPLUG EVENT |
| | | | | 0X03-0XFF | RESERVED |
| 1 | bTadRxHandle | 1 | NUMBER | CONVEYS THE HANDLE VALUE FOR THE TAD RX CORRESPONDING TO THIS STREAM SINK | |

FIG. 26

Table 5

| OFFSET | FIELD | SIZE | VALUE | DESCRIPTION |
|---|---|---|---|---|
| 0 | wTadRxEvents | 2 | BITMAP | INDICATES THE TAD RX EVENTS BEING INDICATED AS PART OF THIS NOTIFICATION MESSAGE <table><tr><th>BIT</th><th>EVENT</th></tr><tr><td>0</td><td>QOS THRESHOLD EXCEEDED</td></tr><tr><td>1</td><td>REQUEST TEST FRAME</td></tr><tr><td>2</td><td>UNSUPPORTED CONFIGURATION. RECEIVED DATA COULD NOT BE PROCESSED BY TAD RX.</td></tr><tr><td>3</td><td>DATA UNDERRUN ERROR THRESHOLD EXCEEDED</td></tr><tr><td>4</td><td>CORRUPTED DISPLAY FRAME BUFFER ERROR. TAD SINK DETECTED AN ERROR IN THE INTEGRITY OF ITS CURRENT FRAME BUFFER.</td></tr><tr><td>5</td><td>BANDWIDTH CHANGE NOTIFICATION</td></tr><tr><td>6-15</td><td>RESERVED</td></tr></table> |
| 2 | dwFramesDropped | 4 | NUMBER | TOTAL NUMBER OF FRAMES DROPPED FROM THE TIME THIS STREAM STARTED. COUNTER WRAPS AROUND AND IS RESET AS PART OF THE START STREAM PROCESSING. THIS FIELD IS VALID ONLY IF wTadRxEvents BITMAP HAS THE QOS THRESHOLD EXCEEDED BIT SET. |
| 6 | dwLateFramesCount | 4 | NUMBER | TOTAL NUMBER OF FRAMES THAT WERE LATE (RECEIVED AFTER THEIR PTS VALUES) FROM THE TIME THIS STREAM STARTED. THIS COUNTER WRAPS AROUND AND IS RESET AS PART OF START STREAM PROCESSING. THIS FIELD IS VALID-ONLY IF wTadRxEvents BITMAP HAS THE QOS THRESHOLD EXCEEDED BIT SET. |
| 10 | dwUnderrunErrorCount | 4 | NUMBER | TOTAL NUMBER OF FRAME UNDERRUN ERRORS FROM THE TIME THIS STREAM STARTED. COUNTER WRAPS AROUND AND IS RESET AS PART OF START STREAM PROCESSING. THIS FIELD IS VALID ONLY WHEN TAD RX IS CONFIGURED TO BE IN IMMEDIATE MODE. |
| 14 | dwBandwidthAvailable | 4 | NUMBER | INDICATES TAD RX/STREAM SINK BANDWIDTH NOW AVAILABLE. THIS FIELD IS VALID ONLY IF wTadRxEvents BITMAP HAS THE BANDWIDTH CHANGE NOTIFICATION BIT SET. |
| 18 | <TEST FRAME DETAILS> | | | THIS FIELD IS VALID ONLY IF wTadRxEvents BITMAP HAS THE REQUEST TEST FRAME BIT SET. |

FIG. 27

Table 6

| OFFSET | FIELD | SIZE | VALUE | DESCRIPTION |
|---|---|---|---|---|
| 0 | wTsaEvents | 2 | BITMAP | INDICATES THE TSA EVENTS BEING INDICATED AS PART OF THIS NOTIFICATION MESSAGE <table><tr><th>BIT</th><th>EVENT</th></tr><tr><td>0</td><td>ERROR THRESHOLD EXCEEDED</td></tr><tr><td>1</td><td>CHANGE IN TRANSPORT LINK CONFIGURATION</td></tr><tr><td>2</td><td>TRANSPORT FAILURE</td></tr><tr><td>3</td><td>DETAILED ERROR REPORT</td></tr><tr><td>4-15</td><td>RESERVED</td></tr></table> |
| 2 | dwTsaErrors | 4 | NUMBER | TOTAL NUMBER OF TSA ERRORS FROM THE TIME THIS SEASON STARTED. COUNTER WRAPS AROUND.<br>THIS FIELD IS VALID ONLY IF wTsaEvents BITMAP HAS THE ERROR THRESHOLD EXCEEDED BIT SET |
| 6 | dwBandwidthAvailable | 4 | NUMBER | INDICATES TSA BANDWIDTH NOW AVAILABLE. BANDWIDTH CHANGE NOTIFICATION IS ONLY AVAILABLE ON TRANSPORTS THAT SUPPORT BANDWIDTH COMMITS.<br><br>THIS FIELD IS VALID ONLY IF wTsaEvents BITMAP HAS THE CHANGE IN TRANSPORT LINK CONFIGURATION BIT SET<br><br>STREAM SOURCE MAY OR MAY NOT BE ALLOWED TO QUERY FOR CURRENT TRANSPORT BANDWIDTH AND LATENCY |
| 10 | wLatency | 2 | NUMBER | INDICATES TSA LATENCY NOW AVAILABLE.<br><br>THIS FIELD IS VALID ONLY IF wTsaEvents BITMAP HAS THE CHANGE IN TRANSPORT LINK CONFIGURATION BIT SET.<br><br>MAY INCLUDE REPRESENTATION FOR LATENCY. |
| 12 | wFrameSequenceNumber | 2 | NUMBER | FRAMEID OF THE VIDEO FRAME THAT COULD NOT BE TRANSMITTED BY THE SOURCE TSA |

FIG. 28

Table 7

| OFFSET | FIELD | SIZE | VALUE | DESCRIPTION | | |
|---|---|---|---|---|---|---|
| 0 | wMonitorEvent | 2 | BITMAP | INDICATES THE MONITOR EVENTS BEING INDICATED AS PART OF THIS NOTIFICATION MESSAGE | | |
| | | | | BIT | EVENT | |
| | | | | 0 | HDCP EVENT | |
| | | | | 1-15 | RESERVED CAN COORDINATE WITH DP AND HDMI SPECS, FOR EXAMPLE | |

FIG. 29

Table 9

| OFFSET | FIELD | SIZE | VALUE | DESCRIPTION | |
|---|---|---|---|---|---|
| 0 | wEncodingFormats | 2 | NUMBER | INDICATES ENCODING FORMATS (DECODERS) SUPPORTED BY THE STREAM SINK | |
| | | | | VALUE | DECODER |
| | | | | 0000H | RAW. IF SUPPORT FOR RAW FORMAT IS MANDATORY, THIS BIT MUST ALWAYS BE SET. |
| | | | | 0001H | DSC |
| | | | | 0002H | H.264 |
| | | | | 0003H | H.265 |
| | | | | 0003H-FFFFH | RESERVED |
| 2 | wRawFormats | 2 | NUMBER | INDICATES RAW FORMATS SUPPORTED BY THE STEAM SINK. | |
| | | | | VALUE | DECODER |
| | | | | 0000H | B8G8R8. SUPPORT FOR THIS FORMAT IS MANDATORY, SO THIS BIT MUST ALWAYS BE SET. |
| | | | | 0001H | RGB 6-BPC (18BPP) |
| | | | | 0002H | RGB 10-BPC (30BPP) |
| | | | | 0003H | RGB 12-BPC (36BPP) |
| | | | | 0003H | RGB 16-BPC (48BPP) |
| | | | | 0003H | 8-BIT PER PIXEL YCBCR 4:2:0 |
| | | | | 0004H | 10-BIT PER PIXEL YCBCR 4:2:0 |
| | | | | 0005H | 12-BIT PER PIXEL YCBCR 4:2:0 |
| | | | | 0006H | 16-BIT PER PIXEL YCBCR 4:2:0 |
| | | | | 0007H | 8-BIT PER PIXEL YCBCR 4:2:2 |
| | | | | 0008H | 10-BIT PER PIXEL YCBCR 4:2:2 |
| | | | | 0009H | 12-BIT PER PIXEL YCBCR 4:2:2 |
| | | | | 000AH | 16-BIT PER PIXEL YCBCR 4:2:2 |
| | | | | 000BH | 8-BIT PER PIXEL YCBCR 4:2:4 |
| | | | | 000CH | 10-BIT PER PIXEL YCBCR 4:2:4 |
| | | | | 000DH | 12-BIT PER PIXEL YCBCR 4:2:4 |
| | | | | 000EH | 16-BIT PER PIXEL YCBCR 4:2:4 |
| | | | | 000FH-FFFFH | RESERVED |

FIG. 30A

Table 9 Cont.

| OFFSET | FIELD | SIZE | VALUE | DESCRIPTION |
|---|---|---|---|---|
| 4 | wBlockCompressionProfiles | 2 | BITMAP | THIS FIELD INDICATES THE PROFILE TYPES FOR H.264 AND H.265 SUPPORTED BY THE STREAM SINK. IT IS VALID ONLY WHEN wEncodingFormats FIELD INDICATES THAT STREAM SINK IS CAPABLE OF DECODING H.264 AND/OR H.265<br><br>THIS FIELD IS ENCODED AS FOLLOWS:<br><br>{table below} |

| BIT | BLOCK COMPRESSION PROFILE |
|---|---|
| 0 | H.264 UNCONSTRAINED BASELINE PROFILE (4:2:0 8-BIT PIXELS) |
| 1 | H.264 CONSTRAINED HIGH PROFILE WITH CABAC (4:2:0 8-BIT PIXELS) |
| 2 | H.265 MAIN (8-BIT 4:2:0) |
| 3 | H.265 MAIN 10 (10-BIT 4:2:0) |
| 4 | H.265 MAIN 4:4:4 (8-BIT 4:4:4) |
| 5 | H.265 MAIN 4:4:4 10 (10-BIT 4:4:4) |
| 6-15 | RESERVED |

| OFFSET | FIELD | SIZE | VALUE | DESCRIPTION |
|---|---|---|---|---|
| 6 | wBlockCompressionLevels | 2 | BITMAP | THIS FIELD DEFINES THE MAXIMUM BIT RATE THE DECODER IN THE STREAM SINK IS CAPABLE OF. IT IS VALID ONLY WHEN wEncodingFormats FIELD INDICATES THAT THE STREAM SINK IS CAPABLE OF DECODING H.264 AND/OR H.265<br><br>THIS FIELD IS ENCODED AS FOLLOWS: |

| BIT | BLOCK COMPRESSION PROFILE |
|---|---|
| 0 | LEVEL 3.1 |
| 1 | LEVEL 3.2 |
| 2 | LEVEL 4 |
| 3 | LEVEL 4.1 |
| 4 | LEVEL 4.2 |
| 5 | LEVEL 5 |
| 6 | LEVEL 5.1 |
| 7 | LEVEL 5.2 |
| 8 | LEVEL 6 |
| 9 | LEVEL 6.1 |
| 10 | LEVEL 6.2 |
| 11-15 | RESERVED |

| OFFSET | FIELD | SIZE | VALUE | DESCRIPTION |
|---|---|---|---|---|
| 8 | dwMaximumSlicesSupported | 4 | NUMBER | THIS FIELD INDICATES THE MAXIMUM NUMBER OF H.264 OR H.265 SLICES SUPPORTED BY THE STREAM SINK. IT IS VALID ONLY HWEN wEncodingFormats FIELD INDICATES THAT THE STREAM SINK IS CAPABLE OF DECODING H.264 AND/OR H.265. |

FIG. 30B

Table 9 Cont.

| OFFSET | FIELD | SIZE | VALUE | DESCRIPTION | | |
|---|---|---|---|---|---|---|
| 12 | dwMaximumTilesSupported | 2 | NUMBER | THIS FIELD CONVEYS THE MAXIMUM NUMBER OF H.265 TILES SUPPORTED BY THE STREAM SINK. IT IS VALID ONLY WHEN wEncodingFormats FIELD INDICATES THAT THE STREAM SINK IS CAPABLE OF DECODING H.265. | | |
| 14 | wDisplayFeatures | 2 | BITMAP | THIS FIELD CONVEYS THE DISPLAY FEATURES SUPPORTED BY TAD RX. | | |
| | | | | BIT | DISPLAY FEATURE | |
| | | | | 0 | SET TO 1 IF HDCP SUPPORTED | |
| | | | | 1 | SET TO 1 IF TAD RX CAN RECEIVE PORTRAT AND LANDSCAPE ORIENTATIONS. NOTE THAT ABILITY TO RECEIVE LANDSCAPE ORIENTATION IS REQUIRED | |
| | | | | 2 | SET TO 1 IF TAD RX CAN COMPOSE A CURSOR PLANE | |
| | | | | 3 | SET TO 1 IF THE TAD RX SUPPORTS XOR CURSOR (FOR EXAMPLE, MICROSOFT'S PUBLIC SPEC FOR XOR CURSOR). | |
| | | | | 4 | SET TO 1 IF THE TAD RX/STREAM SINK SUPPORTS SELECTIVE UPDATES TO THE FRAME BUFFER (I.E., DIRTY RECTANGLES) | |
| | | | | 5 | SET TO 1 IF THE TAD RX SUPPORTS IMMEDIATE MODE | |
| | | | | 6 | SET TO 1 IF THE TAD RX SUPPORTS ACCUMULATE MODE | |
| | | | | 7 | PTS LOCK CAPABILITY | |
| | | | | 8-15 | RESERVED | |
| 16 | bHDCPMajorVersion | 1 | NUMBER | THIS FIELD CONVEYS THE MAJOR VERSION NUMBER OF THE HDCP OVER TAD SPECIFICATION THAT IS SUPPORTED BY TAD RX. IT IS VALID ONLY WHEN THE wDisplayFeatures FIELD INDICATES THAT TAD RX IS CAPABLE OF HDCP. | | |
| 17 | bHDCPMinorVersion | 1 | NUMBER | THIS FIELD CONVEYS THE MINOR VERSION NUMBER OF THE HDCP OVER TAD SPECIFICATION THAT IS SUPPORTED BY TAD RX. IT IS VALID ONLY WHEN THE wDisplayFeatures FIELD INDICATES THAT TAD RX IS CAPABLE OF HDCP. | | |
| 18 | bMaxCursorHeight | 1 | NUMBER | THIS FIELD CONVEYS THE MAXIMUM HEIGHT OF CURSOR SUPPORTED BY THE TAD RX. IT IS VALID ONLY WHEN THE wDisplayFeatures FIELD INDICATES THAT TAD RX IS CAPABLE OF CURSOR. | | |

FIG. 30C

Table 9 Cont.

| OFFSET | FIELD | SIZE | VALUE | DESCRIPTION |
|---|---|---|---|---|
| 19 | bMaxCursorWidth | 1 | NUMBER | THIS FIELD CONVEYS THE MAXIMUM WIDTH OF CURSOR SUPPORTED BY THE TAD RX. IT IS VALID ONLY WHEN THE wDisplayFeatures FIELD INDICATES THAT TAD RX IS CAPABLE OF CURSOR. |
| 20 | bMonitorCapabilities | 1 | BITMAP | THIS FIELD CONVEYS INFORMATION FROM THE STREAM SINK FEEDING INTO DISPLAY PANEL CAPABILITY DISCOVERY. <table><tr><th>BIT</th><th>DISPLAY PANEL CAPABILITY</th></tr><tr><td>0</td><td>SET TO 1 IF THE STREAM SINK CAN CONVEY AN EDID FOR THE DISPLAY PANEL, POTENTIALLY WITH DISPLAYID AS BLOCK(S) IN THE EDID. A STREAM SINK SHALL SET AT LEAST ONE OF BIT 0 AND BIT 1.</td></tr><tr><td>1</td><td>SET TO 1 IF THE STREAM SINK CAN CONVEY A DISPLAYID STRUCTURE FOR THE DISPLAY PANEL. A STREAM SINK SHALL SET AT LEAST ONE OF BIT 0 AND BIT 1.</td></tr><tr><td>2-15</td><td>RESERVED</td></tr></table> |
| 21 | wEDIDSize | 2 | NUMBER | THIS FIELD CONTAINS THE SIZE OF THE EDID IN THE STREAM SINK. IT IS VALID IF bMonitorCapabilities FIELD INDICATES THAT THE STREAM SINK CAN CONVEY AN EDID STRUCTURE. |
| 23 | wDisplayIDSize | 2 | NUMBER | THIS FIELD CONTAINS THE SIZE OF THE DISPLAYID STRUCTURE IN THE STREAM SINK. IT IS VALID IF bMonitorCapabilities FIELD INDICATES THAT THE STREAM SINK CAN CONVEY A DISPLAYID STRUCTURE. |

FIG. 30D

Table 10

| OFFSET | FIELD | SIZE | VALUE | DESCRIPTION |
|---|---|---|---|---|
| 0 | bRequest | 1 | NUMBER | INDICATES THE SPECIFIC STREAM SINK CAPABILITY THAT IS BEING REQUESTED. IT HAS THE FOLLOWING DEFINITION: <table><tr><td>VALUE</td><td>SPECIFIC REQUEST</td></tr><tr><td>0</td><td>CAPABILITY STRUCTURE OF THE STREAM SINK. THIS STRUCTURE IS DEFINED IN APPENDIX A.</td></tr><tr><td>1</td><td>EDID OF THE STREAM SINK (MORE SPECIFICALLY, OF THE DISPLAY PANEL ABSTRACTED THRU THE STREAM SOURCE)</td></tr><tr><td>2</td><td>DISPLAYID OF THE STREAM SINK (MORE SPECIFICALLY, OF THE DISPLAY PANEL ABSTRACTED THRU THE STREAM SOURCE)</td></tr><tr><td>3 THRU 0XFF</td><td>RESERVED</td></tr></table> |
| 0 | wOffset | 2 | NUMBER | INDICATES THE OFFSET INTO EDID OR DISPLAYID FOR WHERE DATA IS TO BE RETURNED. THIS FIELD IS VALID ONLY WHEN THE bRequest FIELD IS SET TO 1 OR 2. |
| 2 | wSize | 2 | NUMBER | INDICATES THE NUMBER OF BYTES TO READ FROM THE OFFSET SPECIFIED IN wOffset. THIS FIELD IS VALID ONLY WHEN THE bRequest FIELD IS SET TO 1 OR 2. |

FIG. 31

Table 13

| OFFSET | FIELD | SIZE | VALUE | DESCRIPTION |
|---|---|---|---|---|
| 4 | wEncoderFormatUsed | 2 | BITMAP | INDICATES THE ENCODER FORMAT USED IN THE UPCOMING VIDEO STREAM.<br><br>THIS FIELD IS A BITMAP, BUT ONLY THE ONE BIT CORRESPONDING TO THE ENCODING FORMAT USED, FROM AMONG THOSE SUPPORTED BY THE STREAM SINK (SPECIFIED IN wEncodingFormat IN GET TAD RX CAPABILITIES COMMAND MESSAGE), IS SET. |
| 6 | wRawFormatUsed | 2 | BITMAP | INDICATES THE SPECIFIC RAW FORMAT USED.<br><br>THIS FIELD IS VALID ONLY IF wEncoderFormatUsed FIELD ABOVE INDICATES THAT RAW FORMAT WILL BE USED IN THE UPCOMING VIDEO STREAM.<br><br>THIS FIELD IS A BITMAP, BUT ONLY THE ONE BIT CORRESPONDING TO THE RAW FORMAT THAT WILL BE USED, FROM AMONG THOSE SUPPORTED BY THE STREAM SINK (SPECIFIED IN wRawFormat IN GET TAD RX CAPABILITES COMMAND |
| 8 | wBlockCompressionProfileUsed | 2 | BITMAP | INDICATES THE SPECIFIC BLOCK COMPRESSION PROFILE USED.<br><br>THIS FIELD IS VALID ONLY IF wEncoderFormatUsed FIELD ABOVE INDICATES THAT BLOCK COMPRESSION WILL BE USED IN THE UPCOMING VIDEO STREAM.<br><br>THIS FIELD IS A BITMAP, BUT ONLY THE ONE BIT CORRESPONDING TO THE BLOCK COMPRESSION PROFILE THAT WILL BE USED, FROM AMONG THOSE SUPPORTED BY THE STREAM SINK (SPECIFIED IN wBlockCompressionProfile IN GET TAD RX CAPABILITIES COMMAND MESSAGE), IS SET. |
| 10 | wBlockCompressionLevelUsed | 2 | BITMAP | INDICATES THE SPECIFIC BLOCK COMPRESSIN LEVEL USED.<br><br>THIS FIELD IS VALID ONLY IF wEncoderFormatUsed FIELD ABOVE INDICATES THAT BLOCK COMPRESSION WILL BE USED IN THE UPCOMING VIDEO STREAM.<br><br>THIS FIELD IS A BITMAP, BUT ONLY THE ONE BIT CORRESPONDING TO THE BLOCK COMPRESSION LEVEL THAT WILL BE USED, FROM AMONG THOSE SUPPORTED BY THE STREAM SINK (SPECIFIED IN wBlockCompressionLevels IN GET TAD RX CAPABILITIES COMMAND MESSAGE), IS SET. |

FIG. 32A

Table 13 Cont.

| OFFSET | FIELD | SIZE | VALUE | DESCRIPTION |
|---|---|---|---|---|
| 12 | bNumberOfSlicesUsed | 1 | NUMBER | INDICATES THE NUMBER OF SLICES USED IN EACH FRAME.<br><br>THIS FIELD IS VALID ONLY IF wEncoderFormatUsed FIELD ABOVE INDICATES THAT H.264 OR H.265 WILL BE USED IN THE UPCOMING VIDEO STREAM. |
| 13 | bNumberOfTilesUsed | 1 | NUMBER | INDICATES THE NUMBER OF TILES USED IN EACH FRAME.<br><br>THIS FIELD IS VALID ONLY IF wEncoderFormatUsed FIELD ABOVE INDICATES THAT H.265 WILL BE USED IN THE UPCOMING VIDEO STREAM. |
| 14 | wQoSThreshold | 2 | NUMBER | INDICATES THE THRESHOLD VALUE FOR NUMBER OF FRAMES DROPPED, TO BE USED BY TAD RX TO RAISE A TAD RX EVENT NOTIFICATION MESSAGE. |
| 16 | wStreamAttributes | 2 | BITMAP | PROVIDES HINTS TO THE TAD RX ON DOWNSTREAM (LEGACY) LINK CONFIGURATION. THIS FIELD IS ENCODED AS FOLLOWS:<br><br>\| BIT \| STREAM ATTRIBUTE \|<br>\| --- \| --- \|<br>\| 0 \| MAXIMIZE QUALITY \|<br>\| 1 \| MINIMIZE LINK BANDWIDTH \|<br>\| 2-15 \| RESERVED \|<br><br>TAD TX SHALL SET ONLY ONE OF BIT 0 OR BIT 1 BUT NOT BOTH. |
| 18 | dwBandwidth | 4 | NUMBER | INDICATES THE AMOUNT OF BANDWIDTH TO BE COMMITTED IN TAD RX AND/OR THE LEGACY INTERFACE TO THE MONITOR IN THE STREAM SINK. THIS FIELD CAN BE ENCODED IN ANY MANNER. |
| 22 | wPTS | 2 | NUMBER | INDICATES WHEN THE STREAM SINK IS TO START STREAMING TO THE DISPLAY PANEL.<br><br>IF A FRAME CORRESPONDING TO THIS PTS HAS BEEN RECEIVED AND DECODED, THE STREAM SINK WILL START STREAMING THAT FRAME AT THIS SPECIFIED PTS VALUE. ELSE, IT WILL START STREAMING OUT A BLACK FRAME AT THIS PTS. IF THE VALUE OF THIS FIELD IS "0" THEN THIS FEATURE IS NOT BEING USED. |

FIG. 32B

Table 15

| OFFSET | FIELD | SIZE | VALUE | DESCRIPTION | |
|---|---|---|---|---|---|
| 0 | bStreamStatus | 1 | NUMBER | INDICATES STATUS OF THE VIDEO STREAM IN TAD RX | |
| | | | | VALUE | STATUS |
| | | | | 0 | RESERVED |
| | | | | 1 | VIDEO STREAM NOT STARTED |
| | | | | 2 | START STREAM RECEIVED BUT DATA STREAM PACKETS NOT RECEIVED YET |
| | | | | 3 | START STREAM AND DATA STREAM PACKETS RECEIVED |
| | | | | 4 | STREAM TERMINATED |
| | | | | 5-0XFF | RESERVED |
| 1 | wFramesDropped | 2 | NUMBER | NUMBER OF FRAMES DROPPED IN TRANSPORT OR IN TAD RX SINCE START OF THE CURRENT STREAM. THIS NUMBER IS RESET WHEN THE CURRENT STREAM IS TERMINATED. | |
| 3 | sStreamParameters | 18 | STRUCTURE | WHEN A STREAM IS IN PENDING OR ACTIVE STATUS, TAD RX RETURNS THE CURRENT VALUES OF THE ENTIRE STRUCTURE RECEIVED AS PART OF START STREAM, REFLECTING ANY UPDATES RECEIVED THRU MANAGE STREAM | |

FIG. 33

Table 17

| OFFSET | FIELD | SIZE | VALUE | DESCRIPTION |
|---|---|---|---|---|
| 0 | dwCurrentBandwidth | 4 | NUMBER | INDICATES THE AMOUNT OF BANDWIDTH AVAILABLE IN TAD RX AND IN THE STREAM SINK INCLUDING THE DOWNSTREAM LEGACY LINK TO THE DISPLAY PANEL.<br><br>THIS BANDWIDTH NUMBER INDICATED IS VALID AS THE TIME OF THE RESPONSE, AND MAY CHANGE WHEN PROBED FOR LATER. IN PARTICULAR, IT IS POSSIBLE THAT THE AMOUNT OF BANDWIDTH ENUMERATED MAY NOT BE AVAILABLE WHEN TAD TX SUBSEQUENTLY SENDS A START STREAM, TRIGGERING A COMMIT. |
| 4 | bAttributes | 1 | BITMAP | THIS FIELD HAS THE FOLLOWING ENCODING <table><tr><th>BIT</th><th>DESCRIPTION</th></tr><tr><td>0</td><td>BEST EFFORT. IF SET, THE BANDWIDTH BEING COMMITTED IS BEST EFFORT. IF NOT SET, THE BANDWIDTH IS GAURANTEED.</td></tr><tr><td>1-7</td><td>RESERVED</td></tr></table> |

FIG. 34

Table 18

| OFFSET | FIELD | SIZE | VALUE | DESCRIPTION |
|---|---|---|---|---|
| 0 | dwCurrentBandwidth | 4 | NUMBER | INDICATES THE AMOUNT OF BANDWIDTH THAT CAN BE ASSIGNED TO THE UPCOMING STREAM. IT REFLECTS CURRENT BANDWIDTH AVAILABILITY IN THE TSA AND THE TRANSPORT LAYERS.<br><br>THIS BANDWIDTH NUMBER INDICATED IS VALID AS THE TIME OF THE RESPONSE, AND MAY CHANGE WHEN PROBED FOR LATER. IN PARTICULAR, IT IS POSSIBLE THAT THE AMOUNT OF BANDWIDTH ENUMERATED MAY NOT BE AVAILABLE WHEN TAD TX SUBSEQUENTLY SENDS A SET TSA BANDWIDTH COMMAND MESSAGE, TO TRIGGER A COMMIT. |
| 4 | bAttributes | 1 | BITMAP | THIS FIELD HAS THE FOLLOWING ENCODING<br><br>{ BIT \| DESCRIPTION }<br>{ 0 \| BEST EFFORT. IF SET, THE BANDWIDTH BEING COMMITTED IS BEST EFFORT. IF NOT SET, THE BANDWIDTH IS GAURANTEED. }<br>{ 1-7 \| RESERVED } |

FIG. 35

Table 19

| OFFSET | FIELD | SIZE | VALUE | DESCRIPTION | |
|---|---|---|---|---|---|
| 0 | dwRequestedBandwidth | 4 | NUMBER | INDICATES THE AMOUNT OF BANDWIDTH TO BE COMMITTED. | |
| 4 | dwErrorThreshold | 4 | NUMBER | INDICATES THE ERROR THRESHOLD TO BE USED BY TSA FOR THE UPCOMING STREAM. THIS PARAMETER IS PARTICULARLY USEFUL WHEN TSA INDICATES IN ITS REPLY TO GET TSA BANDWIDTH COMMAND MESSAGE THAT IT CAN ALLOCATE BANDWIDTH ON A BEST-EFFORT BASIS. | |
| 8 | bTsaConfiguration | 2 | BITMAP | BIT | EVENT |
| | | | | 0 | ENABLE DETAILED ERROR REPORT FROM THE TSA TX. IF ENABLED, THE TSA TX CONVEYS THE FRAME ID OF EVERY VIDEO FRAME THAT COULD NOT BE TRANSMITTED BY TAD TX |
| | | | | 1-15 | RESERVED |

FIG. 36

Table 20

| OFFSET [BYTE:BIT] | FIELD | SIZE | VALUE | DESCRIPTION |
|---|---|---|---|---|
| [0:0] | VERSION | 2 | NUMBER | IDENTIFIES PACKET FORMAT VERSION. SHALL BE TBD FOR THIS FORMAT. ALL OTHER VALUES ARE RESERVED |
| [0:2] | TYPE | 2 | NUMBER | <table><tr><td>VALUE</td><td>ENCODING</td></tr><tr><td>00B</td><td>MAIN STREAM DATA</td></tr><tr><td>01B</td><td>SECONDARY DATA</td></tr><tr><td>10B-11B</td><td>RESERVED</td></tr></table> |
| [0:4] | RESERVED | 3 | RESERVED | RESERVED |
| [0:7] | PTV | 1 | NUMBER | PRESENTATION TIME STAMP VALID: SHALL BE SET TO 1B IF THE PAYLOAD CONTAINED WITHIN THIS SECONDARY DATA PACKET CONTAINS THE PRESENTATION TIME STAMP FOR THE GIVEN FRAME ID. OTHERWISE SET TO 0B. ONLY VALID WHEN TYPE=1. RESERVED WHEN TYPE=0 |
| [1:0] | FRAME ID | 8 | NUMBER | FRAME IDENTIFIER. USED TO CORRELATE ONE OR MORE DATA TRANSFERS WITH ONE OR MORE METADATA TRANSFERS. SPECIFICALLY, A FRAME IS DEFINED AS THE COLLECTION OF TRANSFERS WITH THE SAME FRAME ID. THE FRAME ID VALUE WILL BE SET BY THE SOURCE, SHALL INCREMENT MONOTONICALLY AND ROLL-OVER EVERY 2^8 FRAMES (ID #255→ ID #0). |
| [2:0] | EOF | 1 | NUMBER | END OF FRAME. WHEN TYPE=0: SHALL BE SET TO 1B IF THE PAYLOAD CONTAINED WITH THIS DATA PACKET CONTAINS THE LAST MDT FOR THE GIVEN FRAME ID. OTHERWISE SET TO 0B. WHEN TYPE=1: SHALL BE SET TO 1B IF THE PAYLOAD CONTAINED WITHIN THIS DATA PACKET CONTAINS THE LAST SDT FOR THE GIVEN FRAME ID. OTHERWISE SET TO 0B. |
| [2:1] | EE | 1 | | ENCRYPTION ENABLED: SHALL BE SET TO '1' IF ENCRYPTION IS ENABLED. HEADER IS EXTENDED BY 8 BYTES WHEN ENCRYPTION IS ENABLED. |
| [2:2] | RESERVED | 7 | RESERVED | RESERVED |
| [3:0] | RESERVED | 8 | RESERVED | |
| [4:0] | LENGTH | 8 | NUMBER | PAYLOAD LENGTH. LENGTH OF THE PAYLOAD IN BYTES. A VALUE OF ZERO INDICATES NO PAYLOAD ENTRIES; A NON-ZERO VALUE INDICATES ONE OR MORE ENTRIES. |
| [5:0] | | 8 | | |
| [6:0] | | 8 | | |
| [7:0] | | 8 | | |
| [8:0] | ENCRYPTION COUNTERS | 128 | NUMBER | HDCP EXTENSION. THIS FIELD SHALL CARRY THE STREAMCTR AND THE INPUTCTR VALUES WHEN ENCRYPTION IS ENABLED AS INDICATED BY THE ENCRYPTION ENABLE BIT. |

FIG. 37

Table 24

| OFFSET [BYTE:BIT] | FIELD | SIZE | VALUE | DESCRIPTION | |
|---|---|---|---|---|---|
| [0:0] | METADATA TYPE | 8 | CONSTANT | ENCODING_FORMAT | |
| [1:0] | RESERVED | 8 | RESERVED | SHALL BE SET TO ZERO. | |
| [2:0] | METADATA LENGTH | 8 | 0CH | NUMBER OF PAYLOAD BYTES: LSB BITS [7:0] | |
| [3:0] | | 8 | 00H | NUMBER OF PAYLOAD BYTES: MSB BITS [15:0] | |
| [4:0] | ENCODING FORMAT | 8 | NUMBER | IDENTIFIES THE ENCODING FORMAT USED. | |
| | | | | VALUE | DECODER |
| | | | | 00H | RAW. SUPPORT FOR RAW FORMAT IS MANDATORY. SO THIS BIT MUST ALWAYS BE SET. |
| | | | | 01H | DSC |
| | | | | 02H | H.264 |
| | | | | 03H | H.265 |
| | | | | 03H-FFH | RESERVED |
| | | | | ALL OTHER VALUES RESERVED | |
| [5:0] | RAW FORMATS | 1 | NUMBER | SPECIFIES THE ENCODING FORMAT | |
| | | | | VALUE | DECODER |
| | | | | 0000H | B8G8R8. SUPPORT FOR THIS FORMAT IS MANDATORY. SO THIS BIT MUST ALWAYS BE SET. |
| | | | | 0001H | RGB 6-BPC (18BPP) |
| | | | | 0002H | RGB 10-BPC (30BPP) |
| | | | | 0003H | RGB 12-BPC (36BPP) |
| | | | | 0003H | RGB 16-BPC (48BPP) |
| | | | | 0003H | 8-BIT PER PIXEL YCBCR 4:2:0 |
| | | | | 0004H | 10-BIT PER PIXEL YCBCR 4:2:0 |
| | | | | 0005H | 12-BIT PER PIXEL YCBCR 4:2:0 |
| | | | | 0006H | 16-BIT PER PIXEL YCBCR 4:2:0 |
| | | | | 0007H | 8-BIT PER PIXEL YCBCR 4:2:2 |
| | | | | 0008H | 10-BIT PER PIXEL YCBCR 4:2:2 |
| | | | | 0009H | 12-BIT PER PIXEL YCBCR 4:2:2 |
| | | | | 000AH | 16-BIT PER PIXEL YCBCR 4:2:2 |
| | | | | 000BH | 8-BIT PER PIXEL YCBCR 4:2:4 |
| | | | | 000CH | 10-BIT PER PIXEL YCBCR 4:2:4 |
| | | | | 000DH | 12-BIT PER PIXEL YCBCR 4:2:4 |
| | | | | 000EH | 16-BIT PER PIXEL YCBCR 4:2:4 |
| | | | | 000FH-FFFFH | RESERVED |
| | | | | ALL OTHER VALUES RESERVED | |

FIG. 38A

Table 24 Cont.

| OFFSET [BYTE:BIT] | FIELD | SIZE | VALUE | DESCRIPTION |
|---|---|---|---|---|
| [7:0] | BLOCK COMPRESSION PROFILES | 16 | BITMAP | THIS FIELD INDICATES THE PROFILE TYPES FOR H.264 AND H.265 AND IS ONLY VALID WHEN THE ENCODING FORMAT INDICATES H.264 OR H.265 AND IS ONLY VALID WHEN THE ENCODING FORMAT FIELD INDICATES H.264 OR H.265 <table><tr><th>BIT</th><th>BLOCK COMPRESSION PROFILE</th></tr><tr><td>0</td><td>H.264 UNCONSTRAINED BASELINE PROFILE (4:2:0 8-BIT PIXELS)</td></tr><tr><td>1</td><td>H.264 CONSTRAINED HIGH PROFILE WITH CABAC (4:2:0 8-BIT PIXELS)</td></tr><tr><td>2</td><td>H.265 MAIN (8-BIT 4:2:0)</td></tr><tr><td>3</td><td>H.265 MAIN 10 (10-BIT 4:2:0)</td></tr><tr><td>4</td><td>H.265 MAIN 4:4:4 (8-BIT 4:4:4)</td></tr><tr><td>5</td><td>H.265 MAIN 4:4:4 10 (10-BIT 4:4:4)</td></tr><tr><td>6-15</td><td>RESERVED</td></tr></table> |
| [9:0] | RESERVED | 8 | RESERVED | SHALL BE SET TO ZERO. |
| [10:0] | RESERVED | 8 | RESERVED | SHALL BE SET TO ZERO. |
| [11:0] | RESERVED | 8 | RESERVED | SHALL BE SET TO ZERO. |

FIG. 38B

STREAMING ON DIVERSE TRANSPORTS

CROSS-REFERENCE TO RELATED APPLICATION

This application claims priority from U.S. Provisional Patent Application No. 62/579,107, entitled "Streaming on Diverse Transports," filed on Oct. 30, 2017, which is incorporated by reference herein in its entirety. This application also claims priority from U.S. patent application Ser. No. 16/175,287 filed on Oct. 30, 2018, entitled "Streaming on Diverse Transports," which is incorporated by reference herein in its entirety.

TECHNICAL FIELD

This disclosure relates generally to transport agnostic streaming and display.

BACKGROUND

Video streaming solutions typically focus on a link layer that is closely tied to the physical layer of the transport. For example, a DisplayPort (DP) definition only works on DP transport. Similarly an HDMI (High Definition Multimedia Interface) definition only works on an HDMI transport.

Some definitions such as Miracast from the Wi-Fi Alliance focus on using Internet Protocol (IP) as a basis for abstraction of the transport. However, such adaptations are limited to transports that support networking and network protocol abstractions, such as Ethernet or Wi-Fi. They are not supported on isochronous transports (for example, such as connected input/output or CIO transports).

BRIEF DESCRIPTION OF THE DRAWINGS

The following detailed description may be better understood by referencing the accompanying drawings, which contain specific examples of numerous features of the disclosed subject matter.

FIGS. 24A and 24B illustrate a table including example fields of a control header in a request message;
FIG. 25 illustrates a table including example fields of a header for a synchronized reply message (SRM);
FIG. 26 is a table illustrating an example control payload for an indicate hot plug notification message;
FIG. 27 illustrates an example transport agnostic display (TAD) RX event table;
FIG. 28 illustrates an example table for transport-specific adaptation (TSA) events;
FIG. 29 is a table illustrating an example of a monitor event message that can be reported by a TAD RX;
FIGS. 30A-30D illustrate an example data structure in a control payload;
FIG. 31 is a table illustrating an example structure of a control payload for a stream sink capabilities command message;
FIGS. 32A and 32B show a table illustrating an example structure of a control payload for a start stream command;
FIG. 33 is a table illustrating an example control payload with which a TAD RX returns SUCCESSFUL in an SRM control header's bStatus field;
FIG. 34 illustrates a table including example return information from a TAD RX in a control payload of an SRM;
FIG. 35 illustrates a table including example return information from a TAD TX in a control payload of an SRM;
FIG. 36 illustrates a table including example information that can be included in a control payload of a request message;
FIG. 37 is a table illustrating an example display stream header;
FIGS. 38A and 38B illustrate a table including example encoding format metadata entry fields;

In some cases, the same numbers are used throughout the disclosure and the figures to reference like components and features. In some cases, numbers in the 100 series refer to features originally found in FIG. 1; numbers in the 200 series refer to features originally found in FIG. 2; and so on.

DESCRIPTION OF THE EMBODIMENTS

Figure 1:
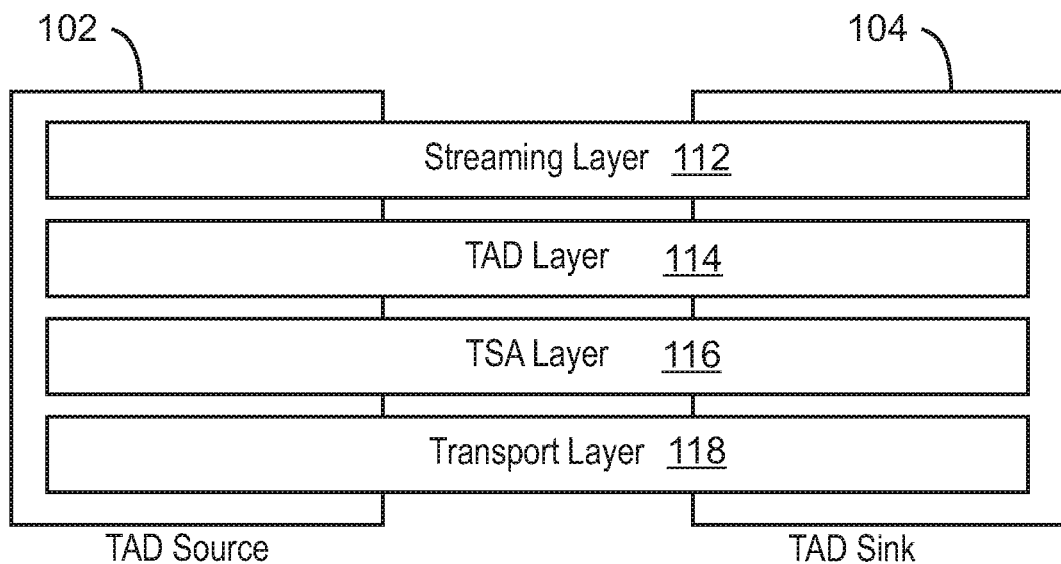
FIG. 1 illustrates source and sink streaming.

Some embodiments relate to transport agnostic display. Some embodiments relate to streaming content (for example, video content) on diverse transports. Some embodiments relate to transfer of a stream (for example, a stream such as a video stream) from a stream source (for example, an originator of a stream such as a video stream) to a stream sink (for example, a destination of a stream such as a video stream) in a transport agnostic manner. Some embodiments relate to transport agnostic sources and/or to transport agnostic sinks.

Some display interfaces have ad-hoc definitions for various needs. As a result, graphics processing units (GPUs), GPU device drivers, and Operating Systems support many protocols, including, for example, DisplayPort (DP), embedded DP, HDMI, MIPI, Miracast, custom USB display protocols, VGA, WiGig Display Extensions, LVDS, etc. Further, on some high bandwidth isochronous transports such as CIO, there is no native definition for video streaming. Those transports may just act as a router for USB based video or DP.

Current video streaming transports such as, for example, DP, HDMI, embedded DP, MIPI, etc. feature a dedicated protocol layer for video transmission that is built on a PHY/transport layer. Video data is transmitted over a dedicated link from a source device to a sink device. The video streaming protocol assumes certain PHY/transport requirements, and source devices generate a stream that can only be transmitted over a specific transport.

Source devices can implement multiple protocols, and benefits of protocols can be tainted by transport-specific nuances (for example, efficiency loss) and user experience issues. Intermixing of transports can cause protocol conversion/translation complexities.

In some embodiments, a streaming and control protocol can be used that is transport agnostic. It can be adapted to be run, for example, over a legacy wired transport previously defined for video streaming (for example, USB), or a legacy wireless transport (for example, IEEE 801.11), or non-traditional video transports (for example, Ethernet). The protocol can enable interfacing to monitors implementing legacy transports such as DisplayPort or HDMI.

In some embodiments, simplification can be achieved. A single link layer implementation can be achieved in the OS and upper layers of the driver, with adaptations to transports as they emerge. This can be achieved without needing to alter an entire video source ecosystem from the OS on down.

In some embodiments, video can be streamed on diverse transports such as isochronous transports (for example, Connected I/O or CIO), or non-isochronous transports (for example, Wi-Fi, Ethernet, etc.), or transports such as Universal Serial Bus (USB) that feature both isochronous and bulk transport constructs. In some embodiments, mixed topologies can be supported such as converting devices that convert between various transports as well as from these transports to other display interfaces (for example, legacy display interfaces) such as DisplayPort and HDMI.

In some embodiments, transport agnostic display (TAD) can be a protocol defined to convey a stream (such as a video stream) from a TAD source to a TAD sink over a range of different physical transports and transport technologies. The TAD protocol can be hosted on any transport for which a transport-specific adaptation (TSA) has been defined. In some embodiments, the TAD protocol is agnostic to the specific encoding of data (for example, to the specific encoding of video data), which may be uncompressed or compressed data.

In some embodiments, TAD is a packetized protocol that allows display to be carried as native traffic along with display and non-display over a single transport. In some embodiments, TAD is a protocol to convey a video stream from a TAD source to a TAD sink. The TAD protocol can be hosted on any transport for which a TSA has been defined.

FIG. 1 illustrates a system 100 including a source 102 and a sink 104. In some embodiments, source 102 is, for example, an originator of a stream such as a video stream. In some embodiments, sink 104 is, for example, a destination of a stream such as a video stream. In some embodiments, source device 102 or sink device 104 can be a converter device that is translating from one protocol to another.

In some embodiments, source 102 is a transport agnostic display (TAD) source. In some embodiments, sink 104 is a transport agnostic display (TAD) sink. In some embodiments, FIG. 1 illustrates streaming (for example, video streaming) from a TAD source 102 to a TAD sink 104. In some embodiments, TAD source 102 is an originator of a video stream and TAD sink 104 is a destination of a video stream (and/or is a branch device). In some embodiments, TAD source 102 is a physical device that contains a TAD transmitter (TAD TX) and originates a video stream. In some embodiments, TAD sink 104 is a physical device that contains a TAD receiver (TAD RX) and receives a video stream from a TAD source such as TAD source 102. In some embodiments, FIG. 1 illustrates protocol layering involving protocol layers, including a streaming layer 112, a TAD layer 114, a transport-specific adaptation layer (TSA layer) 116, and a transport layer 118.

Streaming layer 112 can originate, manage, and terminate a video stream by using constructs made available by the TAD layer 114. Streaming layer 112 can also decide on an encoding format used for the stream based on capabilities of the TAD sink 104, and on the extent to which bandwidth of the transport layer 118 can change dynamically.

TAD layer 114 can be a protocol layer implementing transport agnostic display (TAD). TAD layer 114 can receive one or more video streams from the streaming layer 112 in the TAD source 102 and convey it to the streaming layer 112 in the TAD sink 104 in a transport-agnostic manner. TAD layer 114 can also discover, control, and configure the TAD sink 104, as well as manage stream transmission.

TSA layer 116 can adapt an output of the TAD layer 114 onto the underlying transport. TSA layer 116 can adapt the transport-independent stream from the TAD layer 114 to transport-specific constructs exposed by transport layer 118. TSA layer 116 can also report transport layer 118 capabilities to TAD layer 114, and route data and control streams between peer TAD entities. In some embodiments, TSA layer 116 can route data and control streams between TAD source 102 and TAD sink 104.

Transport layer 118 can be a protocol layer that transports content from TAD source 102 to TAD sink 104. Transport layer 118 can manage a transport topology, link bandwidth, and a physical bus, and provide constructs for a data transfer unit.

In some embodiments, system 100 can provide end-to-end flow in devices with TAD implementations. For example, transport layer 118 can be implemented according to many different implementations, including Converged IO (CIO), XHCI, or wireless. CIO can be a ThunderBolt (TBT) like transport, XHCI can be a USB transport, for example. The transport layer 118 is capable of carrying video and non-video traffic.

Figure 2:
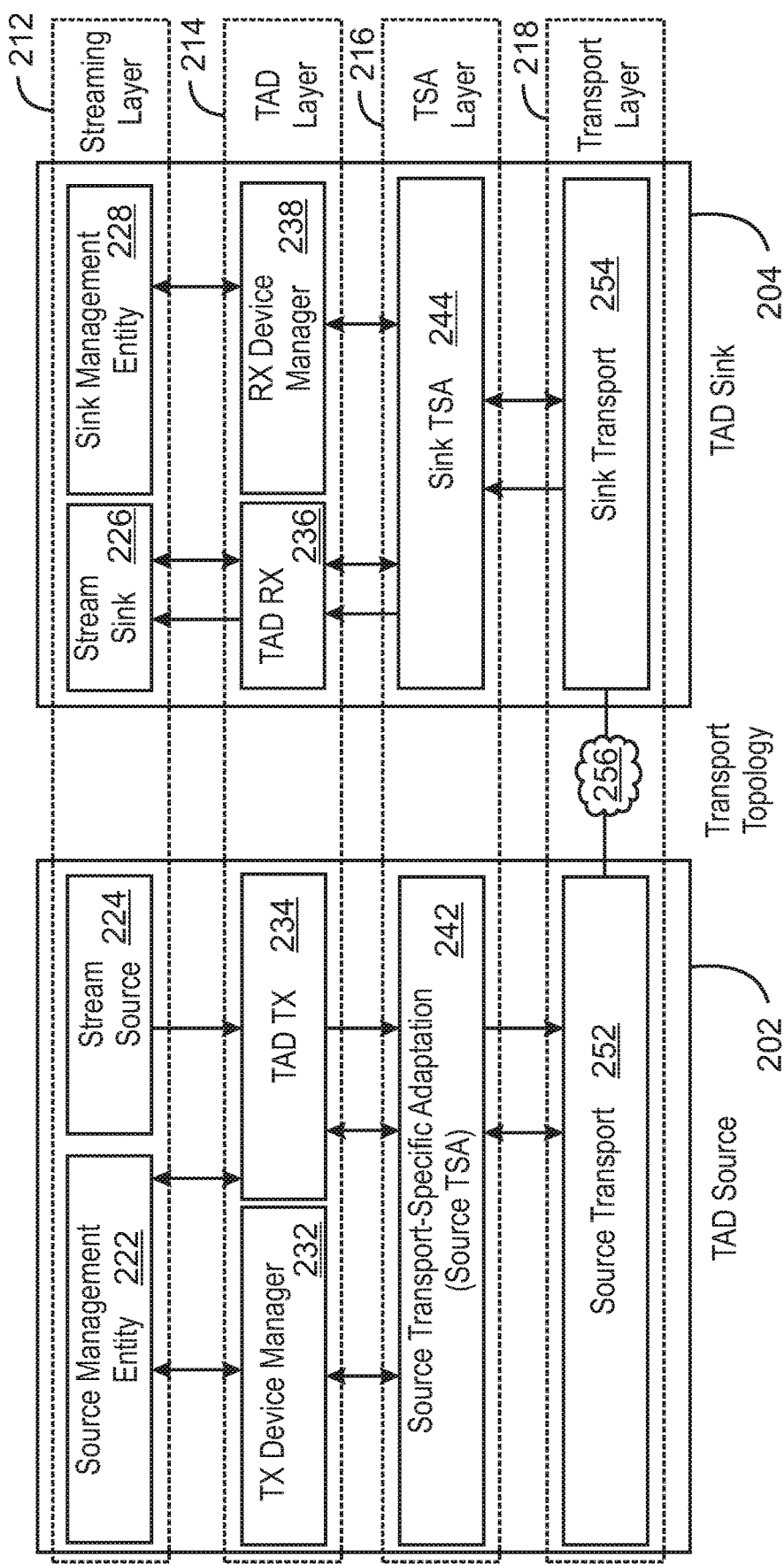
FIG. 2 illustrates source and sink streaming.

FIG. 2 illustrates a system 200 including a source 202 and a sink 204. In some embodiments, source 202 is a transport agnostic display (TAD) source. In some embodiments, sink 204 is a transport agnostic display (TAD) sink. In some embodiments, system 200 is the same as or similar to system 100. In some embodiments, TAD source 202 is the same as or similar to TAD source 102. In some embodiments, TAD sink 204 is the same as or similar to TAD sink 104.

In some embodiments, FIG. 2 illustrates protocol layering involving protocol layers, including a streaming layer 212, a TAD layer 214, a TSA layer 216, and a transport layer 218. In some embodiments, streaming layer 212, TAD layer 214, TSA layer 216, and transport layer 218 are the same as or similar to streaming layer 112, TAD layer 114, TSA layer 116, and transport layer 118, respectively.

In some embodiments, streaming layer 212 includes a source management entity (SME) 222 and a stream source 224 in the TAD source 202 as well as a stream sink 226 and a sink management entity (SME) 228 in the TAD sink 204. In some embodiments, TAD layer 214 includes a transmitter device manager (TX device manager) 232 and a TAD transmitter (TAD TX) 234 in the TAD source 202 as well as a TAD receiver (TAD RX) 236 and a receiver device manager (RX device manager) 238 in the TAD sink 204. In some embodiments, TSA layer 216 includes a source transport-specific adaptation (source TSA) 242 in the TAD source 202 and a sink transport-specific adaptation (sink TSA) 244 in the TAD sink 204. In some embodiments, transport layer 218 includes a source transport 252 in the TAD source 202 as well as a sink transport 254 in the TAD sink 204. In some embodiments, transport layer 218 also manages and/or includes transport topology 256.

Source management entity 222 in the TAD source 202 can provide mechanisms to control and configure parameters in the TAD sink 204 that are common to all TAD streams. Source management entity 222 can also field TAD sink hot plug notifications from the TSA layer 216 (for example, from the source TSA 242 or from the sink TSA 244).

Stream source 224 can originate a video stream in the TAD source 202, and can control and configure it as necessary. Stream source 224 can also implement policies that select an encoder to be used for the video stream and encode the stream accordingly. The video stream originated by stream source 224 can be displayed on stream sink 226.

Stream sink 226 can terminate the video stream in the TAD sink 204. Stream sink 226 can be an abstraction for display function in TAD sink 204. Stream sink 226 can include a display interface transmitter, a display interface topology, and an embedded panel or external monitor. Stream sink 226 can report capabilities of a video decoder and can decode the video stream accordingly. Stream sink 226 can implement two or more frame buffers. Stream sink 226 can report capabilities of a display interface transmitter to the TAD RX 236, manage a display interface to an embedded panel or external monitor, and originate monitor-related asynchronous notifications to the stream source 224.

Sink management entity 228 in the TAD sink 204 can implement control and configuration commands received from the source management entity 222.

TX device manager 232 can be responsible for device specific control in the TAD source 202. In some embodiments, TX device manager 232 can implement per-device TAD control functions in the TAD source 202. RX device manager 238 can be responsible for device specific control in the TAD sink 204. In some embodiments, RX device manager 238 can implement per-device TAD control functions in the TAD sink 204 corresponding to those of the TX device manager 232.

In some embodiments, TAD TX 234 can perform a transmit function in the TAD layer 214. TAD TX 234 can implement per-stream transmit-related control and data transfer functions. In some embodiments, TAD RX 236 can perform a receive function in the TAD layer 214. TAD RX 236 can implement per-stream receive functions corresponding to the transmit functions of TAD TX 234.

In some embodiments, source TSA 242 can adapt an output of the TAD layer 214 onto the underlying transport (for example, source transport 252) in the TAD source 202. In some embodiments, sink TSA 244 can adapt the TAD layer 214 and the underlying transport (for example, sink transport 254) in the TAD sink 204.

In some embodiments, source transport 252 and sink transport 254 can be used to transport content from the TAD source 202 to the TAD sink 204 via transport topology 256.

Figure 3:
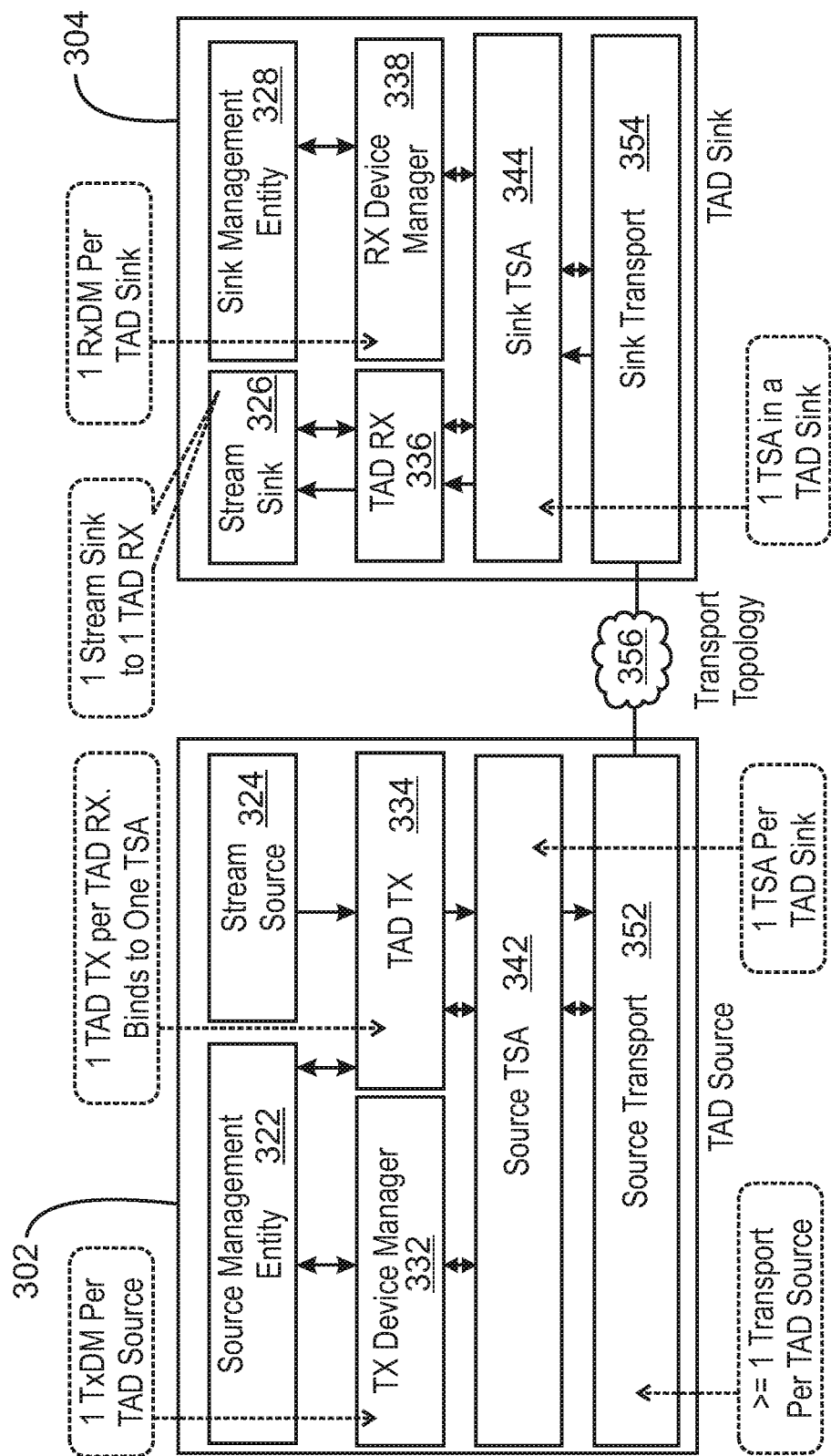
FIG. 3 illustrates source and sink streaming.

FIG. 3 illustrates a system 300 including a source 302 and a sink 304. In some embodiments, source 302 is a transport agnostic display (TAD) source. In some embodiments, sink 304 is a transport agnostic display (TAD) sink. In some embodiments, system 300 includes some or all of the elements and/or features of system 100 and/or system 200. In some embodiments, TAD source 302 includes some or all of the elements and/or features of TAD source 102 and/or TAD source 202. In some embodiments, TAD sink 304 includes some or all of the elements and/or features of TAD sink 104 and/or TAD sink 204. In some embodiments, elements in system 300 of FIG. 3 operate the same as or similar to corresponding elements in system 100 of FIG. 1 and/or in system 200 of FIG. 2.

In some embodiments, although not illustrated in FIG. 3 using dotted lines similar to those of FIG. 2, system 300 includes a streaming layer, a TAD layer, a TSA layer and a transport layer the same as or similar to streaming layer 212, TAD layer 214, TSA layer 216, and transport layer 218, respectively.

In some embodiments, a streaming layer includes a source management entity (SME) 322 and a stream source 324 in the TAD source 302 as well as a stream sink 326 and a sink management entity (SME) 328 in the TAD sink 304. In some embodiments, a TAD layer includes a transmitter device manager (TX device manager) 332 and a TAD transmitter (TAD TX) 334 in the TAD source 302 as well as a TAD receiver (TAD RX) 336 and a receiver device manager (RX device manager) 338 in the TAD sink 304. In some embodiments, a TSA layer includes a source transport-specific adaptation (source TSA) 342 in the TAD source 302 and a sink transport-specific adaptation (sink TSA) 344 in the TAD sink 304. In some embodiments, a transport layer includes a source transport 352 in the TAD source 302 as well as a sink transport 354 in the TAD sink 304. In some embodiments, the transport layer also manages transport topology 356.

In some embodiments, TAD sink 304 includes one stream sink 326 for each display panel. Each display panel can be embedded in TAD sink 304, or could be an external monitor that is connected to the TAD sink 304 (for example, via a display interface). In some embodiments, this connection can be through a sub-topology (for example, a sub-topology including hubs or branch devices supported by the interface).

In some embodiments, TAD sink 304 includes one TAD RX (for example, one TAD RX 336) for each stream sink instantiated (for example, for each stream sink 326 instantiated).

In some embodiments, each TAD sink (for example each TAD sink 304) includes exactly one RX device manager (for example, exactly one RX device manager 338).

In some embodiments, each TAD source (for example, each TAD source 302) includes one source TSA (for example, one source TSA 342) for each source transport (for example, each source transport 352) and for each TAD sink (for example, for each TAD sink 304) that is coupled on that transport. In some embodiments each TAD sink (for example, each TAD sink 304) includes exactly one sink TSA (for example, exactly one sink TSA 344).

In some embodiments, a TAD source (for example, TAD source 302) includes one source transport (for example, includes one source transport 352) for each transport bus being used. In some embodiments, a TAD sink (for example, TAD sink 304) includes exactly one sink transport (for example, exactly one sink transport 354).

In some embodiments, a TAD source (for example, TAD source 302) has one TAD TX (for example, has one TAD TX 334) for each video stream being sourced to the TAD RX (for example, for each video stream being sourced to the TAD RX 336). In some embodiments, each TAD TX (for example, each TAD TX 334) is bound to a specific TAD RX (for example, each TAD RX 336), and vice versa.

In some embodiments, each TAD source (for example, each TAD source 302) includes exactly one TX device manager (for example, includes exactly one TX device manager 332).

In some embodiments, each TAD source (for example, each TAD source 302) includes one stream source for each video stream that it originates (for example, includes one stream source 324 for each video stream that it originates).

Figure 4:
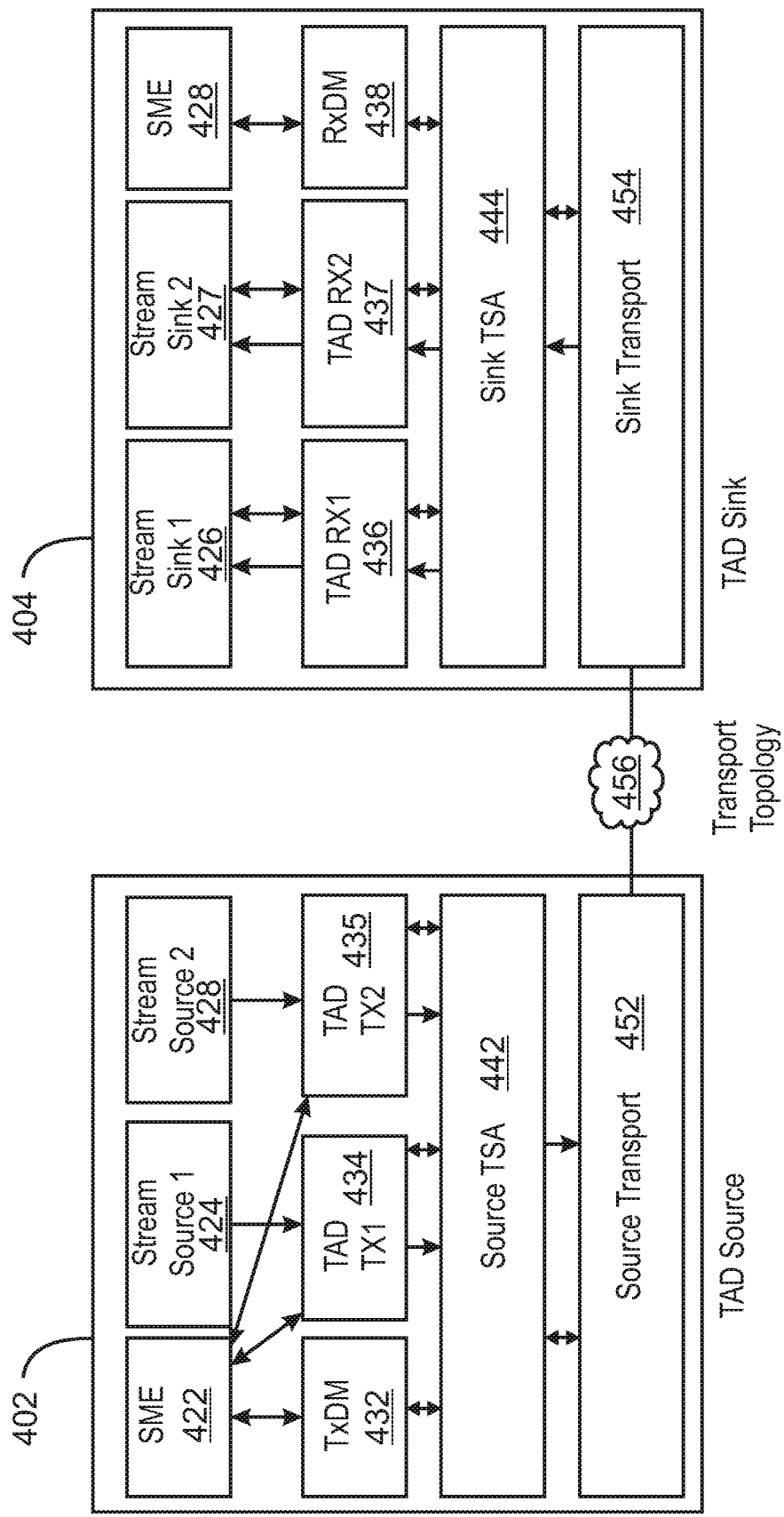
FIG. 4 illustrates source and sink streaming.

FIG. 4 illustrates a system 400 including a source 402 and a sink 404. In some embodiments, source 402 is a transport agnostic display (TAD) source. In some embodiments, sink 404 is a transport agnostic display (TAD) sink. In some embodiments, FIG. 4 illustrates a system 400 in which TAD source 402 transmits two video streams to two stream sinks in TAD sink 404.

In some embodiments, system 400 is the same as or similar to system 100, system 200 and/or system 300. In some embodiments, TAD source 402 includes some or all of the elements and/or features of TAD source 102, TAD source 202, and/or TAD source 302. In some embodiments, TAD sink 404 includes some or all of the elements and/or features of TAD sink 104, TAD sink 204, and/or TAD sink 304. In some embodiments, elements in system 400 of FIG. 4 operate the same as or similar to corresponding elements in system 100 of FIG. 1, system 200 of FIG. 2, and/or system 300 of FIG. 3.

In some embodiments, although not illustrated in FIG. 4 using dotted lines similar to those of FIG. 2, system 400 includes a streaming layer, a TAD layer, a TSA layer and a transport layer the same as or similar to streaming layer 212, TAD layer 214, TSA layer 216, and transport layer 218, respectively.

In some embodiments, a streaming layer includes a source management entity (SME) 422, a first stream source 424, and a second stream source 425 in the TAD source 402 as well as a first stream sink 426, a second stream sink 427, and a sink management entity (SME) 428 in the TAD sink 404. In some embodiments, a TAD layer includes a transmitter device manager (TX device manager or TxDM) 432, a first TAD transmitter (TAD TX1) 434, and a second TAD transmitter (TAD TX2) 435 in the TAD source 402 as well as a first TAD receiver (TAD RX1) 436, a second TAD receiver (TAD RX2) 437, and a receiver device manager (RX device manager or RxDM) 438 in the TAD sink 404. In some embodiments, a TSA layer includes a source transport-specific adaptation (source TSA) 442 in the TAD source 402 and a sink transport-specific adaptation (sink TSA) 444 in the TAD sink 404. In some embodiments, a transport layer includes a source transport 452 in the TAD source 402 as well as a sink transport 454 in the TAD sink 404. In some embodiments, the transport layer also manages transport topology 456.

FIG. 4 illustrates a system 400 in which TAD source 402 transmits two video streams from two stream sources 424 and 425 to two stream sinks 426 and 427 in TAD sink 404. TAD source 402 includes a first TAD TX 434 to perform transmit control and data transfer functions for the first stream from stream source 424. TAD source 402 also includes a second TAD TX 435 to perform transmit control and data transfer functions for the second stream from stream source 425. TAD sink 404 includes a first TAD RX 436 to implement per-stream receiving functions for the first stream, and also includes a first stream sink 426 to terminate the first stream in the TAD sink 404. TAD sink 404 also includes a second TAD RX 437 to implement per-stream receiving functions for the second stream, and also includes a second stream sink 427 to terminate the second stream in the TAD sink 404.

Figure 5:
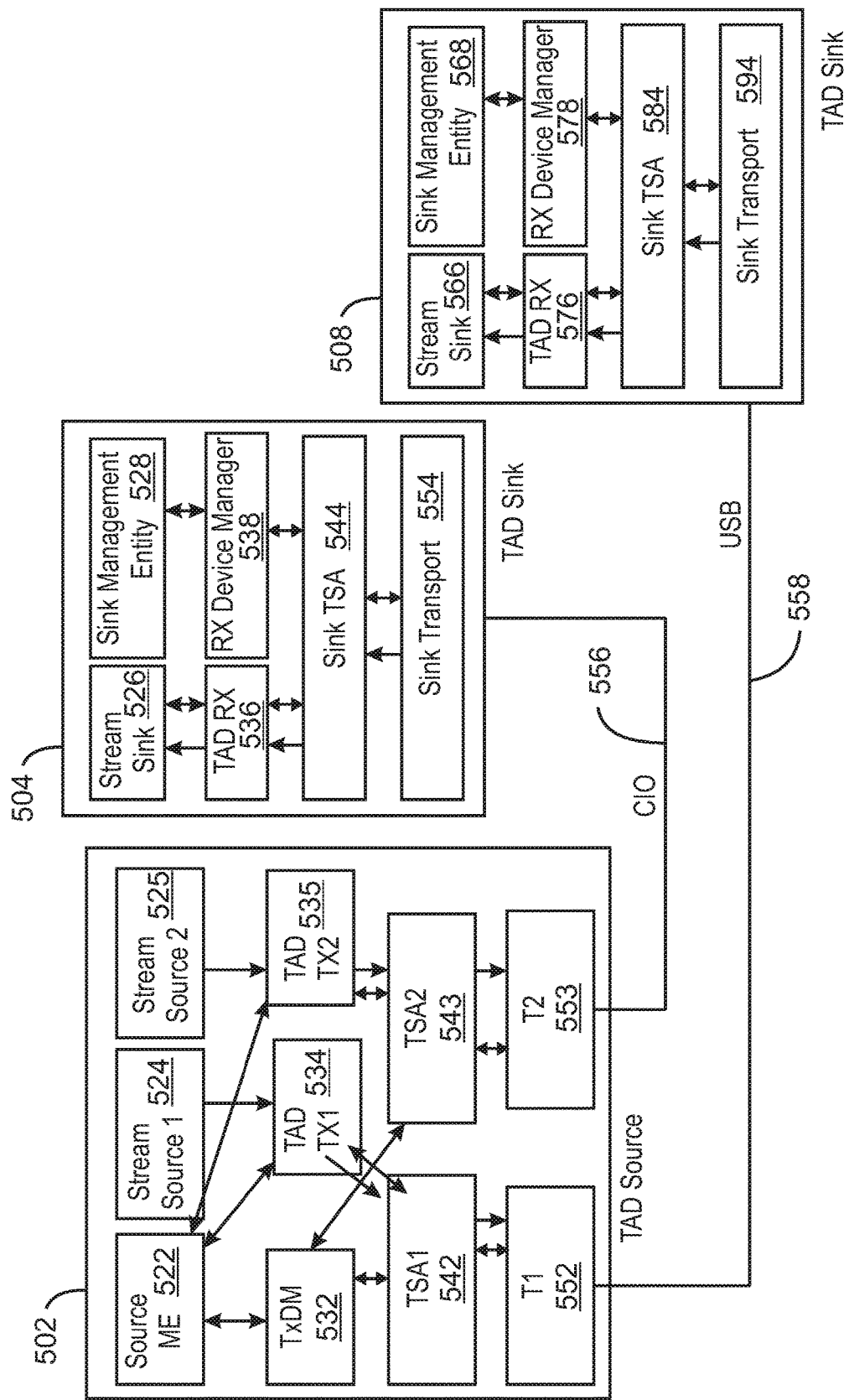
FIG. 5 illustrates source and sink streaming.

FIG. 5 illustrates a system 500 including a source 502, a sink 504, and a sink 508. In some embodiments, source 502 transmits two streams (for example, two video streams) to two different sinks 504 and 508. Sinks 504 and 508 are connected to source 502 on a different transport, and each sink 504 and 508 includes one stream sink. In some embodiments, source 502 is a transport agnostic display (TAD) source. In some embodiments, sink 504 is a transport agnostic display (TAD) sink. In some embodiments, sink 508 is a transport agnostic display (TAD) sink. In some embodiments, FIG. 5 illustrates a system 500 in which TAD source 502 transmits two video streams to two different TAD sinks 504 and 508. Each of TAD sinks 504 and 508 are connected on a different transport to TAD source 502, and TAD sinks 504 and 508 each include one stream sink.

In some embodiments, system 500 is the same as or similar to system 100, system 200, system 300, and/or system 400. In some embodiments, TAD source 502 includes some or all of the elements and/or features of TAD source 102, TAD source 202, TAD source 302, and/or TAD source 402. In some embodiments, TAD sink 504 includes some or all of the elements and/or features of TAD sink 104, TAD sink 204, TAD sink 304, and/or TAD sink 404. In some embodiments, TAD sink 508 includes some or all of the elements and/or features of TAD sink 104, TAD sink 204, TAD sink 304, and/or TAD sink 404. In some embodiments, elements in system 500 of FIG. 5 operate the same as or similar to corresponding elements in system 100 of FIG. 1, system 200 of FIG. 2, system 300 of FIG. 3, and/or system 400 of FIG. 4.

In some embodiments, although not illustrated in FIG. 5 using dotted lines similar to those of FIG. 2, system 500 includes a streaming layer, a TAD layer, a TSA layer and a transport layer the same as or similar to streaming layer 212, TAD layer 214, TSA layer 216, and transport layer 218, respectively.

In some embodiments, a streaming layer includes a source management entity (SME) 522, a first stream source 524, and a second stream source 525 in the TAD source 502 as well as a stream sink 526 and a sink management entity (SME) 528 in the TAD sink 504. In some embodiments, a streaming layer also includes a stream sink 566 and a sink management entity (SME) 568 in the TAD sink 508. In some embodiments, a TAD layer includes a transmitter device manager (TX device manager or TxDM) 532, a first TAD transmitter (TAD TX1) 534, and a second TAD transmitter (TAD TX2) 535 in the TAD source 502 as well as a TAD receiver (TAD RX) 536 and a receiver device manager (RX device manager or RxDM) 538 in the TAD sink 504. In some embodiments, a TAD layer also includes a TAD receiver (TAD RX) 576 and a receiver device manager (RX device manager or RxDM) 578 in the TAD sink 508. In some embodiments, a TSA layer includes a first source transport-specific adaptation (first source TSA or TSA1) 542 and a second source TSA (or TSA2) in the TAD source 502 and a sink transport-specific adaptation (sink TSA) 544 in the TAD sink 504. In some embodiments, the TSA layer also includes a sink TSA 584 in the TAD sink 508.

In some embodiments, a transport layer includes a first source transport (T1) 552 and a second source transport (T2) 553 in the TAD source 502 as well as a sink transport 554 in the TAD sink 504. In some embodiments, the transport layer also includes a sink transport 594 in the TAD sink 508. In some embodiments, the transport layer also manages transport topology 556 and transport topology 558. As illustrated in FIG. 5, transport topology 556 can be a connected Input/Output (Connected I/O or CIO) topology. However, in some embodiments, transport topology 556 can be a different transport topology than CIO. As also illustrated in FIG. 5, transport topology 558 can be a Universal Serial Bus (USB) topology. However, in some embodiments, transport topology 558 can be a different transport topology than USB. In some embodiments, transport topology 556 and transport topology 558 are two different transport topologies.

In some embodiments, source 502 transmits two streams (for example, two video streams) to two different sinks 504 and 508. Sinks 504 and 508 are connected to source 502 on a different transport, and each sink 504 and 508 includes one stream sink. FIG. 5 illustrates a system 500 in which TAD source 502 transmits two streams (for example, two video streams) from two stream sources 524 and 525. The first stream (such as a video stream) from the first steam source 524 is transmitted to stream sink 566 in TAD sink 508. The second stream (such as a video stream) from the second steam source 525 is transmitted to stream sink 526 in TAD sink 504. TAD source 502 includes a first TAD TX 534 to perform transmit control and data transfer functions for the first stream from stream source 524. TAD source 502 also includes a second TAD TX 535 to perform transmit control and data transfer functions for the second stream from stream source 525. TAD source 502 includes a first TSA 542 to adapt output of TAD TX 534 onto underlying transport 552 to transport the first stream from the TAD source 502 to the TAD sink 508. TAD source 502 includes a second TSA 543 to adapt output of TAD TX 535 onto underlying transport 553 to transport the second stream from the TAD source 502 to the TAD sink 504. TAD sink 508 includes a TAD RX 576 to implement per-stream receiving functions for the first stream, and also includes a stream sink 566 to terminate the first stream in the TAD sink 508. TAD sink 504 includes a TAD RX 536 to implement per-stream receiving functions for the second stream, and also includes a stream sink 526 to terminate the second stream in the TAD sink 504.

Figure 6:
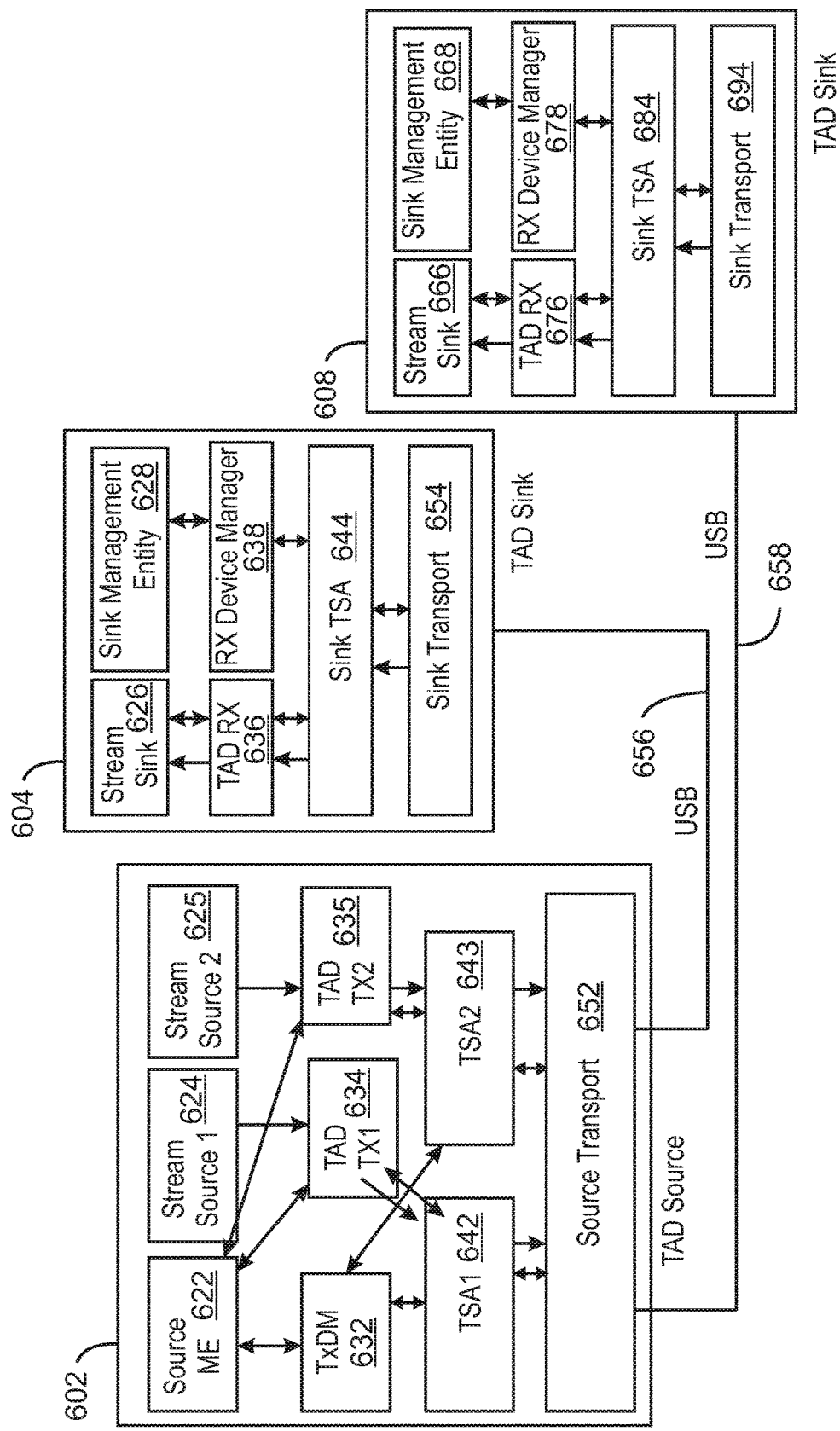
FIG. 6 illustrates source and sink streaming.

FIG. 6 illustrates a system 600 including a source 602, a sink 604, and a sink 608. In some embodiments, source 602 transmits two streams (for example, two video streams) to two different sinks 604 and 608. Sinks 604 and 608 are connected to source 602 on a same transport (for example, both USB transports), and each sink 604 and 608 includes one stream sink. In some embodiments, source 602 is a transport agnostic display (TAD) source. In some embodiments, sink 604 is a transport agnostic display (TAD) sink. In some embodiments, sink 608 is a transport agnostic display (TAD) sink. In some embodiments, FIG. 6 illustrates a system 600 in which TAD source 602 transmits two video streams to two different TAD sinks 604 and 608. Each of TAD sinks 604 and 608 are connected on a same transport to TAD source 602 (for example, both coupled via a USB transport), and TAD sinks 604 and 608 each include one stream sink.

In some embodiments, system 600 is the same as or similar to system 100, system 200, system 300, system 400, and/or system 500. In some embodiments, TAD source 602 includes some or all of the elements and/or features of TAD source 102, TAD source 202, TAD source 302, TAD source 402, and/or TAD source 502. In some embodiments, TAD sink 604 includes some or all of the elements and/or features of TAD sink 104, TAD sink 204, TAD sink 304, TAD sink 404, TAD sink 504, and/or TAD sink 508. In some embodiments, TAD sink 608 includes some or all of the elements and/or features of TAD sink 104, TAD sink 204, TAD sink 304, TAD sink 404, TAD sink 504, and/or TAD sink 508. In some embodiments, elements in system 600 of FIG. 6 operate the same as or similar to corresponding elements in system 100 of FIG. 1, system 200 of FIG. 2, system 300 of FIG. 3, system 400 of FIG. 4, and/or system 500 of FIG. 5.

In some embodiments, although not illustrated in FIG. 6 using dotted lines similar to those of FIG. 2, system 600 includes a streaming layer, a TAD layer, a TSA layer and a transport layer the same as or similar to streaming layer 212, TAD layer 214, TSA layer 216, and transport layer 218, respectively.

In some embodiments, a streaming layer includes a source management entity (SME) 622, a first stream source 624, and a second stream source 625 in the TAD source 602 as well as a stream sink 626 and a sink management entity (SME) 628 in the TAD sink 604. In some embodiments, a streaming layer also includes a stream sink 666 and a sink management entity (SME) 668 in the TAD sink 608. In some embodiments, a TAD layer includes a transmitter device manager (TX device manager or TxDM) 632, a first TAD transmitter (TAD TX1) 634, and a second TAD transmitter (TAD TX2) 635 in the TAD source 602 as well as a TAD receiver (TAD RX) 636 and a receiver device manager (RX device manager or RxDM) 638 in the TAD sink 604. In some embodiments, a TAD layer also includes a TAD receiver (TAD RX) 676 and a receiver device manager (RX device manager or RxDM) 678 in the TAD sink 608. In some embodiments, a TSA layer includes a first source transport-specific adaptation (first source TSA or TSA1) 642 and a second source TSA (or TSA2) in the TAD source 602 and a sink transport-specific adaptation (sink TSA) 644 in the TAD sink 604. In some embodiments, the TSA layer also includes a sink TSA 684 in the TAD sink 608.

In some embodiments, a transport layer includes a source transport 652 in the TAD source 602 as well as a sink transport 654 in the TAD sink 604. In some embodiments, the transport layer also includes a sink transport 694 in the TAD sink 608. In some embodiments, the transport layer also manages transport topology 656 and transport topology 658. As illustrated in FIG. 6, transport topology 656 can be a Universal Serial Bus (USB) topology. However, in some embodiments, transport topology 656 can be a different transport topology than USB. As also illustrated in FIG. 6, transport topology 658 can be a Universal Serial Bus (USB) topology. However, in some embodiments, transport topology 658 can be a different transport topology than USB. In some embodiments, transport topology 656 and transport topology 658 are both the same type of transport topologies (for example, both USB technology).

In some embodiments, source 602 transmits two streams (for example, two video streams) to two different sinks 604 and 608. Sinks 604 and 608 are connected to source 602 on a same type of transport (for example, both on a USB transport), and each sink 604 and 608 includes one stream sink. FIG. 6 illustrates a system 600 in which TAD source 602 transmits two streams (for example, two video streams) from two stream sources 624 and 625. The first stream (such as a video stream) from the first steam source 624 is transmitted to stream sink 666 in TAD sink 608. The second stream (such as a video stream) from the second steam source 625 is transmitted to stream sink 626 in TAD sink 604. TAD source 602 includes a first TAD TX 634 to perform transmit control and data transfer functions for the first stream from stream source 624. TAD source 602 also includes a second TAD TX 635 to perform transmit control and data transfer functions for the second stream from stream source 625. TAD source 602 includes a first TSA 642 to adapt output of TAD TX 634 onto underlying transport 652 to transport the first stream from the TAD source 602 to the TAD sink 608. TAD source 602 includes a second TSA 643 to adapt output of TAD TX 635 onto underlying transport 652 to transport the second stream from the TAD source 602 to the TAD sink 604. TAD sink 608 includes a TAD RX 676 to implement per-stream receiving functions for the first stream, and also includes a stream sink 666 to terminate the first stream in the TAD sink 608. TAD sink 604 includes a TAD RX 636 to implement per-stream receiving functions for the second stream, and also includes a stream sink 626 to terminate the second stream in the TAD sink 604.

In some embodiments, a TAD sink can be connected to a TAD source over two different transports. The TAD source can detect this type of topology using an identifier (or ID) such as, for example, a container ID. The TAD source may target only one of the transports for a given stream (such as a video stream) based on policies (for example, internal policies). This can be configured, for example, as part of a "start stream" operation. A TAD sink can report (for example, can report in a capability structure) a delay to switch between transports, and can also report whether there is a flicker during such a switch between transports.

In some embodiments, a stream source can determine an encoding format to be used for a stream (for example, for a video stream) originated by the stream source. The encoding format can be chosen based on the transport and on capabilities of the stream sink to which the stream is being transported. In some embodiments, dynamic changes can be made to the encoding format.

Figure 7:
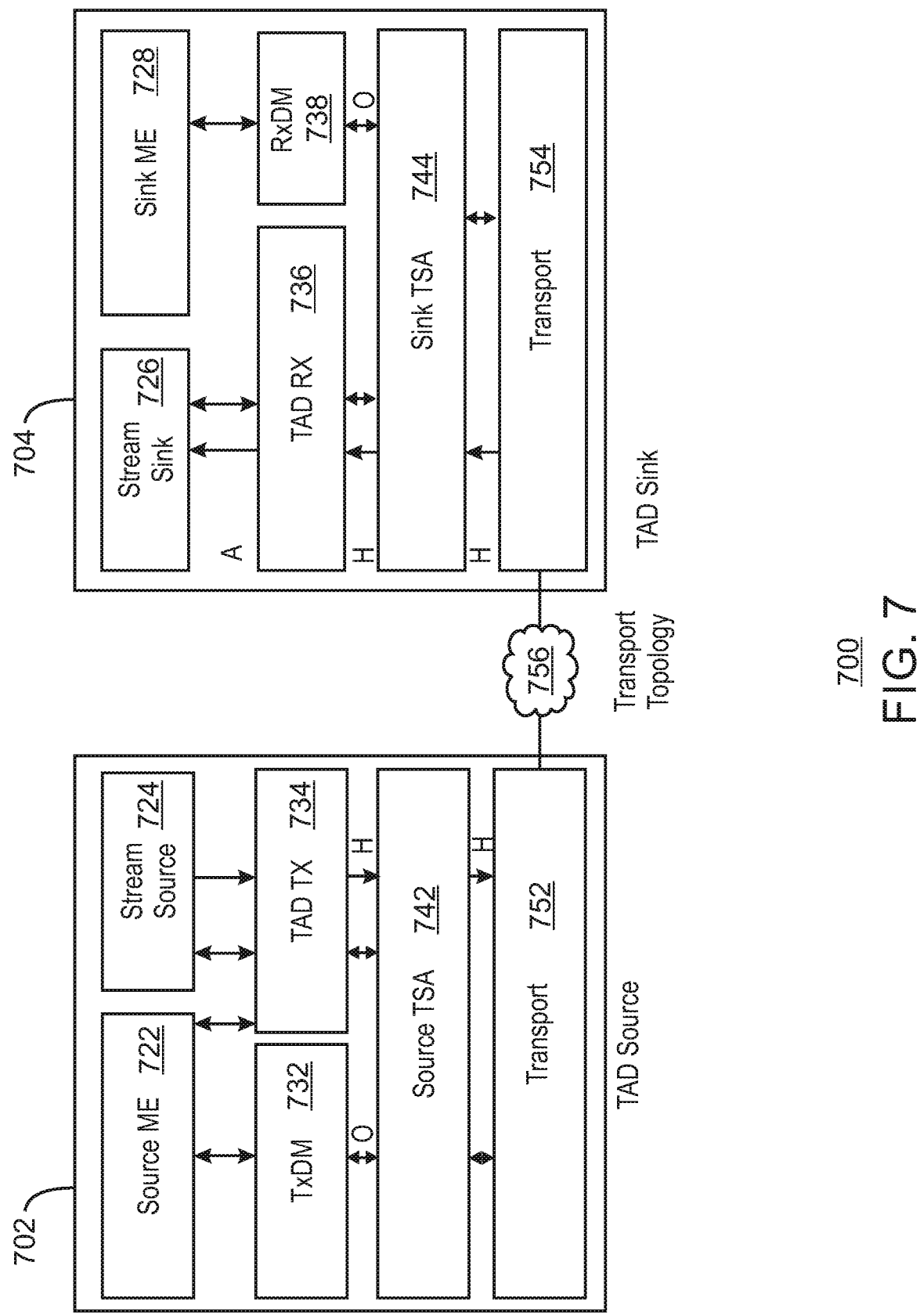
FIG. 7 illustrates source and sink streaming.

FIG. 7 illustrates a system 700 including a source 702 and a sink 704. In some embodiments, source 702 is a transport agnostic display (TAD) source. In some embodiments, sink 704 is a transport agnostic display (TAD) sink. In some embodiments, system 700 includes some or all of the elements and/or features of system 100, system 200, system 300, system 400, system 500, and/or system 600. In some embodiments, TAD source 702 includes some or all of the elements and/or features of TAD source 102, TAD source 202, TAD source 302, TAD source 402, TAD source 502, and/or TAD source 602. In some embodiments, TAD sink 704 includes some or all of the elements and/or features of TAD sink 104, TAD sink 204, TAD sink 304, TAD sink 404, TAD sink 504, TAD sink 508, TAD sink 604, and/or TAD sink 608. In some embodiments, elements in system 700 of FIG. 7 operate the same as or similar to corresponding elements in system 100 of FIG. 1, system 200 of FIG. 2, system 300 of FIG. 3, system 400 of FIG. 4, system 500 of FIG. 5, and/or in system 600 of FIG. 6.

In some embodiments, although not illustrated in FIG. 7 using dotted lines similar to those of FIG. 2, system 700 includes a streaming layer, a TAD layer, a TSA layer and a transport layer the same as or similar to streaming layer 212, TAD layer 214, TSA layer 216, and transport layer 218, respectively.

In some embodiments, a streaming layer includes a source management entity (SME) 722 and a stream source 724 in the TAD source 702 as well as a stream sink 726 and a sink management entity (SME) 728 in the TAD sink 704. In some embodiments, a TAD layer includes a transmitter device manager (TX device manager) 732 and a TAD transmitter (TAD TX) 734 in the TAD source 702 as well as a TAD receiver (TAD RX) 736 and a receiver device manager (RX device manager) 738 in the TAD sink 704. In some embodiments, a TSA layer includes a source transport-specific adaptation (source TSA) 742 in the TAD source 702 and a sink transport-specific adaptation (sink TSA) 744 in the TAD sink 704. In some embodiments, a transport layer includes a source transport 752 in the TAD source 702 as well as a sink transport 754 in the TAD sink 704. In some embodiments, the transport layer also manages transport topology 756.

In some embodiments, addressing can be implemented using a handle (for example, a handle "H" as illustrated in FIG. 7). A handle can identify a TAD RX (for example, such as TAD RX 736). Correspondingly, a handle can also identify a stream sink (for example, such as stream sink 726). A handle can also identify an RX device manager (RxDM) (for example, such as RxDM 738). Handles can be integers that have values that are greater than or equal to zero, for example. Handles can be generated by an RxDM (for example, such as RxDM) collaboratively with a sink TSA (for example, such as sink TSA 744). In a TAD source (for example, such as TAD source 702), handle values can define an address space specific to each source TSA (for example, source TSA 742).

In some embodiments, an RxDM (for example, RxDM 738) can generate a unique handle value (for example, such as handle value H in FIG. 7) for each TAD RX (for example, for TAD RX 736), and can communicate the handle value to a TxDM (for example, to TxDM 732) as part of a notification message (for example, as part of an indicate hot plug notification message). In some embodiments, handle values for a TAD RX (for example, such as TAD RX 736) can satisfy the following condition: 0<H<0xFF. In some embodiments, a handle value of zero (0) can be used to address an RxDM (for example, to address RxDm 738, and/or as illustrated by "0" in FIG. 7).

In some embodiments, a TAD TX (for example, such as TAD TX 734) and a TxDM (for example, such as TxDM 732) can address a source TSA (for example, source TSA 742) through an implementation specific manner. This can be implemented even if multiple TSA modules are included in a TAD source.

In some embodiments, each TAD RX (for example, such as TAD RX 736) can communicate with a stream sink (for example, such as stream sink 726) using an address (for example, a legacy address, and/or as illustrated by "A" in FIG. 7) that is not exposed beyond the TAD RX. Once a sink TSA (for example, such as sink TSA 744) routes TAD packets to a given TAD RX based on its assigned handle value (H), the TAD RX can translate and/or transcode the TAD packets into data or control stream constructs supported by the underlying interface (for example, underlying legacy interface), and transmit them to the address (for example, address A illustrated in FIG. 7).

Figure 8:
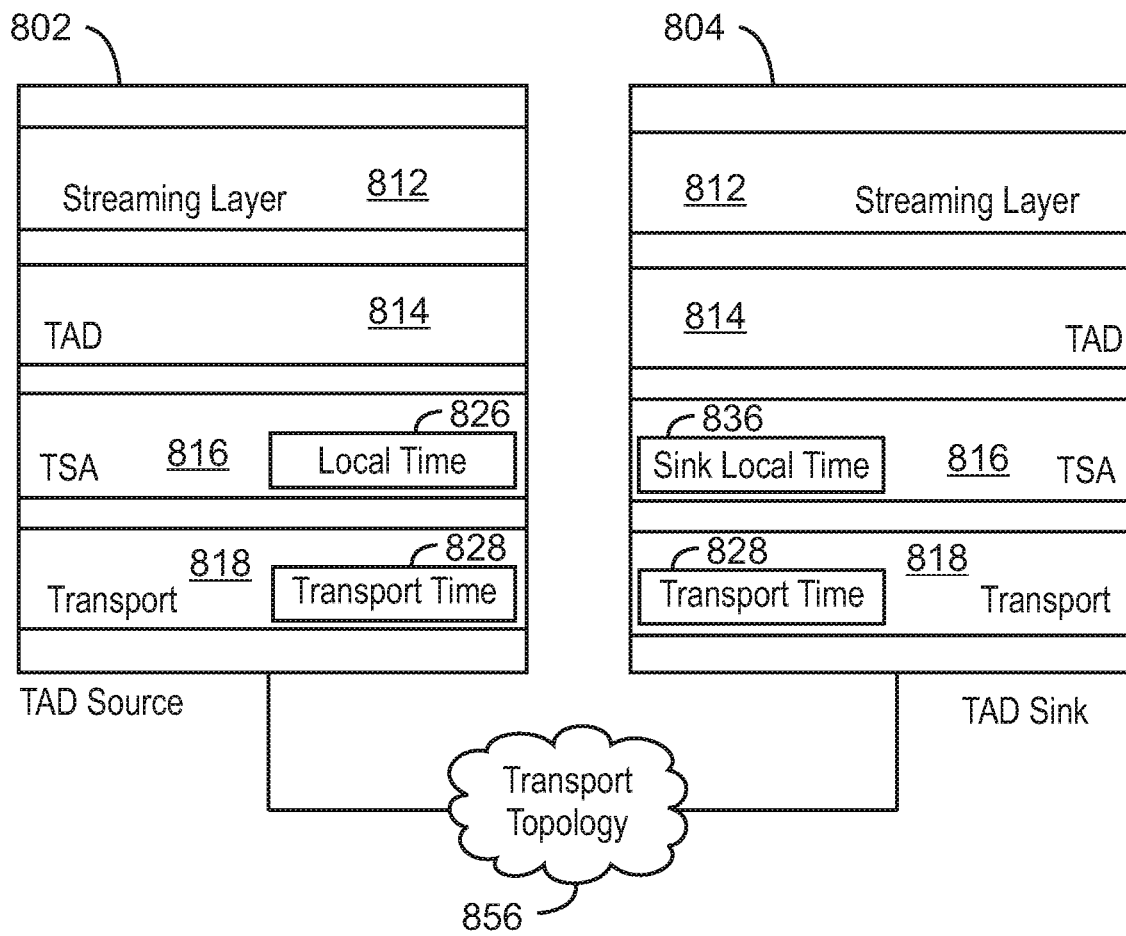
FIG. 8 illustrates source and sink streaming.

FIG. 8 illustrates a system 800 including a source 802 and a sink 804. In some embodiments, source 802 is a transport agnostic display (TAD) source. In some embodiments, sink 804 is a transport agnostic display (TAD) sink. In some embodiments, system 800 includes some or all of the elements and/or features of system 100, system 200, system 300, system 400, system 500, system 600, and/or system 700. In some embodiments, TAD source 802 includes some or all of the elements and/or features of TAD source 102, TAD source 202, TAD source 302, TAD source 402, TAD source 502, TAD source 602, and/or TAD source 702. In some embodiments, TAD sink 804 includes some or all of the elements and/or features of TAD sink 104, TAD sink 204, TAD sink 304, TAD sink 404, TAD sink 504, TAD sink 508, TAD sink 604, TAD sink 608, and/or TAD sink 704. In some embodiments, elements in system 800 of FIG. 8 operate the same as or similar to corresponding elements in system 100 of FIG. 1, system 200 of FIG. 2, system 300 of FIG. 3, system 400 of FIG. 4, system 500 of FIG. 5, system 600 of FIG. 6, and/or in system 700 of FIG. 7.

In some embodiments, FIG. 8 illustrates streaming (for example, video streaming) from a TAD source 802 to a TAD sink 804. In some embodiments, TAD source 802 is an originator of a video stream and TAD sink 804 is a destination of a video stream (and/or is a branch device). In some embodiments, TAD source 802 is a physical device that contains a TAD transmitter (TAD TX) and originates a video stream. In some embodiments, TAD sink 804 is a physical device that contains a TAD receiver (TAD RX) and receives a video stream from a TAD source such as TAD source 802. In some embodiments, FIG. 8 illustrates protocol layering involving protocol layers, including a streaming layer 812, a TAD layer 814, a transport-specific adaptation layer (TSA layer) 816, and a transport layer 818. In some embodiments, streaming layer 812, TAD layer 814, TSA layer 816, and transport layer 818 can be the same as or similar to other respective layers described herein (for example, in reference to FIG. 1 and FIG. 2). In some embodiments, transport topology 856 can be included in transport layer 818. In some embodiments, transport layer 818 manages transport topology 856. For example, transport layer 818 can be used to transport content from the TAD source 802 to the TAD sink 804 via transport topology 856.

In some embodiments, a presentation time stamp (PTS) is a time when a first pixel of a frame is displayed on a screen. For example, a PTS can be generated by a TAD source (for example, by TAD source 802), and represents a time when a frame should be displayed by a TAD sink (for example, by TAD sink 804). In some embodiments, a TAD sink (for example, such as TAD sink 804) displays the frame at time PTS or at the next refresh opportunity after PTS. A TAD source (for example, such as TAD source 802) shares a common notion of time with a TAD sink (for example, such as TAD sink 804) in order to allow the TAD source to accurately control when a frame is displayed by the TAD sink. In addition to a common time between a TAD source and a TAD sink, a framework can be defined to discover an aggregate delay through an entire transport topology between a TAD source and a TAD sink. This delay can be taken into account in generating the PTS.

In some embodiments, a local time 826 is defined as a time at the TAD source 802. In some embodiments, a sink local time 836 is defined as a time at the TAD sink 804. Local time 826 and sink local time 836 can be a common time between a TAD RX of TAD sink 804 and a TAD TX of TAD source 802. In some embodiments, local time can identify a common time between a TAD RX of a TAD sink and a TAD TX of a TAD source. In some embodiments, local time can be derived from a system time.

In some embodiments, a transport time 828 can be defined as a common time at transport layer 818 between the TAD source 802 and the TAD sink 804.

In some embodiments, a display sink may have a different clock source than a TAD sink. In such a case, in some embodiments the TAD sink can manage the resulting clock drift by stretching or shrinking frames as error accumulates.

In some embodiments, a TAD source (for example, such as TAD source 802) can sent a presentation time stamp (PTS) for each frame that is transmitted. The PTS can indicate to a TAD sink (for example, such as TAD sink 804) the local time (for example, such as local time 826) when content should be displayed. In some embodiments, the PTS value can be measured in microseconds and is an absolute value of local time.

In some embodiments, sources and sinks can support two or more modes of operations. In some embodiments, one or more sources and one or more sinks can support an accumulate mode and an immediate mode, for example In some embodiments, in an accumulate mode, a sink will only start to display data after data for the entire frame is available. This can be used as a standard mode of operation. A source sets the presentation time (PTS) taking into account transport and sink delays to ensure that the entire frame is ready for display in the sink before presentation time (PTS).

Figure 9:
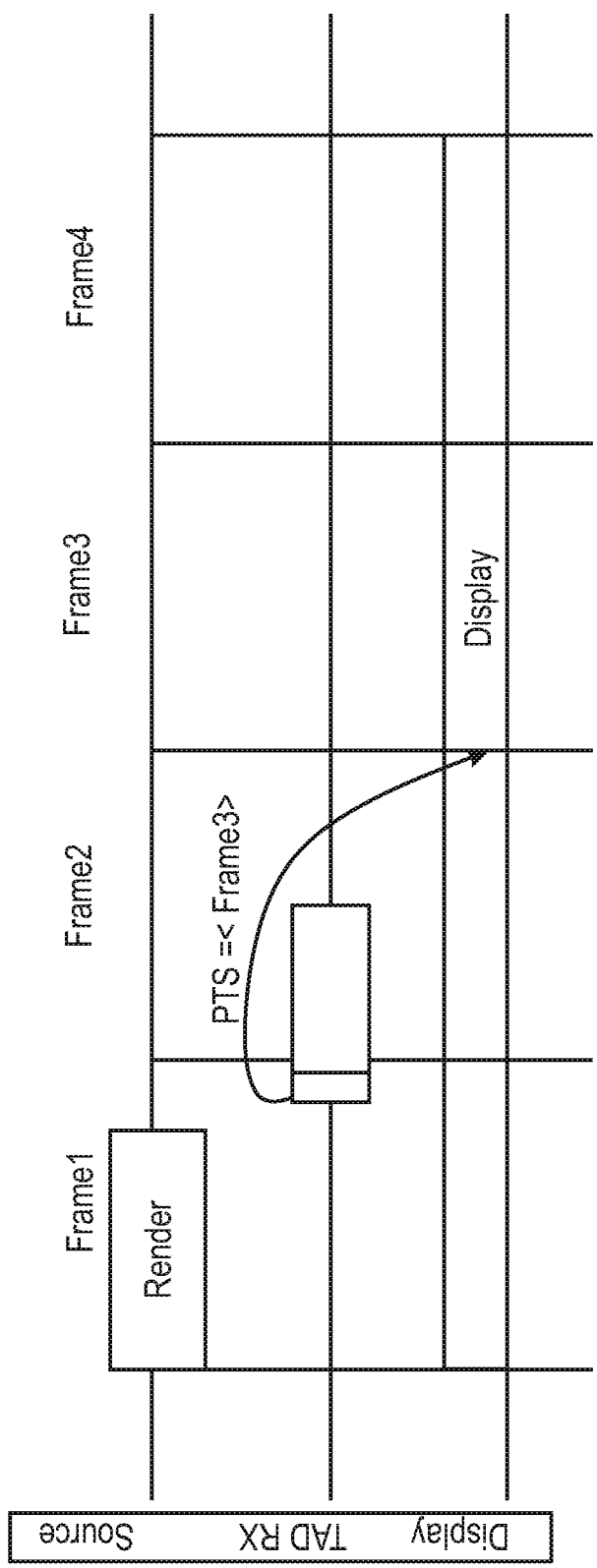
FIG. 9 illustrates a timing diagram.

FIG. 9 illustrates data display timing 900. In some embodiments, data display timing 900 illustrates an accumulate mode in which a sink starts to display data after data for an entire frame is available. In some embodiments, the accumulate mode illustrated in and described in reference to FIG. 9 can be used as a standard mode of operation.

In FIG. 9, data is rendered at a source (for example, at a TAD source) during a first frame (Frame1). The source can set the presentation time (PTS) taking into account transport and sink delays to ensure that the entire frame is available for display in the sink before the presentation time (PTS). As illustrated in FIG. 9, the frame at which the entire frame is available for display from the TAD RX (for example, a TAD RX in a sink) is at the third frame (Frame3), so the frame is displayed at Frame3.

In some embodiments, in an immediate mode, a sink will display data at a presentation time (PTS) or the next opportunity after the presentation time (PTS) even when the full frame is not ready for display. This can be used as an optional mode of operation. The immediate mode can be a low latency mode, and a source can be used to ensure that the sink display buffer does not overrun. A source sets the presentation time (PTS) taking into account transport and sink delays to ensure that necessary data is available for display before presentation time (PTS).

Figure 10:
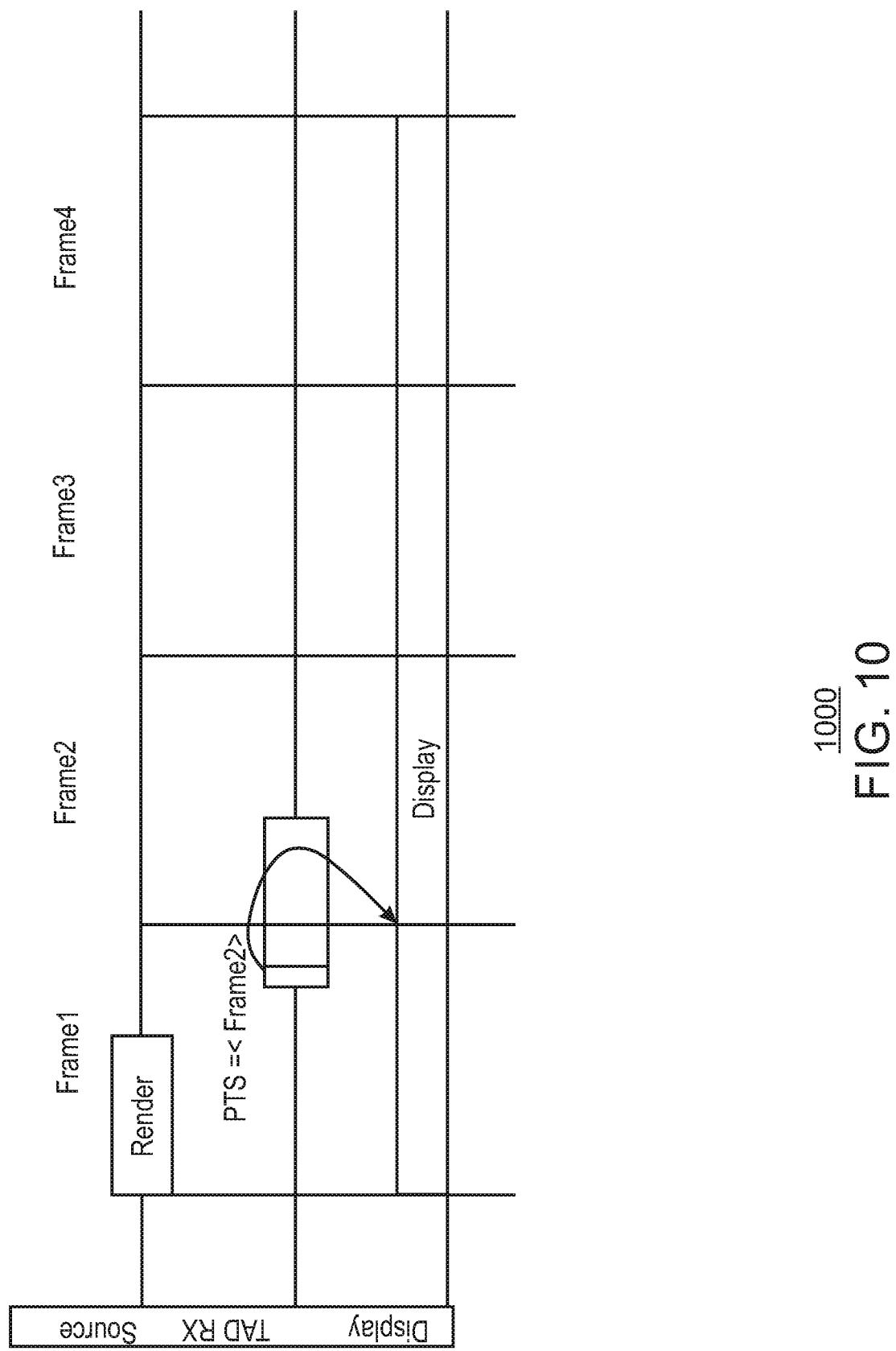
FIG. 10 illustrates a timing diagram.

FIG. 10 illustrates data display timing 1000. In some embodiments, data display timing 1000 illustrates an immediate mode in which a sink starts to display data at a presentation time (PTS) or a next opportunity after the presentation time (PTS) even when the full frame is not yet ready for display. In some embodiments, the immediate mode illustrated in and described in reference to FIG. 10 can be used as an optional mode of operation.

In FIG. 10, data is rendered at a source (for example, at a TAD source) during a first frame (Frame1). The source can set the presentation time (PTS) taking into account transport and sink delays to ensure that necessary data is available for display in the sink before the presentation time (PTS). As illustrated in FIG. 10, the frame at which the necessary data is available for display from the TAD RX (for example, a TAD RX in a sink) is at the second frame (Frame2), so the frame is displayed at Frame2.

In some embodiments, frame replay can be implemented. For example, if the source does not send a new PTS by a required refresh time of the display, a TAD sink can replay the previous frame. In some embodiments, the previous frame can also be replayed if the PTS value does not correspond to the current refresh time.

Some embodiments relate to TAD control. In some embodiments, a TAD control framework can be based on control message transactions. In some embodiments, control messages can be TAD control packets communicated between a TAD source and a TAD sink for discovery, control, configuration, and notification. Control message transactions can use control messages, which can include two types of messages. For example, control messages (and/or control message types) can include one or more request messages and one or more synchronous reply messages (SRMs). Three types of request messages can include command messages, notification messages, and asynchronous reply messages (ARMs).

In some embodiments, an initiator of a control message transaction can transmit a request (command) message or a request (notification) message, for example. The initiation usually (but not always) receives a synchronous reply message (an SRM) in response. The initiator does not receive an SRM when either the request message or the SRM is lost or damaged, for example.

In some embodiments, a responder can indicate in the SRM that it needs more time to respond with the requested data, in which case the SRM is followed by an asynchronous reply message (ARM).

In some embodiments, a request message can contain a fixed length control header and a variable length control payload, for example. In some embodiments, a control header in a request message can be defined as in Table 1 of FIGS. 24A and 24B. Table 1 of FIGS. 24A and 24B illustrates, for example, a control header in a request message.

It is noted that individual bMessageSubType fields are further described elsewhere in this specification.

In some embodiments, a control payload can be structured as in Table 2.

TABLE 2

| Offset | Field | Size | Value | Description |
| --- | --- | --- | --- | --- |
| 0 | bPayload | Variable | Request-dependent | Supplementary information for the Command or Notification Messages, or requested data in case of ARM |

It is noted that a value of 0 in the wPayloadSize field of the control header can indicate that there is no control payload fore that request message. In some embodiments, in relation to specific request messages, a control payload is assumed to not be present unless it is explicitly described therein.

In some embodiments, a synchronous reply message (SRM) can contain a fixed length control header and a variable length control payload. A header for an SRM can be structured as in Table 3 of FIG. 25 for example.

A control payload for an SRM can follow a same definition as that for a request message. A value of 0 in the wPayloadSize field of the control header can indicate that there is no control payload for that SRM. In some embodiments, as part of SRMs for specific request messages, a control payload can be assumed to not be present unless it is explicitly described therein.

Figure 11:
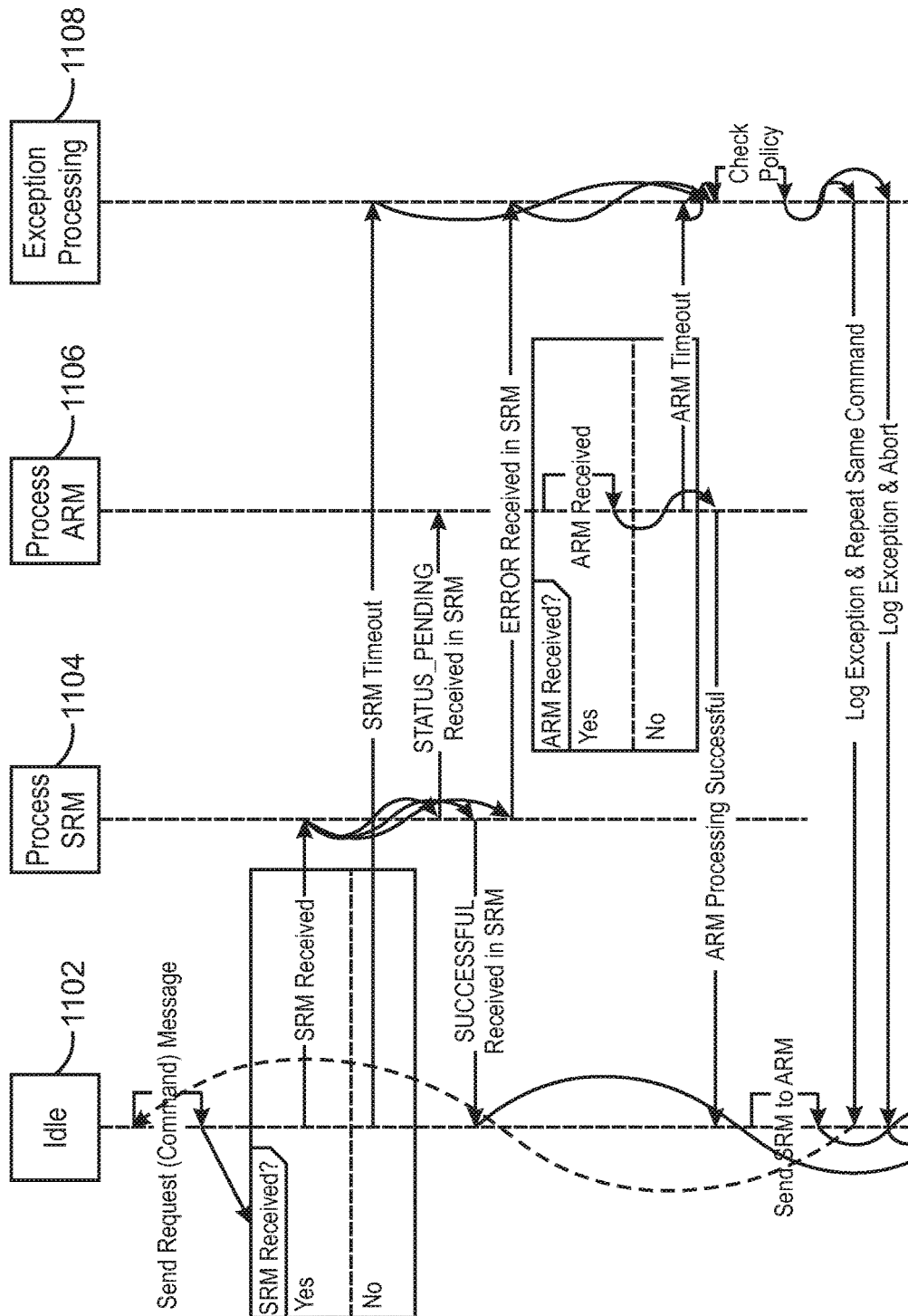
FIG. 11 illustrates a state machine diagram.

FIG. 11 illustrates a state machine 1100. In some embodiments, state machine 1100 can be a state machine for request (command) messages. State machine 1100 can include an idle state 1102, a process SRM state 1104, a process ARM state 1106, and an exception processing state 1108.

In some embodiments, a request (command) message can have one of the following outcomes:

a) The originator receives an SRM with bStatus set to STATUS_PENDING. The originator expects a subsequent ARM with requested data.

b) The originator receives an SRM with requested data (if any), and with bStatus set to SUCCESSFUL.

c) The originator receives an SRM indicating an error in the responder while processing the request message.

d) The originator times out waiting for an SRM. An SRM timeout value can be used, for example. The originator can have the option to retry the requested message a maximum number of times, or it could abort the transaction.

e) The originator times out waiting for an ARM. An ARM timeout value can be used, for example. The originator can have similar options after an ARM timeout as after an SRM timeout. For example, the originator can have the option to retry a maximum number of times, or could abort the transaction.

In some embodiments, the originator can issue another request (command) message once it is in an IDLE state such as state 1102 or in a PROCESS ARM state such as state 1106, for example.

In some embodiments, a command message can have bMessageType set to 0x1, for example.

In some embodiments, a TAD RX or a TxDM can be the only entities that can originate a command message. In some embodiments, command messages from a TxDM have bHandle set to zero, indicating RxDM as the destination. Command messages from a TAD TX can feature non-zero values for bHandle, and are previously communicated from the RxDM through an indicate hot plug notification message, for example.

In some embodiments, the TAD TX or TxDM may target certain command messages at the TSA. The TAD TX or TxDM can set the bHandle field in these command messages to the handle value for that TSA. In some embodiments, the source TSA can respond to these command messages, and does not propagate them to the TAD RX or the RxDM.

In some embodiments, a notification message can have bMessageType set to 0x2. A TAD RX, an RxDM, a sink TSA, and/or a source TSA can initiate a notification message, for example. Depending on the specific notification message, the destination can be either a TAD TX or a TxDM, for example.

In some embodiments, an asynchronous reply message (ARM) can have bMessageType set to 0x3. Any destination component of a previous command message or notification message can indicate to the originator through an SRM that it needs more time to reply with the requested data (where applicable), for example, by setting bStatus to STATUS_PENDING. Once it sends such an SRM, the destination component can respond back to the originator with an ARM within a certain time.

In some embodiments, an ARM can use the same value in the bTransactionNumber field as was used by the originator in the request (command) message to which this is a delayed response.

In some embodiments, a TSA can either deliver a TAD packet in its entirety to the destination TAD component, or not deliver it at all. In some embodiments, SRMs can be comprehensively captured for all request messages.

In some embodiments, in an initialization, a TSA and a transport can be initialized.

In some embodiments, event notification can be implemented. In some embodiments, monitor plug and unplug can be implemented. In some embodiments, an RxDM can indicate a plug or unplug of a stream sink to a TxDM using an indicate hot plug notification message. An example control payload for an indicate hot plug notification message can be illustrated in Table 4 of FIG. 26.

In some embodiments, the bHandle field in the control header for an indicate hot plug notification message can contain an RxDM handle value (for example, zero). The bTadRxHandle field in the control payload for this notification message can contain a handle value for the instance of TAD RX for the stream sink that was plugged or unplugged.

An RxDM may report different handle values for a same stream sink as part of different plug detection events. For example, a sequence featuring the same monitor may be plug, unplug, and a plug, and the RxDM may report different handle values to the TAD source as part of the indicate hot plug notification messages for each plug event.

In some embodiments, a framework can be implemented to uniquely identify specific monitors using universally unique identifiers (UUIDs).

In some embodiments, a TxDM can create a new instance of a TAD TX in response to each plug event. The TxDM can also transmit a request (command) message with bMessageSubType set to a TAD TX instantiated to a source TSA that conveyed the plug event, conveying addressing details of the newly instantiated TAD TX. This can enable the source TSA to bind the TAD TX address with the handle value associated with its corresponding TAD RX for future TAD packet routing.

Similarly, when a TxDM receives an unplug event, it can destroy the TAD TX instance that was previously associated with that stream sink that was unplugged, and can notify the source TSA of this un-instantiation through a request (command) message with bMessageSubType set to TAD TX destroyed.

In some embodiments, a TAD RX can report asynchronous events that it tracks through an indicate TAD RX event notification message to its corresponding TAD TX. It can report more than one TAD TX in each notification message. Table 5 of FIG. 27 illustrates an exemplary TAD RX event table.

In some embodiments, a source TSA reports asynchronous events in the TSA layer through an indicate TSA event notification message to the TxDM. Table 6 of FIG. 28 illustrates an example table for TSA events.

In some embodiments, a TAD RX can report asynchronous events in a stream sink through an indicate monitor event notification message to the TAD TX. An example of a monitor event message that can be reported by a TAD RX is shown in Table 7 of FIG. 29.

In some embodiments, transport capabilities can be discovered. In some embodiments, a TxDM can issue a get transport capabilities command message to a source TSA after it detects a TAD sink. In some embodiments, there is no control payload for this message. In some embodiments, the SRM for this message can return a data structure in its control payload as per the example of Table 8.

In some embodiments, a TAD TX issues a get TAD RX capabilities command message to its corresponding TAD RX after stream sink detection. In some embodiments, there is no control payload for this message.

In some embodiments, the SRM for this message returns a data structure in the control payload. For example, the data structure in the control payload can be as included herein (for example, in Table 9 of FIGS. 30A-30D). The data structure in the control payload can include stream sink capabilities that are unrelated to the display panel, and capabilities of the TAD RX.

In some embodiments, since the stream sink is downstream from the TAD RX, the table can reflect only capabilities of the TAD RX. In such embodiments, a separate command message can be added for the TAD RX to return capabilities of the stream sink. In some embodiments, the capabilities can be returned as a blob that a TAD TX can convey to its stream source. Definition of that blob (and/or a leveraging definition) can be implemented according to some embodiments.

In some embodiments, a TAD TX discovers capabilities of a stream sink by sending a get stream sink capabilities command message to its corresponding TAD RX.

In some embodiments, a TAD TX sends this command message in response to a request from the stream source. Once it gets back the requested data, the TAD TX can convey the data back to the stream source.

In some embodiments, a target of this request is a stream sink. A TAD RX can convey this request to the stream sink, and returns the data received from the stream sink back to a TAD TX (for example, as a blob in a control payload of an SRM or an ARM).

In some embodiments, a control payload for a stream sink capabilities command message contains a structure as shown in Table 10 of FIG. 31.

In some embodiments, a TAD RX returns wSize number of bytes in a control payload of an SRM or an ARM.

In some embodiments, status communication is implemented. In some embodiments, a TAD TX queries for status and statistics being maintained in a TAD RX by sending a get TAD RX status command message to a corresponding TAD RX.

In some embodiments, a TAD RX returns a structure in the control payload of the SRM. An example of such a structure is shown in Table 11.

TABLE 8

| Offset | Field | Size | Value | Description |
|---|---|---|---|---|
| 0 | Counter granularity | | Number | Placeholder |
| 1 | Average transport bandwidth | | Number | Average transport bandwidth measured over the duration of a video frame |
| | Max peak bandwidth | | Number | High peak bandwidth that was used temporarily over three consecutive video frames |
| | Error reporting capability | | | Placeholder |
| | Ability to guarantee bandwidth | | | Placeholder |
| | TSA Transfer Unit Size | | | |

TABLE 11

| Offset | Field | Size | Value | Description |
|---|---|---|---|---|
| 0 | wFramesDropped | 2 | Number | Number of frames dropped in transport or in TAD RX since start of the current stream. This number is reset when the current stream is terminated |
| 2 | wStreamSinkStatsSize | 2 | Number | Size in bytes of the blob containing Stream Sink statistics that follows |
| 4 | sStreamSinkStatsBlob | variable | Blob | Data structure containing statistics from the Stream Sink. TAD TX conveys this blob to the Stream Source. |

In some embodiments, since decode and any subsequent post-processing happens in a stream sink, the stream sink is the entity that tracks realized PTS and associated statistics. The stream sink can also track current link bandwidth from the highest level transmitter (for example, from the highest level legacy transmitter) in the TAD sink to the display panel.

In some embodiments, a TxDM queries for status and statistics being maintained in a TSA layer by sending a get TSA status command message to a source TSA.

In some embodiments, a TSA returns a structure in the control payload of an SRM as shown in Table 12.

TABLE 12

| Offset | Field | Size | Value | Description |
|---|---|---|---|---|
| 0 | wPacketsDropped | 2 | Number | Number of packets dropped in the transport layer since TAD Sink was detected. This counter wraps. The counter is reset when link is powered down |
| 2 | wBandwidthAvailable | 2 | Number | Currently total available bandwidth in the transport layer |
| 4 | wAverageLatency | 2 | Number | Average latency for packets to be delivered from this TAD Source to the corresponding TAD Sink |

Figure 12:
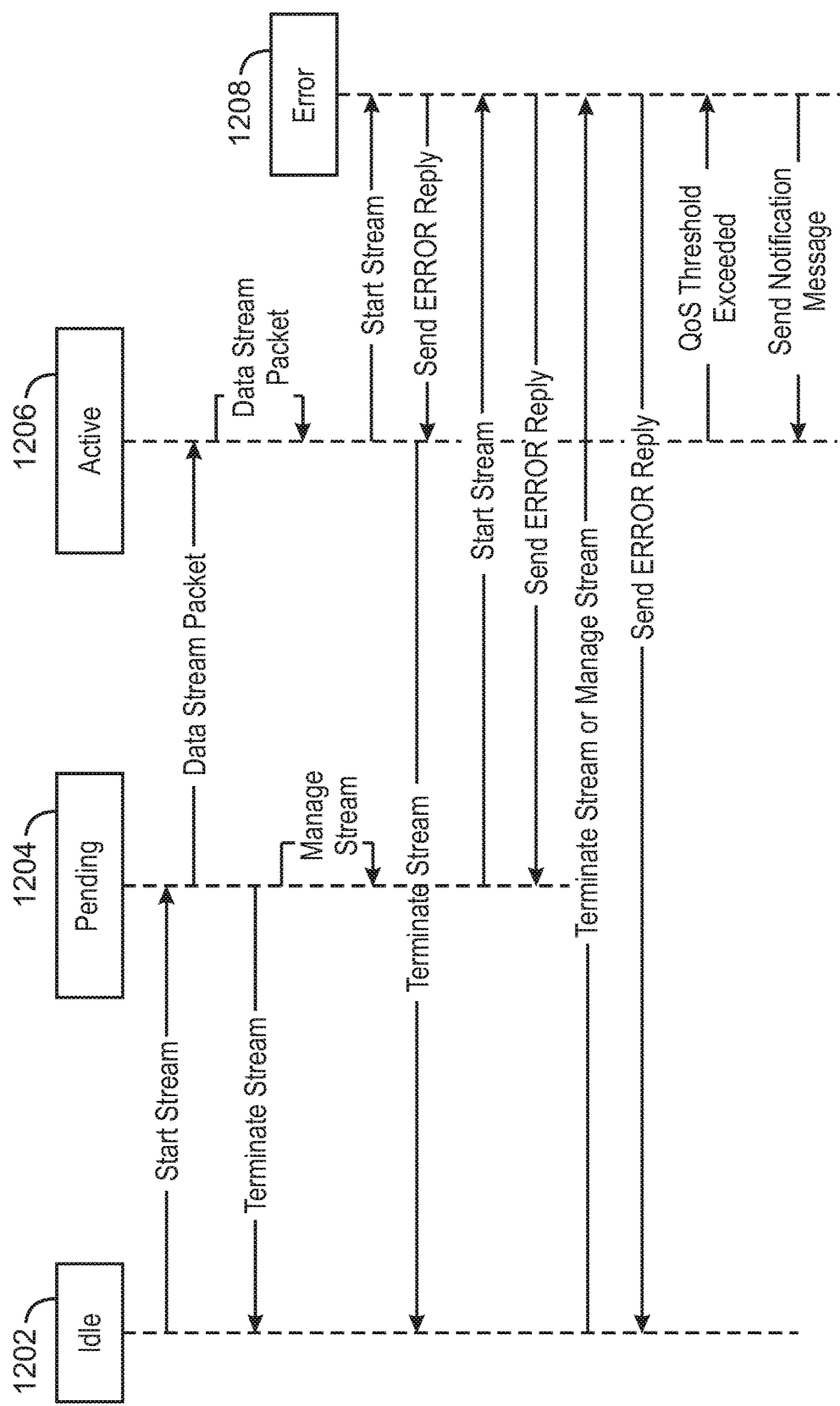
FIG. 12 illustrates a state machine diagram.

FIG. 12 illustrates a state diagram 1200. In some embodiments, state diagram 1200 can be implemented by a TAD RX. In some embodiments, state diagram 1200 can be implemented by any of the TAD RX devices illustrated in any of the drawings, and/or described anywhere herein. State diagram 1200 includes an idle state 1202, a pending state 1204, an active state 1206, and an error state 1208.

In idle state 1202, a stream does not yet exist. For example, the TAD RX has not yet received a start stream command message.

In pending state 1204, the TAD RX has received a start stream command message, but has not yet received data stream packets.

In active state 1206, the TAD RX has received at least one data stream packet.

In error state 1208, the TAD RX has received an unexpected stream management related command message, or has exceeded its quality of service (QoS) error threshold, for example.

In some embodiments, offset determination for PTS is implemented.

In some embodiments, a TAD TX sends a start stream command message to its corresponding TAD RX before transmitting data stream packets. Once streaming starts, the TAD TX can send frame synchronous metadata in secondary data packets as part of the data stream.

In some embodiments, a control payload for a start stream command can include structure as shown in Table 13 of FIGS. 32A and 32B.

In some embodiments, upon receiving a start stream command message, a TAD RX can collaborate with a stream sink to perform preparatory actions for an upcoming stream (for example, for an upcoming video stream). For example, the following preparatory actions can be performed:

1) Commit bandwidth in the stream sink (for example, in a display interface such as a legacy display interface or other display interface, and for the encoder, if necessary) and any other TAD RX resources.

2) Configure resources and state in the display panel.

In some embodiments, a TAD RX can respond with an SRM only after it has completed all of these tasks, and conveys the status of these operations in the bStatus field. If needed, it can target both an SRM and an ARM.

In some embodiments, a stream may be managed (for example, by a TAD TX). In some embodiments, a TAD TX may change some parameters governing a given video stream by sending a manage stream command message to its corresponding TAD RX.

In some embodiments, these values can replace previous values from start stream and any instances of manage stream that might have been sent after the start stream command message.

In some embodiments, a control payload for a manage stream operation can contain structure shown in Table 14.

TABLE 14

| Offset | Field | Size | Value | Description |
|---|---|---|---|---|
| 0 | wQosThreshold | 2 | Number | Indicates the new threshold value for number of frames dropped to trigger a TAD RX Event Notification Message. |

TABLE 14-continued

| Offset | Field | Size | Value | Description |
|---|---|---|---|---|
| 2 | wStreamAttributes | 2 | Number | Indicates the stream attributes to be used henceforth as guidance for link configuration choices by TAD RX on its downstream link |
| 4 | | | | Other Start Stream parameters |

In some embodiments, a TAD RX returns an ERROR in the SRM control header's bStatus field if it receives a manage stream command message without a prior start stream command message.

In some embodiments, stream status may be requested. For example, a TAD TX can request status of a given video stream by sending a get stream status command message to its corresponding TAD RX.

In some embodiments, a TAD RX returns SUCCESSFUL in an SRM control header's bStatus field with a control payload as shown in Table 15 of FIG. 33.

In some embodiments, a terminate stream indication can be implemented. For example, a TAD TX can indicate termination of an existing stream by sending a terminate stream command message to its corresponding TAD RX.

In some embodiments, the TAD RX can return a SUCCESSFUL indication in a bStatus field in the SRM's control header if it was in a pending state or an active state, for example. In some embodiments, there is not control payload for this SRM. A TAD TX may terminate a stream after a start stream even though it has not transmitted any data stream packets after start stream.

In some embodiments, a TAD RX returns an ERROR indication if a bStatus field of the SRM's control header if there was no active video stream (no start stream received) when it receives a terminate stream command message.

In some embodiments, destination control can be implemented. For example, a TAD TX can optimize transport link bandwidth (for example, where possible) through add destination and remove destination command messages.

In some embodiments, transport link bandwidth can be optimized when the same stream is targeted to multiple destinations behind the same transport link. An example of this is in a topology where two DisplayPort (DP) monitors are connected downstream from a Universal Serial Bus (USB) dock that is connected to a notebook computer. In this example, scenarios can occur according to some embodiments where only one copy of the video stream need be transmitted to the USB dock, and the received frame could then be targeted onto the two DP monitors. An example where this would not occur according to some embodiments is when two USB links from the notebook are being used, with each link driving different monitors downstream.

In some embodiments, link bandwidth can be optimized on a bus downstream from the TAD RX (for example, on a legacy bus downstream from the TAD RX). This downstream bus could be, for example, in a stream sink.

In some embodiments, an add destination operation can be implemented. For example, a TxDM can transmit an add destination command message to an RxDM to add one or more TAD RX instances to an existing stream. It can do this after each TAD TX has completed stream start to it corresponding TAD TX. These stream start command messages to the new destinations can communicate PTS values when the new TAD TX instances start conveying the received frame to their respective stream sinks.

A TxDM may not send an add destination command message if only one destination exists for a given stream. The start stream command message can be sufficient to setup a single destination (for example, add destination command message is not needed). When used to add new destinations, add destination command message can enable internal housekeeping in an RxDM to associate the existing stream (for example, as identified by its current destination or destinations) to the new destinations.

A control payload for an add destination command message can list handles for all TAD RX instances, including both existing TAD RX instances and additional ones to be added. A TxDM can ensure that the list enumerates handles for existing TAD RX destinations before enumerating new ones. For example, this can imply that the first entry always lists a TAD RX that is already a destination for this stream. The control payload can be structured as shown in Table 16.

TABLE 16

| Offset | Field | Size | Value | Description |
|---|---|---|---|---|
| 0 | bHandle1 | 1 | Number | Handle for the first TAD RX instance that is a destination for the existing stream. |
| 1 | bHandle2 | 1 | Number | Handle for the second TAD RX instance that is a destination for the existing stream. Could be a new destination or an existing one. |
| N − 1 | bHandleN | 1 | Number | Handle for the nth TAD RX instance that is a destination for the existing stream. Could be a new destination or an existing one. |

In some embodiments, if an RxDM receives an add destination indication before each of the new TAD RX instances receive a start stream command message, it detects the situation (for example, through a mechanism internal to the TAD sink), and fails the add destination command message.

In some embodiments, a remove destination is implemented. For example, a TxDM can transmit a remove destination command message to an RxDM to remove one or more (or all) of the TAD RX handles from an existing stream. Once this completes, each TAD TX can transmit a terminate stream indication to its corresponding TAD RX that has been removed from the destination list.

In some embodiments, a TxDM can transmit a remove destination command message in a multi-destination scenario. In a single destination scenario, only a terminate stream command message can be sufficient.

In some embodiments, each TAD RX can transmit a terminate stream command message to its TAD RX after it has been removed from a multi-dimension stream. A TAD RX can transmit black frames, for example, after being disassociated with a remove destination command message, and before it receives a terminate stream command message.

In some embodiments, if a TAD RX that is one of several destinations for a given stream receives a terminate stream indication before it has been removed from the destination list through a remove destination command message, it can detect the condition through a device that is not internal to the TAD sink, for example, and can fail the terminate stream command message with an ERROR indication.

In some embodiments, a control payload for a remove destination command message can have the same structure (or similar structure) as that for an add destination command message.

In some embodiments, bandwidth management can be implemented. For example, a TAD TX can target separate command messages to enumerate, and subsequently commit bandwidth in preparation for an upcoming video stream.

In some embodiments, TAD RX bandwidth can be addressed. For example, a TAD TX can send a get TAD RX bandwidth command message to enumerate current bandwidth available in a TAD RX and on an interface (for example, on a legacy interface) leading up to a monitor in a stream sink.

In some embodiments, if such data is readily available in a TAD RX, it can respond by setting a bStatus field of a replay message to a SUCCESSFUL indication, and can return information in a control payload of an SRM (for example, by returning information as shown in Table 17 of FIG. 34).

In some embodiments, if the requested data is not readily available, the TAD RX can return a STATUS_PENDING indication in a bStatus field of an SRM, and can follow it up with the requested information in a subsequent ARM. That ARM can have the same (or similar) payload as described above for the SRM.

In some embodiments, TSA bandwidth can be enumerated. For example, a TAD TX can send a get TSA bandwidth command message to enumerate current bandwidth available in the TSA.

In some embodiments, if this data is readily available in a TSA, a TAD TX can respond by setting a bStatus field of the SRM to a SUCCESSFUL indication, and by returning information in the control payload as shown in Table 18 of FIG. 35, for example.

In some embodiments, if the requested data is not readily available, the TSA can return a STATUS_PENDING indication in a bStatus field of an SRM, and follow it up with the requested information in a subsequent ARM. This ARM can have the same payload as described above for an SRM.

In some embodiments, TSA bandwidth commit operation may be implemented. For example, a TAD TX can send a set TSA bandwidth command message to commit a specified amount of TSA bandwidth for an upcoming stream (for example, for an upcoming video stream).

In some embodiments, information included in Table 19 of FIG. 36 can be included in a control payload of a request message.

In some embodiments, if a TSA can successfully commit the requested bandwidth per the stated attributes, it responds by setting a bStatus field of an SRM to a SUCCESSFUL indication. In some embodiments, no further information is returned in the control payload of the SRM. If the amount of available bandwidth has changed since it was enumerated, impacting a TSA's ability to commit the requested bandwidth, it can set bStatus to an ERROR indication.

In some embodiments, TAD sink control is implemented. A TxDM can transmit a reset command message to an RxDM to get a TAD sink to a known state. The RxDM can reset its internal device and stream state, and can release bandwidth in all stream sinks.

In some embodiments, a presentation timestamp (PTS) can be used, and a local time can be set and sent to a TAD RX. In some embodiments, a TAD RX delay and a TSA delay can be obtained.

In some embodiments, content protection can be implemented. For example, if content protection is supported, a TAD source or a TAD sink device can use high bandwidth digital content protection (HDCP) interface independent adaptation (IIA) for TAD. Any version of the HDCP IIA can be used.

Figure 13:
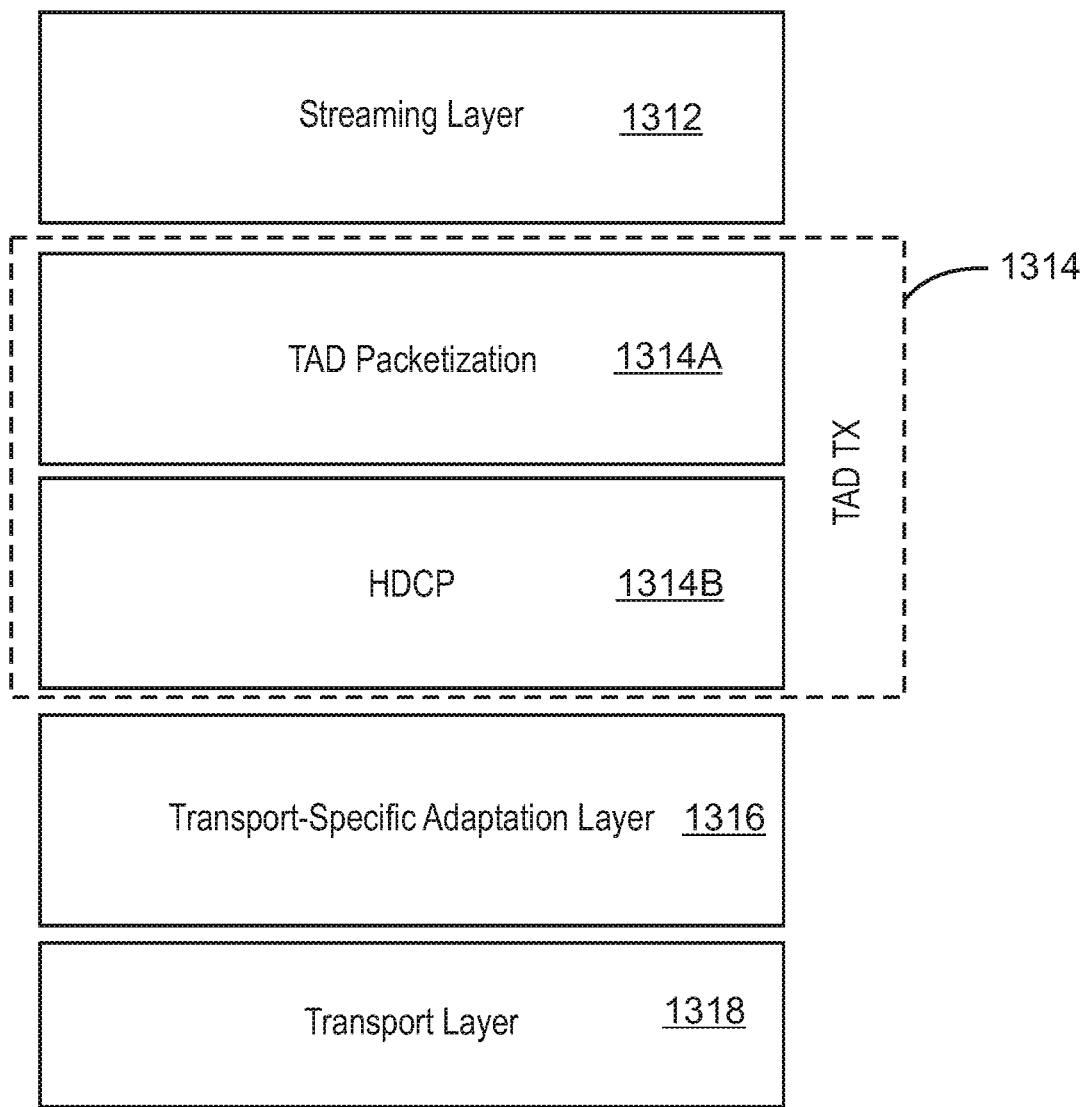
FIG. 13 illustrates protocol layering.

FIG. 13 illustrates protocol layering 1300. In some embodiments, protocol layering 1300 can be implemented with HDCP. In some embodiments, FIG. 13 illustrates protocol layering involving protocol layers, including a streaming layer 1312, a TAD layer 1314, a TSA layer 1316, and a transport layer 1318. In some embodiments, streaming layer 1312, TAD layer 1314, TSA layer 1316, and transport layer 1318 are the same as or similar to those illustrated and/or described herein. In some embodiments, TAD layer 1318 includes a TAD TX. In some embodiments, TAD layer 1318 and/or a TAD TX included in TAD layer 1318 include TAD packetization 1314A and HDCP 1314B.

In some embodiments, a TxDM conveys HDCP authentication messages as TAD control messages to an RxDM.

In some embodiments, a TAD TX (and/or TAD layer 1318 or TAD TX in TAD layer 1314) convey an HDCP encrypted stream (such as an HDCP encrypted video stream) as TAD data packets to a TAD RX.

In some embodiments, HDCP is transparent to TSA (and/or to the TSA layer 1316). The TSA (and/or TSA layer 1316) can deliver HDCP authentication messages and the encrypted stream in a TAD packet to an RxDM and a TAD RX respectively, without taking any action on the payload.

In some embodiments, a TAD RX is potentially an HDCP repeater. It can decrypt the received stream (for example, the received video stream), can transcode the frame to its downstream interface (for example, to its downstream legacy interface), and can re-encrypt it as necessary.

In some embodiments, a TAD TX can initiate HDCP authentication only after it receives a plug event through an indicate hot plug notification message of an HDCP capable stream sink, and can re-initiate HDCP authentication with each subsequent plug indication for unauthenticated monitors (for example, per HDCP IIA).

In some embodiments, a TAD sink is not an HDCP repeater when it only has one or more embedded sink(s) and no downstream sinks that are HDCP capable.

In some embodiments, a TAD source maintains an SRM and performs revocation checks for all HDCP receivers.

In some embodiments, a TAD source and a TAD sink share a single session key regardless of a number of video streams being encrypted.

In some embodiments, a TAD TX transmits a stream counter and an input counter value for a video stream that is being encrypted.

In some embodiments, stream and input counters are carried in a TAD header of the main stream data transfers and the payload of the main stream data transfers is encrypted.

In some embodiments, authentication messages conform to a syntax defined in the HDCP IIA.

Figure 14:
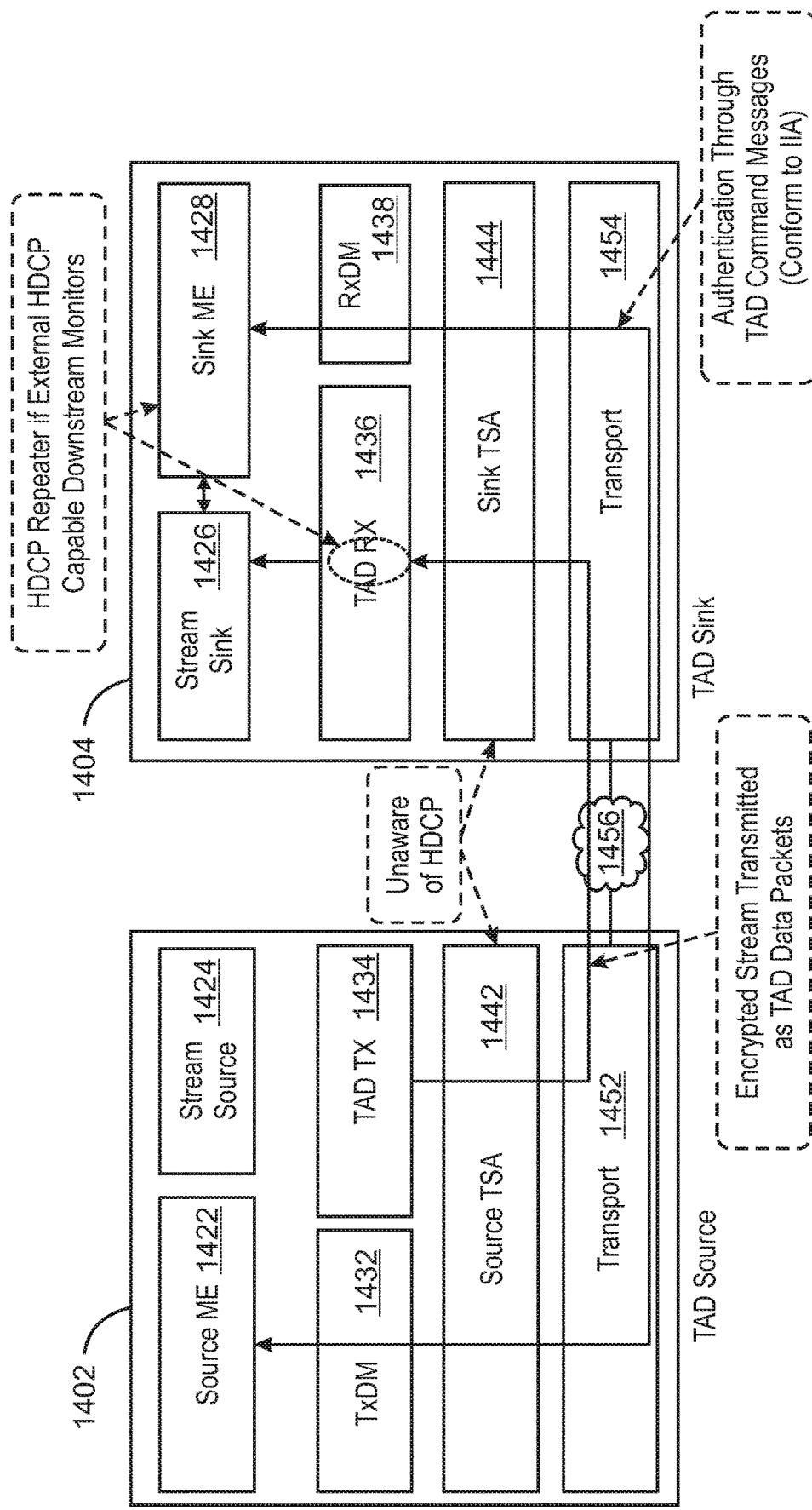
FIG. 14 illustrates source and sink streaming.

FIG. 14 illustrates a system 1400 including a source 1402 and a sink 1404. In some embodiments, source 1402 is a transport agnostic display (TAD) source. In some embodiments, sink 1404 is a transport agnostic display (TAD) sink. In some embodiments, system 1400 is the same as or similar to any other systems illustrated and described herein. In some embodiments, TAD source 1402 is the same as or similar to any other source illustrated or described herein. In some embodiments, TAD sink 1404 is the same as or similar to any other sink illustrated or described herein.

In some embodiments, FIG. 14 illustrates protocol layering involving protocol layers, including a streaming layer, a TAD layer, a TSA layer, and a transport layer. In some embodiments, the streaming layer, TAD layer, TSA layer, and transport layer are the same as or similar to any other layers described or illustrated herein.

In some embodiments, a streaming layer includes a source management entity (SME) 1422 and a stream source 1424 in the TAD source 1402 as well as a stream sink 1426 and a sink management entity (SME) 1428 in the TAD sink 1404. In some embodiments, a TAD layer includes a transmitter device manager (TX device manager) 1432 and a TAD transmitter (TAD TX) 1434 in the TAD source 1402 as well as a TAD receiver (TAD RX) 1436 and a receiver device manager (RX device manager) 1438 in the TAD sink 1404. In some embodiments, a TSA layer includes a source transport-specific adaptation (source TSA) 1442 in the TAD source 1402 and a sink transport-specific adaptation (sink TSA) 1444 in the TAD sink 1404. In some embodiments, a transport layer includes a source transport 1452 in the TAD source 1402 as well as a sink transport 1454 in the TAD sink 1404. In some embodiments, the transport layer also includes and/or manages transport topology 1456.

In some embodiments, authentication through TAD control messages (for example, conforming to HDCP HA) are sent through all or some of source ME 1422, TxDM 1432, source TSA 1442, transport 1452, topology 1456, transport 1454, sink TSA 1444, TxDM 1438, and sink ME 1428. In some embodiments, one or more encrypted stream is transmitted as TAD data packets through all or some of TADTX 1434, source TSA 1442, transport 1452, topology 1456, transport 1454, sink TSA 1444, TAD RX 1436 and stream sink 1426. In some embodiments, the encrypted stream(s) is/are transmitted in a manner that source TSA 1442 and/or sink TSA 1444 are unaware of encryption (such as HDCP). In some embodiments, TAD RX 1436 and/or sink ME 1428 can include an HDCP repeater (for example, if external HDCP capable downstream monitors are in the system).

In some embodiments, TxDM 1432 conveys HDCP authentication messages as TAD control messages to RxDM 1438.

In some embodiments, TAD TX 1434 (and/or the TAD layer) convey an HDCP encrypted stream (such as an HDCP encrypted video stream) as TAD data packets to TAD RX 1436.

In some embodiments, HDCP is transparent to the source TSA 1442 and/or the sink TSA 1444 (and/or to the TSA layer). The source TSA 1442 and/or the sink TSA 1444 (and/or the TSA layer) can deliver HDCP authentication messages and the encrypted stream in a TAD packet to RxDM 1438 and TAD RX 1436, respectively, without taking any action on the payload.

In some embodiments, TAD RX 1436 is potentially an HDCP repeater. It can decrypt the received stream (for example, the received video stream), can transcode the frame to its downstream interface (for example, to its downstream legacy interface), and can re-encrypt it as necessary.

In some embodiments, TAD TX 1434 can initiate HDCP authentication only after it receives a plug event through an indicate hot plug notification message of an HDCP capable stream sink, and can re-initiate HDCP authentication with each subsequent plug indication for unauthenticated monitors (for example, per HDCP IIA).

In some embodiments, TAD sink 1404 is not an HDCP repeater when it only has one or more embedded sink(s) and no downstream sinks that are HDCP capable.

In some embodiments, TAD source 1402 maintains an SRM and performs revocation checks for all HDCP receivers.

In some embodiments, TAD source 1402 and TAD sink 1404 share a single session key regardless of a number of video streams being encrypted.

In some embodiments, TAD TX 1434 transmits a stream counter and an input counter value for a video stream that is being encrypted.

In some embodiments, in system 1400, stream and input counters are carried in a TAD header of the main stream data transfers and the payload of the main stream data transfers is encrypted.

In some embodiments, in system 1400, authentication messages conform to a syntax defined in the HDCP IIA.

In some embodiments, authentication messages can be handled by a sink ME at the TAD sink as opposed to the TAD RX.

In some embodiments, TAD data streams can be organized into main stream data transfer units and secondary data transfer units. Main stream data transfer units can include, for example, TAD data packets carrying a compressed or uncompressed stream (for example, carrying a compressed or uncompressed video stream). Main stream data can be composed of compressed or uncompressed pixel data. Main stream data may optionally be encrypted. Secondary data transfer units can include, for example, TAD data packets carrying secondary data that can be used to recreate the frame. Secondary data can be composed of metadata packets that can be used by the sink to recreate the main stream (for example, can be used by the sink to recreate the main video stream).

Some embodiments relate to display stream organization. For example, in some embodiments, every main stream data transfer unit (for example, every main video stream data transfer unit) can start with a header followed by a variable length payload.

Figure 15:
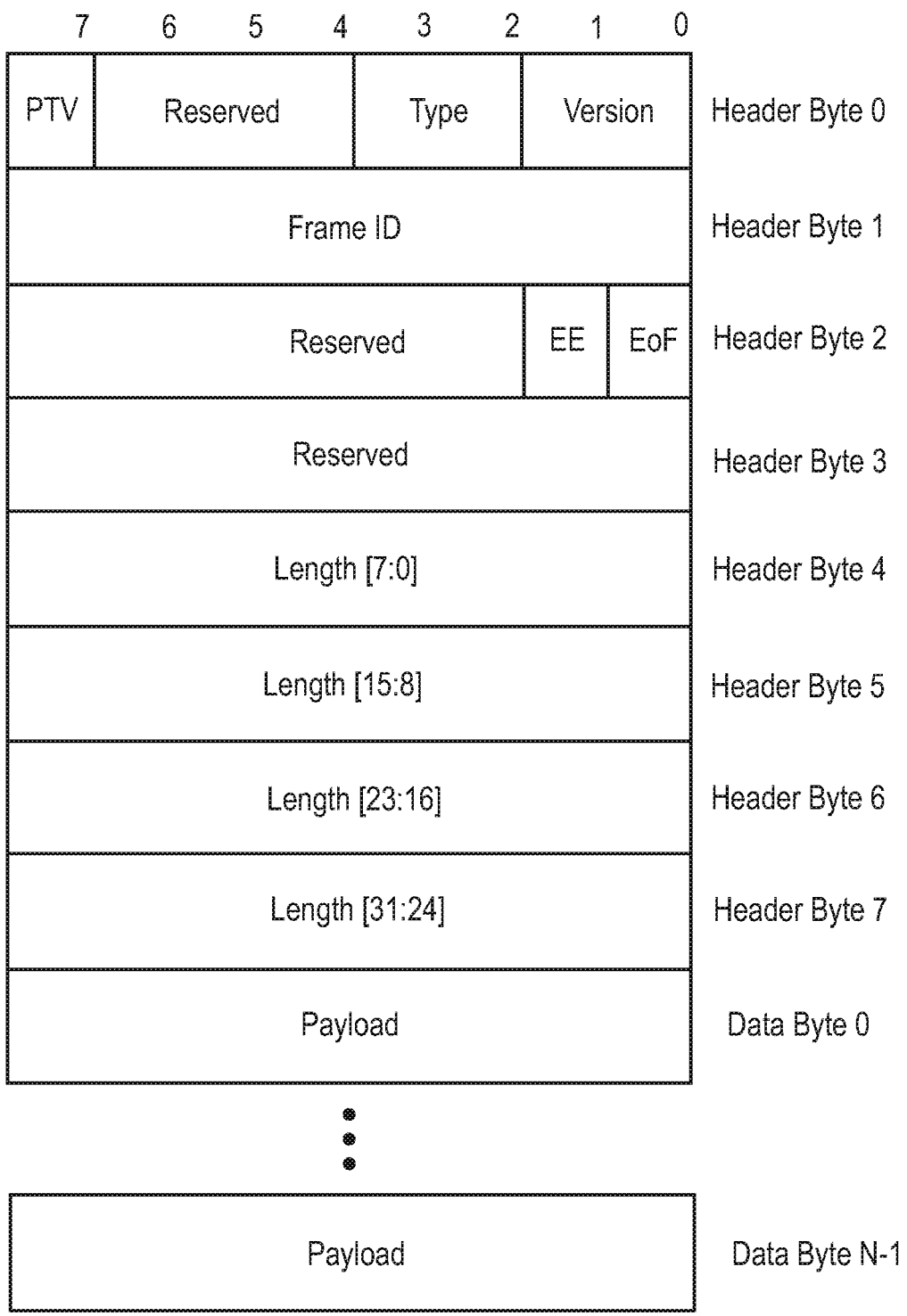
FIG. 15 illustrates a video data packet.

FIG. 15 illustrates a video data packet 1500. Video data packet 1500 includes a header followed by a variable length payload. For example, the header can include header bytes 0, 1, 2, 3, 4, 5, 6 and 7. For example, the variable length payload can include data bytes 0, . . . , N−1.

An exemplary display stream header is shown in Table 20 of FIG. 37.

In some embodiments, a main stream data transfer unit (MDT) can start with a display stream header followed by a variable length payload. In some embodiments, all main stream data transfer units can contain pixel data for a rectangular region. The first eight bytes of the MDT can specify a rectangular area of the frame in {(X1, Y1), (X2, Y2)} coordinates for data contained within the MDT. In some embodiments, the MDT may contain pixel data for the entire frame, for example {(0, 0), (Xmax, Ymax)}, or a portion thereof. In some embodiments, pixel data for an entire frame may be transferred as one MDT, or as a collection of more than one MDT (for example, as a collection of several MDTs).

Figure 16:
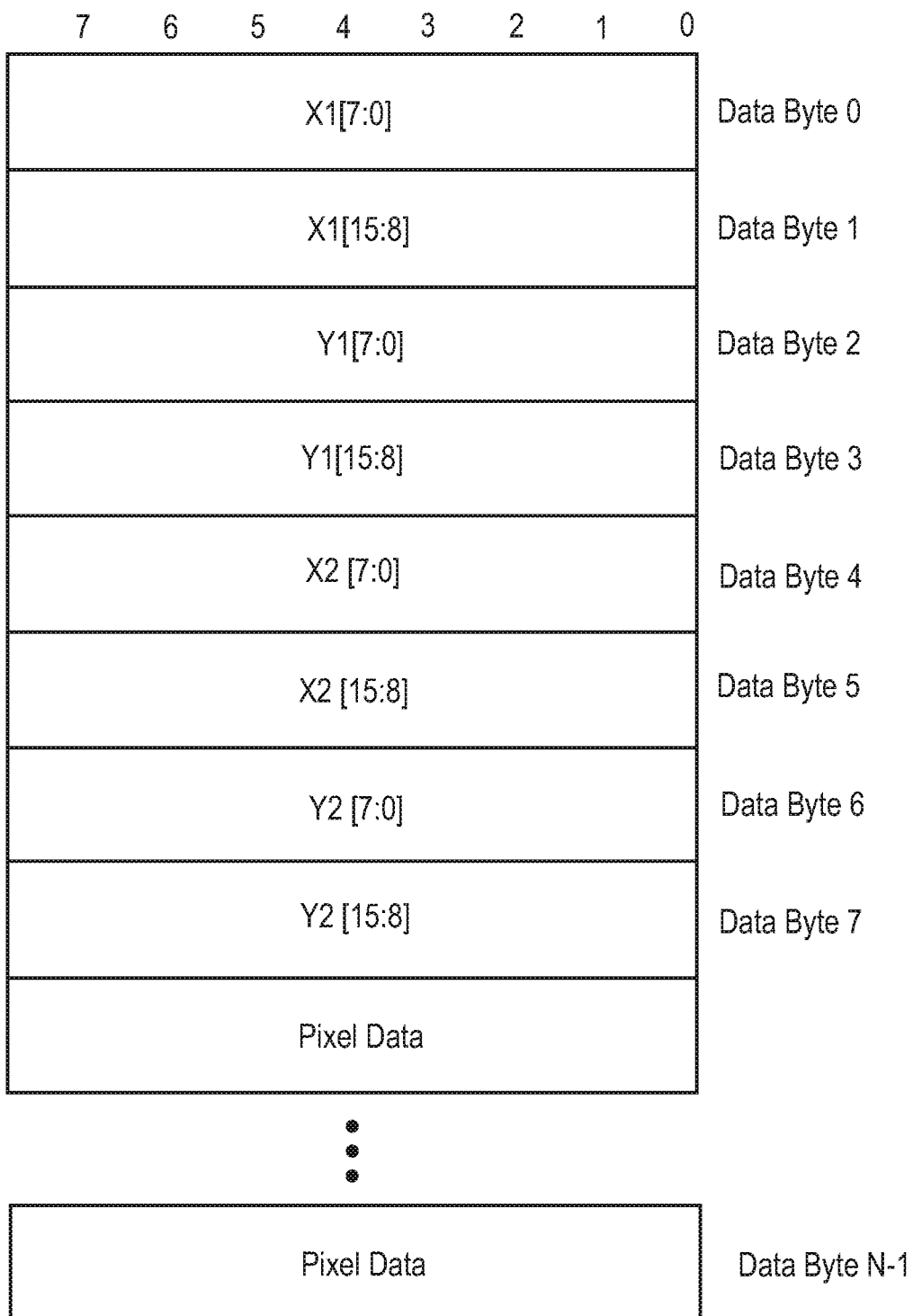
FIG. 16 illustrates a main stream data payload.

FIG. 16 illustrates a main stream data payload 1600. Payload 1600 can include a display stream payload layout used when sending a full frame or a partial frame display stream over a transport.

Table 21 includes an example data packet payload according to some embodiments.

TABLE 21

| Offset [Byte:bit] | Field | Value | Description |
|---|---|---|---|
| [0:0] [1:0] | Region | Number | X1: X-coordinate of the Upper-Left corner of the section of the frame being updated with the pixel data contained in this MDT. |
| [2:0] [3:0] | Region | Number | Y1: Y-coordinate of the Upper-Left corner of the section of the frame being updated with the pixel data contained in this MDT |
| [4:0] [5:0] | Region | Number | X2: coordinate of the Upper-Left corner of the section of the frame being updated with the pixel data contained in this MDT |
| [6:0] [7:0] | Region | Number | Y2: Y-coordinate of the Upper-Left corner of the section of the frame being updated with the pixel data contained in this MDT |
| [8:0] | Payload | Data | Payload. Pixel data for the specified region. Note that various pixel data encoding formats are defined, where the specific format for this Frame ID will be negotiated either statically through the Control Stream or dynamically via a Metadata Transfer Unit. |

In some embodiments, pixel data within an MDT can be arranged in raster order.

In some embodiments, a secondary data transfer unit (SDT) can start with a display stream header followed by a variable length payload.

Figure 17:
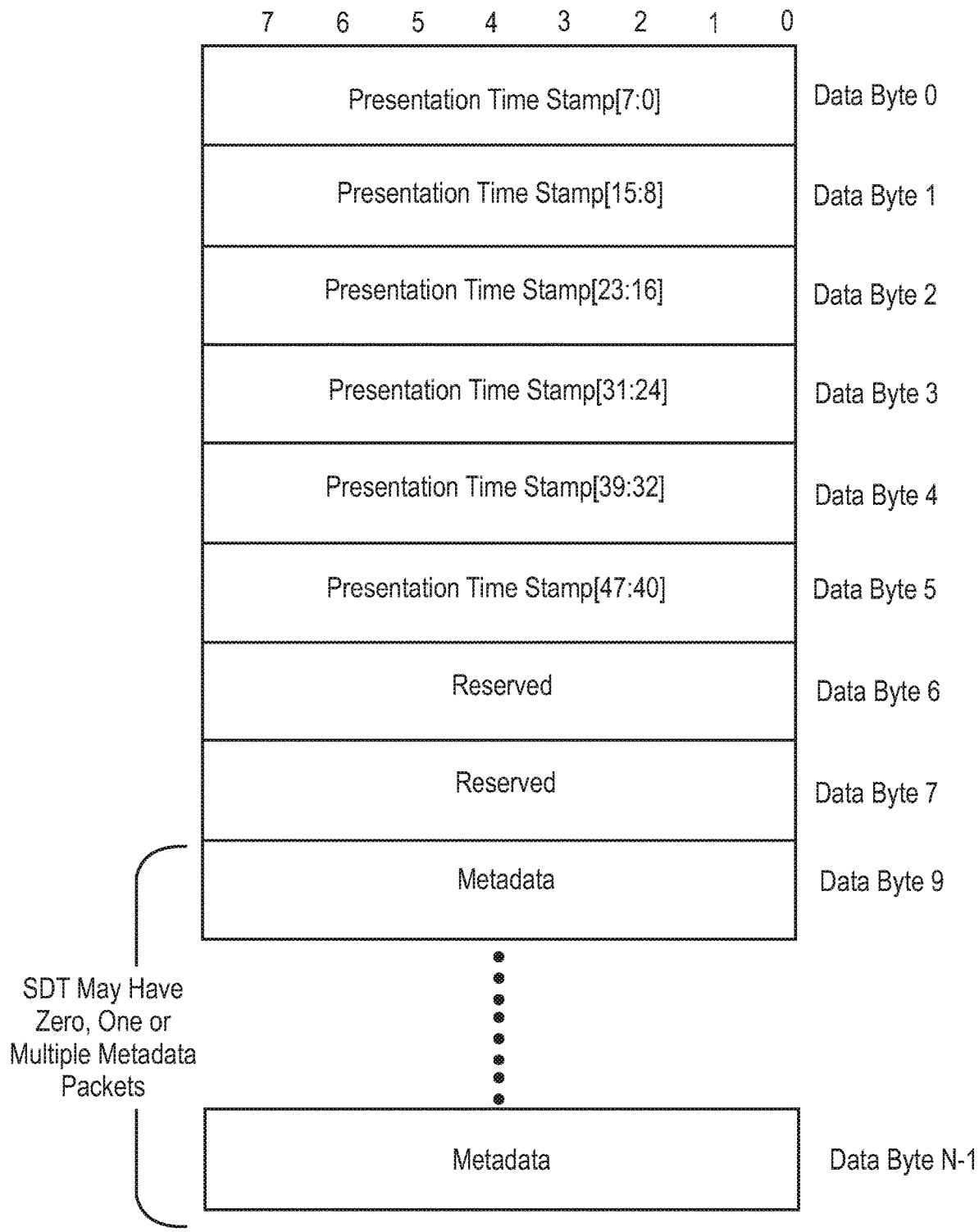
FIG. 17 illustrates a secondary data payload.

FIG. 17 illustrates a secondary data payload 1700. In some embodiments, format of a secondary data stream is illustrated in FIG. 17 and described in Table 22. Table 22 shows secondary data packet fields.

TABLE 22

| Offset [Byte:bit] | Field | Value | Description |
|---|---|---|---|
| [0:0] | PTS0 | Number | Presentation Timestamp. Bit 7:0 of the 48-bit timestamp value specifying a counter value in microseconds when scan-out of the pixel data for the corresponding frame (Frame ID) should begin. Only Valid when bit 7 of header byte 0 is set to '1'. Reserved when Type = 0 |
| [1:0] | PTS1 | Number | Presentation Timestamp. Bit 15:8 of the 48-bit timestamp value |
| [2:0] | PTS2 | Number | Presentation Timestamp. Bit 23:16 of the 48-bit timestamp value |
| [3:0] | PTS3 | Number | Presentation Timestamp. Bit 31:24 of the 48-bit timestamp value |
| [4:0] | PTS4 | Number | Presentation Timestamp. Bit 39:32 of the 48-bit timestamp value |
| [5:0] | PTS5 | Number | Presentation Timestamp. Bit 39:32 of the 48-bit timestamp value |
| [6:0] | Reserved | Reserved | Reserved. |
| [7:0] | Reserved | Reserved | Reserved |
| [8:0] | Payload | Data | Payload. Zero or more Metadata Entries. |

In some embodiments, every SDT can start with a display stream header followed by a variable length payload. A PTV bit in Header Byte 0 illustrated in FIG. 15, for example, can indicate whether an SDT contains a presentation time stamp (PTS). If that bit is set to 1, for example, the first six bytes of the data payload illustrated in FIG. 17 (Data Bytes 0, 1, 2, 3, 4, 5) can indicate the presentation time stamp (PTS). If that bit is set to 0, for example, those bytes (Data Bytes 0, 1, 2, 3, 4, 5) can be reserved. In some embodiments, secondary data transfer units (SDTs) for frame N may be transmitted interleaved with frame N−1 main stream data transfer units (MDTs), or along with frame N main stream data transfer units (MDTs), for example.

A format of an example secondary data stream is illustrated in FIG. 17 and described in Table 22. In some embodiments, secondary data packet payload consists of zero or more metadata transfers.

Figure 18:
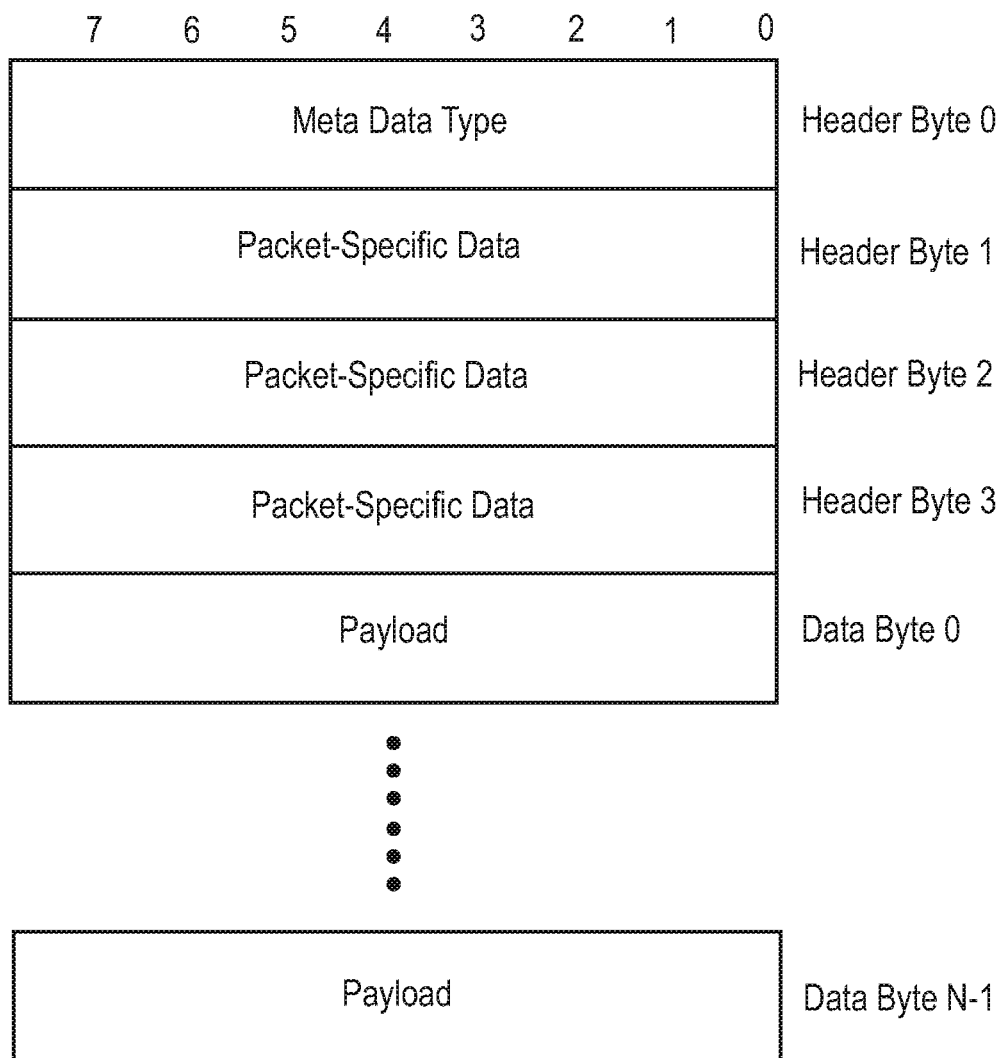
FIG. 18 illustrates a metadata entry format.

FIG. 18 illustrates a metadata entry format 1800. In some embodiments, a metadata entry includes four bytes of header followed by metadata payload bytes. For example, format 1800 includes four bytes (Header Byte 0, 1, 2, 4) of header followed by N bytes (Data Byte 0, . . . , N−1) of metadata payload bytes.

Example metadata packet types are shown in Table 23.

TABLE 23

| Encoding/ID | Description |
|---|---|
| 00h | Reserved |
| 01h | DYNAMIC_ENCODING_FORMAT |
| 02h through 0Fh | Reserved |
| 10h | PICTURE_PARAMETER_SET |

TABLE 23-continued

| Encoding/ID | Description |
|---|---|
| 0x80 + InfoFrameType | INFOFRAME Packet Reserved |

Figure 19:
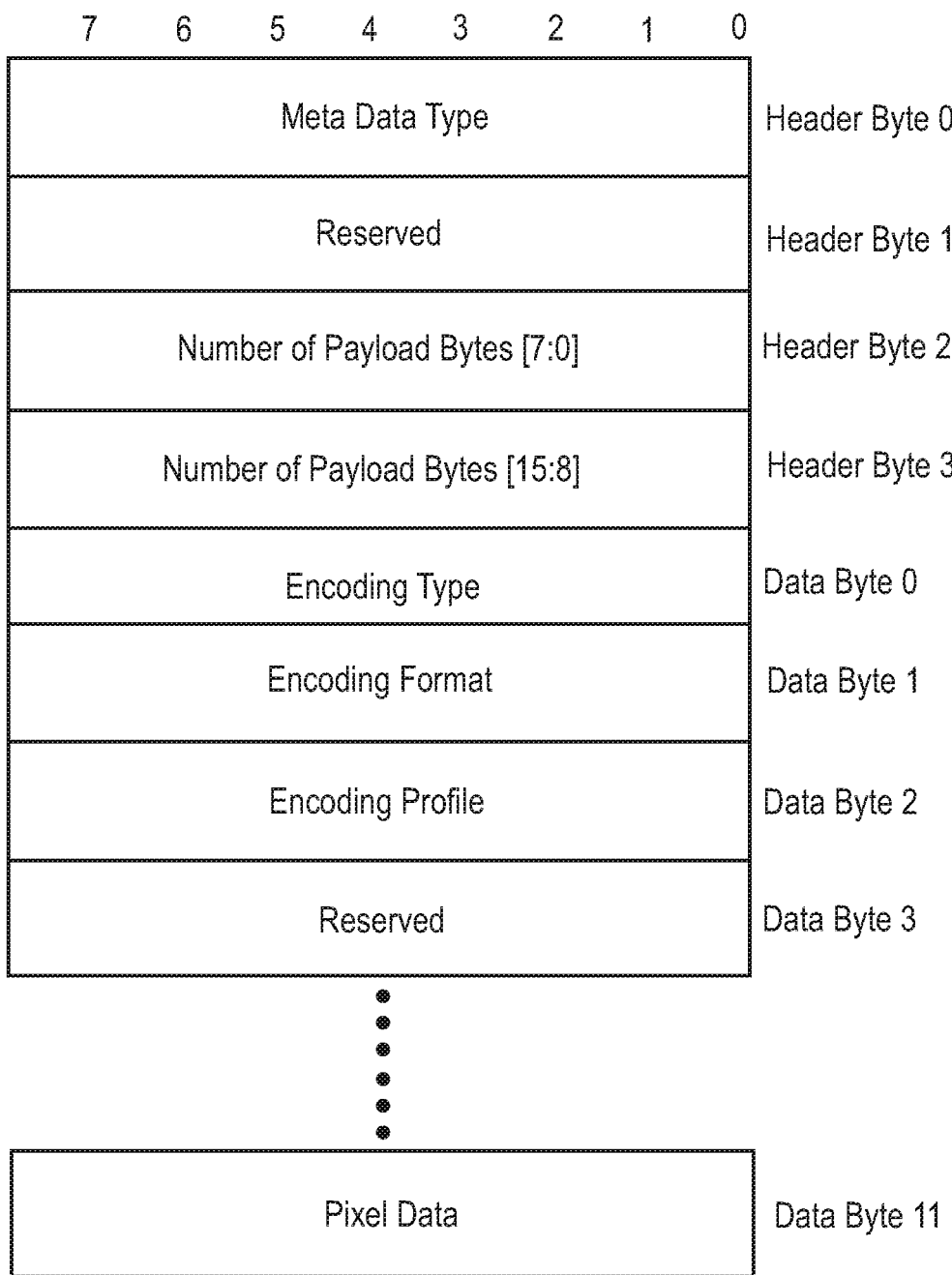
FIG. 19 illustrates an encoding format.

FIG. 19 illustrates a dynamic encoding format 1900. In some embodiments, a metadata entry with an entry type of DYNAMIC_ENCODING_FORMAT includes the format 1900 illustrated in FIG. 19 and described in Table 24 of FIGS. 38A and 38B. Table 24 of FIGS. 38A and 38B shows encoding format metadata entry fields.

Figure 20:
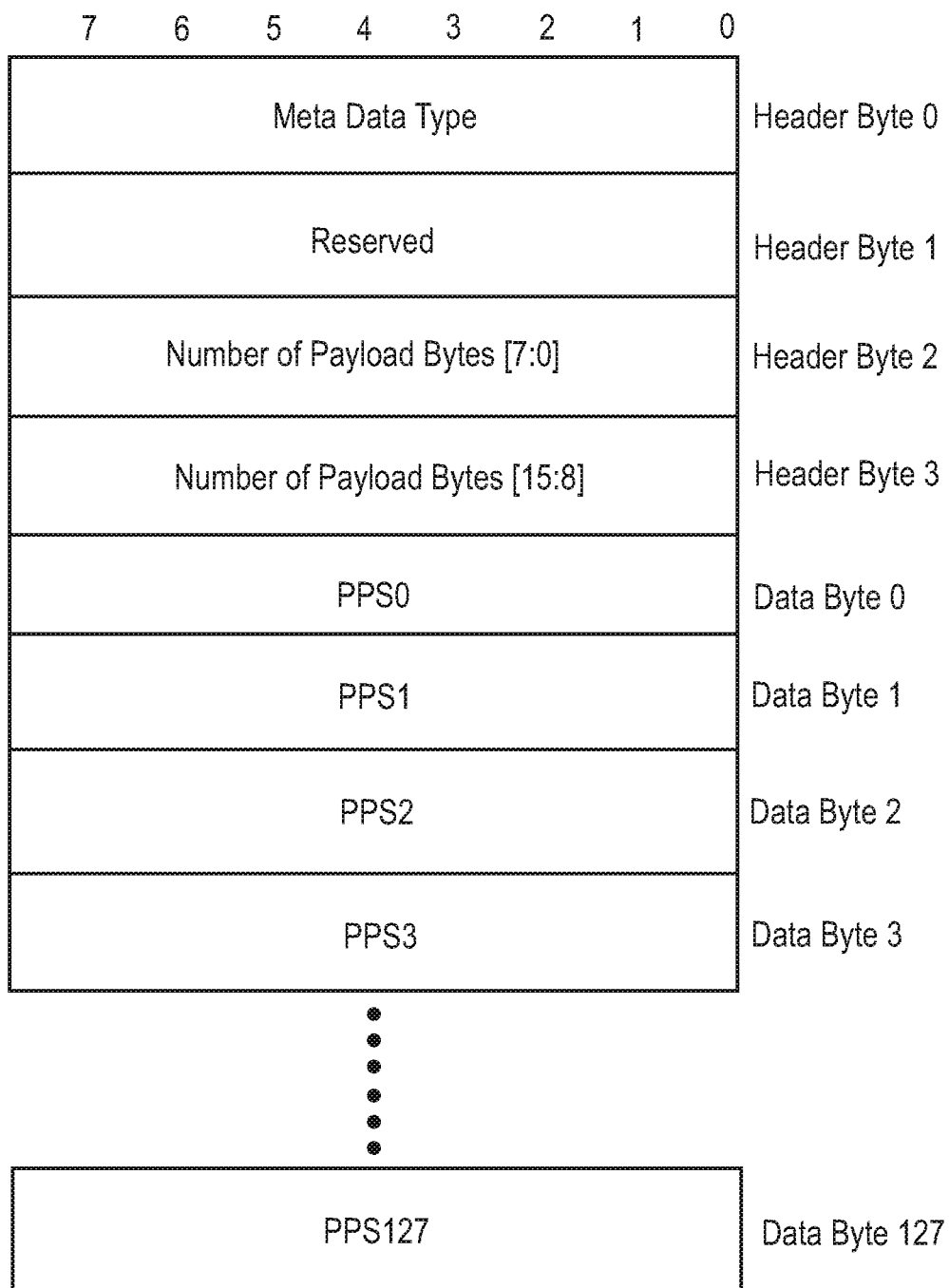
FIG. 20 illustrates a parameter set format.

FIG. 20 illustrates a picture parameter set format 2000, and Table 25 shows an example picture parameter set metadata entry fields.

TABLE 25

| Offset [Byte:bit] | Field | Size | Value | Description |
|---|---|---|---|---|
| [0:0] | Entry Type | 8 | Constant | DSC_PICTURE_PARAMETER_SET |
| [1:0] | Reserved | 8 | Reserved | Shall be set to zero. |
| [2:0] | Metadata Length | 8 | 80h | Number of Payload Bytes:LSB bits [7:0] |
| [3:0] | | 8 | 00h | Number of Payload Bytes:MSB bits [15:0] |
| [4:0]-[131:0] | Picture Parameter Set | 1024 | Number | 128 Bytes of Picture Parameter Set as defined in the PPS syntax definition in DSC v1.2a, Annex E |

In some embodiments, display streams can be sent in a continuous fashion to a TAD sink endpoint within an active interface.

In some embodiments, TAD sources and TAD sinks can support 24-bit RBG (red green blue) format. In some embodiments, other formats can be supported.

Table 26 shows and example of an 18-bit RGB stream format example.

TABLE 26

| Byte | Data |
|---|---|
| 0 | R0 - 5:0 | G0 - 5:4 |
| 1 | G0 - 3:0 | B0 - 5:2 |
| 2 | B0 - 1:0 | R1 - 5:0 |
| 3 | G1 - 5:0 | B1 - 5:4 |
| 4 | B1 - 3:0 | R2 - 5:2 |
| 5 | R2 - 1:0 | G2 - 5:0 |
| 6 | B2 - 5:0 | R3 - 5:4 |
| 7 | R3 - 3:0 | G3 - 5:2 |
| 8 | G3 - 1:0 | B3 - 5:0 |

In some embodiments, if the last pixel of the packet ends in the middle of a byte, the rest of the bits can be set to zero.

In some embodiments, standard 8 bits per color RGB can be implemented. Table 27 shows a 24-bit RGB stream format example.

TABLE 27

| Byte | Data |
|---|---|
| 0 | R0 - 7:0 |
| 1 | B0 - 7:0 |
| 2 | G0 - 7:0 |
| 3 | R1 - 7:0 |
| 4 | G1 - 7:0 |
| 5 | B1 - 7:0 |

Table 28 shows a 30-bit RGB stream format example.

TABLE 28

| Byte | Data |
|---|---|
| 0 | R0 - 9:2 |
| 1 | R0 - 1:0 | G0 - 9:4 |
| 2 | G0 - 3:0 | B0 - 9:6 |
| 3 | B0 - 5:0 | R1 - 9:8 |
| 4 | R1 - 7:0 |
| 5 | G1 - 9:2 |
| 6 | G1 - 1:0 | B1 - 9:4 |
| 7 | B1 - 3:0 | R2 - 9:6 |
| 8 | R2 - 5:0 | G2 - 9:8 |
| 9 | G2 - 7:0 |
| 10 | B2 - 9:2 |
| 11 | B2 - 1:0 | R3 - 9:4 |
| 12 | R3 - 3:0 | G3 - 9:6 |
| 13 | G3 - 5:0 | B3 - 9:8 |
| 14 | B3 - 7:0 |

In some embodiments, other implementations may be used. For example, some embodiments relate to one or more of 36 bits per pixel RGB, 8-bit per pixel YCbCr 4:2:0, 10-bit per pixel YCbCr 4:2:0, 12-bit per pixel YCbCr 4:2:0, 16-bit per pixel YCbCr 4:2:0, 8-bit per pixel YCbCr 4:2:2, 10-bit per pixel YCbCr 4:2:2, 12-bit per pixel YCbCr 4:2:2, 16-bit per pixel YCbCr 4:2:2, 8-bit per pixel YCbCr 4:4:4, 10-bit per pixel YCbCr 4:4:4, 12-bit per pixel YCbCr 4:4:4, 16-bit per pixel YCbCr 4:4:4, etc.

In some embodiments, Display Stream Compression (DSC) compressed pixel format may be used. For example, Table 29 shows an exemplary Display Stream Compression (DSC) compressed pixel format.

TABLE 29

| Byte | Data |
|---|---|
| 0 | Byte 0 |
| 1 | Byte 1 |
| 2 | Byte 2 |

Figure 21:
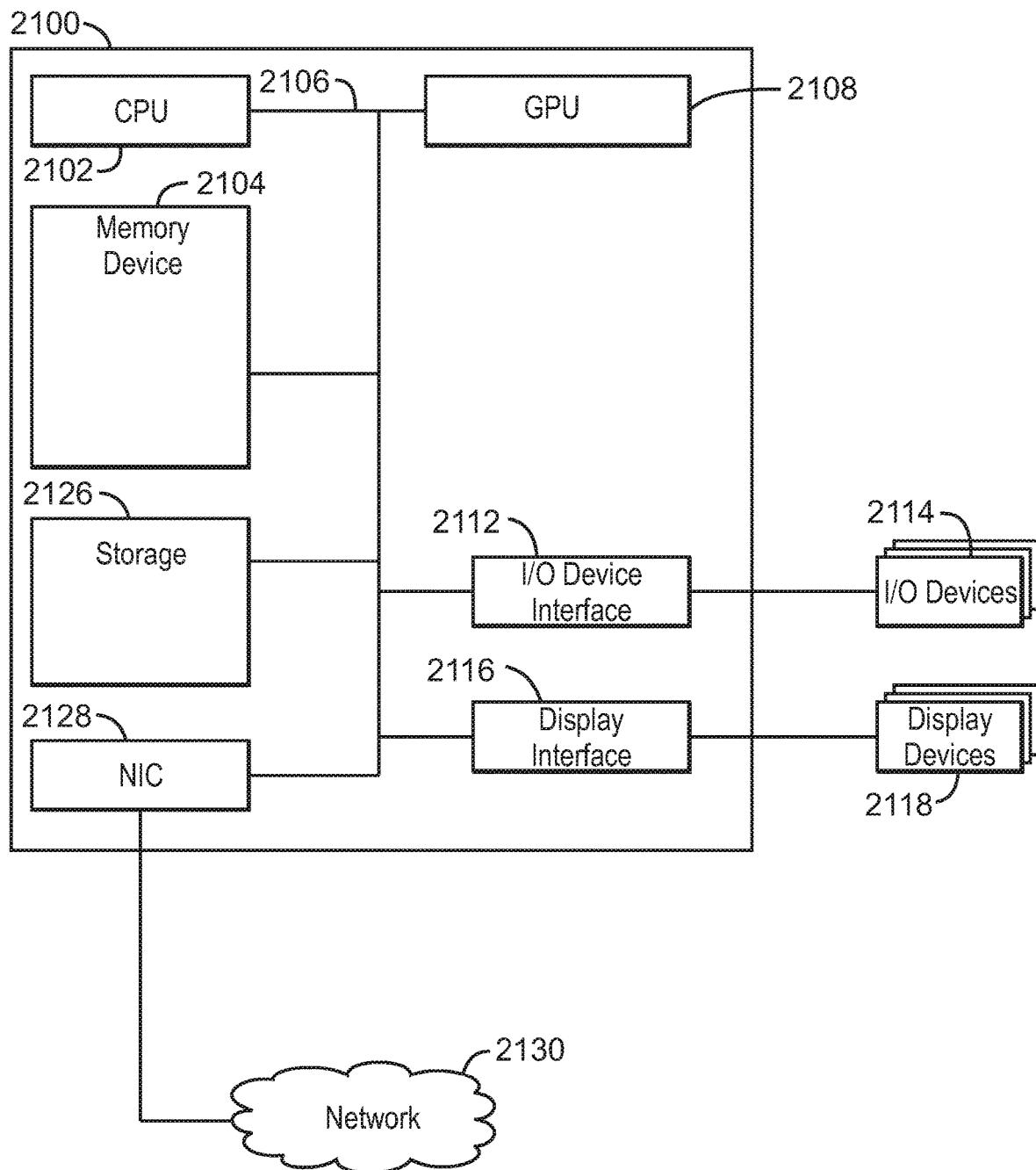
FIG. 21 illustrates a computing device.

FIG. 21 is a block diagram illustrating an example computing device 2100. In some embodiments, computing device 2100 (or portions of computing device 2100) can be a source (for example, a TAD source) as described or illustrated herein. In some embodiments, computing device 2100 (or portions of computing device 2100) can be a sink (for example, a TAD sink) as described or illustrated herein. In some embodiments, computing device 2100 can include any one or more of the layers and/or devices, etc. described herein. For example, in some embodiments, computing device 2100 can include any of the devices described or illustrated herein as being included in a source (such as a TAD source) and/or as being included in a sink (such as a TAD sink).

The computing device 2100 may be, for example, a laptop computer, desktop computer, or server, among others. The computing device 2100 may include a central processing unit (CPU) 2102 that is configured to execute stored instructions, as well as a memory device 2104 that stores instructions that are executable by the CPU 2102. The CPU 2102 and the memory device may be coupled to a bus 2106. The CPU 2102 and the memory device 2104 can be coupled together via the bus 2106. Additionally, the CPU 2102 can be a single core processor, a multi-core processor, a computing cluster, or any number of other configurations. Furthermore, the computing device 2100 may include more than one CPU 2102. The memory device 2104 can include random access memory (RAM), read only memory (ROM), flash memory, or any other suitable memory systems. For example, the memory device 2104 may include dynamic random access memory (DRAM).

The computing device 2100 may also include a graphics processing unit (GPU) 2108. As shown, the CPU 2102 may be coupled through the bus 2106 to the GPU 2108. The GPU 2108 may be configured to perform any number of graphics operations within the computing device 2100. For example, the GPU 2108 may be configured to render or manipulate graphics images, graphics frames, videos, or the like, to be displayed to a user of the computing device 2100.

The memory device 2104 can include random access memory (RAM), read only memory (ROM), flash memory, or any other suitable memory systems. For example, the memory device 2104 may include dynamic random access memory (DRAM).

The CPU 2102 may also be connected through the bus 2106 to an input/output (I/O) device interface 2112 configured to connect the computing device 2100 to one or more I/O devices 2114. The I/O devices 2114 may include, for example, a keyboard and a pointing device, wherein the pointing device may include a touchpad or a touchscreen, among others. The I/O devices 2114 may be built-in components of the computing device 2100, or may be devices that are externally connected to the computing device 2100. In some examples, the memory 2104 may be communicatively coupled to I/O devices 2114 through direct memory access (DMA).

The CPU 2102 may also be linked through the bus 2106 to a display interface 2116 configured to connect the computing device 2100 to a display device 2118. The display device 2118 may include a display screen that is a built-in component of the computing device 2100. The display device 2118 may also include a computer monitor, television, or projector, among others, that is internal to or externally connected to the computing device 2100.

The CPU 2102 may also include a device to perform any of the techniques described or illustrated herein. For example, CPU 2102 may perform any of the transport agnostic display techniques described herein. In some embodiments, CPU 2102 may be a source (for example, a TAD source) as described or illustrated herein. In some embodiments, CPU 2102 may be a sink (for example, a TAD sink) as described or illustrated herein.

The GPU 2108 may also include a device to perform any of the techniques described or illustrated herein. For example, GPU 2108 may perform any of the transport agnostic display techniques described herein. In some embodiments, GPU 2108 may be a source (for example, a TAD source) as described or illustrated herein. In some embodiments, GPU 2108 may be a sink (for example, a TAD sink) as described or illustrated herein.

The computing device also includes a storage device 2126. The storage device 2126 is a physical memory such as a hard drive, an optical drive, a thumbdrive, an array of drives, or any combinations thereof. The storage device 2126 may also include remote storage drives.

The computing device 2100 may also include a network interface controller (NIC) 2128. The NIC 2128 may be configured to connect the computing device 2100 through the bus 2106 to a network 2130. The network 2130 may be a wide area network (WAN), local area network (LAN), or the Internet, among others. In some examples, the device may communicate with other devices through a wireless technology. For example, Bluetooth® or similar technology may be used to connect with other devices.

In some embodiments, network 2130 may be any transport technology as described or illustrated herein. For example, in some embodiments, network 2130 can be a transport technology between a source (such as a TAD source) and a sink (such as a TAD sink).

Although transport topology as described herein is illustrated in FIG. 21 as transport topology 2130 being coupled via a NIC 2128, in some embodiments, when computing device 2100 is used as a source, the CPU 2102 could encode or target a raw bitstream (for example, using a frame buffer generated by the OS). This could be conveyed through NIC 2128 and/or through a device driver, or could be conveyed to a driver such as a driver such as a USB driver (for example, within the OS) and transmitted from the computing device (as a source). In some embodiments, it could be conveyed through the OS to the GPU 2108, and back to the OS for software routing to NIC 2128 or to a USB adapter, or any other transports (for example, Ethernet, PCI Express, or some other transport). In some embodiments, GPU 2108 could encode and directly transmit a compressed buffer to a transport controller (NIC 2128, USB controller, etc.) or through a direct hardware path from the GPU 2108.

On the sink side, when computing device 2100 is used as a source, it can receive an encoded and/or encrypted stream in the reverse direction as described above in reference to use of computing device 2100 as a source. For example, decoding can be implemented by the CPU 2102, GPU 2108, etc. and sent back to the GPU 2108, for example, for presentation on a local device (for example, on one or more display devices 2118).

The block diagram of FIG. 21 is not intended to indicate that the computing device 2100 is to include all of the components shown in FIG. 21. Rather, the computing system 2100 can include fewer or additional components not illustrated in FIG. 21, such as sensors, power management integrated circuits, additional network interfaces, additional peripheral devices, and the like. The computing device 2100 may include any number of additional components not shown in FIG. 21, depending on the details of the specific implementation.

Figure 22:
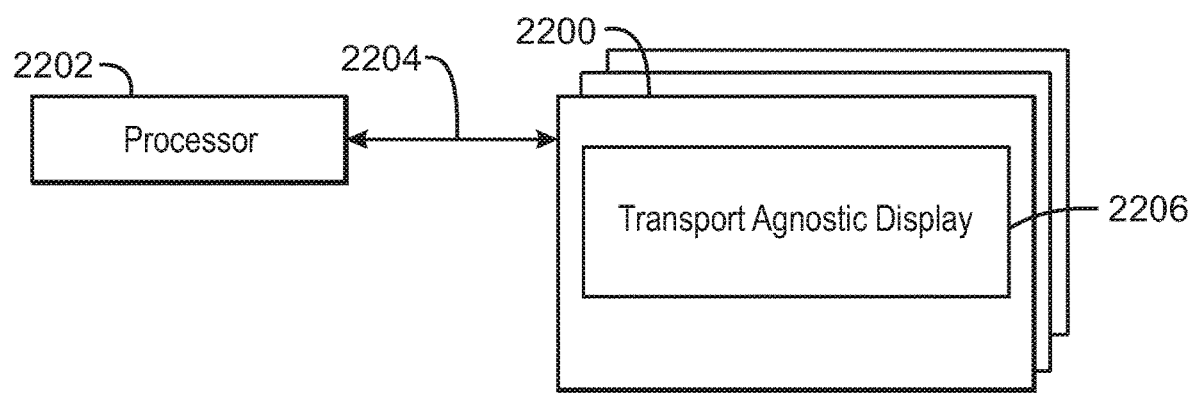
FIG. 22 illustrates one or more processor and one or more tangible, non-transitory, computer-readable media.

FIG. 22 is a block diagram showing one or more computer readable media 2200 that store code for transport agnostic display according to any of the techniques illustrated or described herein. The computer readable media 2200 may be accessed by one or more processor 2202 over one or more computer bus 2204. Furthermore, the computer readable medium 2200 may include code configured to direct the processor 2202 to perform the techniques described herein. For example, computer readable media 2200 may include a transport agnostic display module 2206 having instructions that when executed by processor 2202 can implement any of the techniques described herein. In some embodiments, the computer readable media 2200 may be non-transitory computer readable media. In some examples, the computer readable media 2200 may be storage media. However, in any case, the computer readable media do not include transitory media such as carrier waves, signals, and the like.

The block diagram of FIG. 22 is not intended to indicate that the computer readable media 2200 is to include all of the components shown in FIG. 22. Further, the computer readable media 2200 may include any number of additional components not shown in FIG. 22, depending on the details of the specific implementation.

The various software components discussed herein may be stored on one or more computer readable media 2200, as indicated in FIG. 22. For example, the transport agnostic display module 2206 may be executed by processor 2202 to perform any transport agnostic display techniques described herein. Module 2206 may include any instructions that can be used to perform any transport agnostic display techniques described herein. For example, transport agnostic display module 2206 may include, for example, code that may be executed to perform any techniques implemented by a source (such as a TAD source), and/or any techniques implemented by a sink (such as a TAD sink).

The block diagram of FIG. 22 is not intended to indicate that the computer readable media 2200 is to include all of the components shown in FIG. 22. Further, the computer readable media 2200 may include any number of additional components not shown in FIG. 22, depending on the details of the specific implementation.

Figure 23:
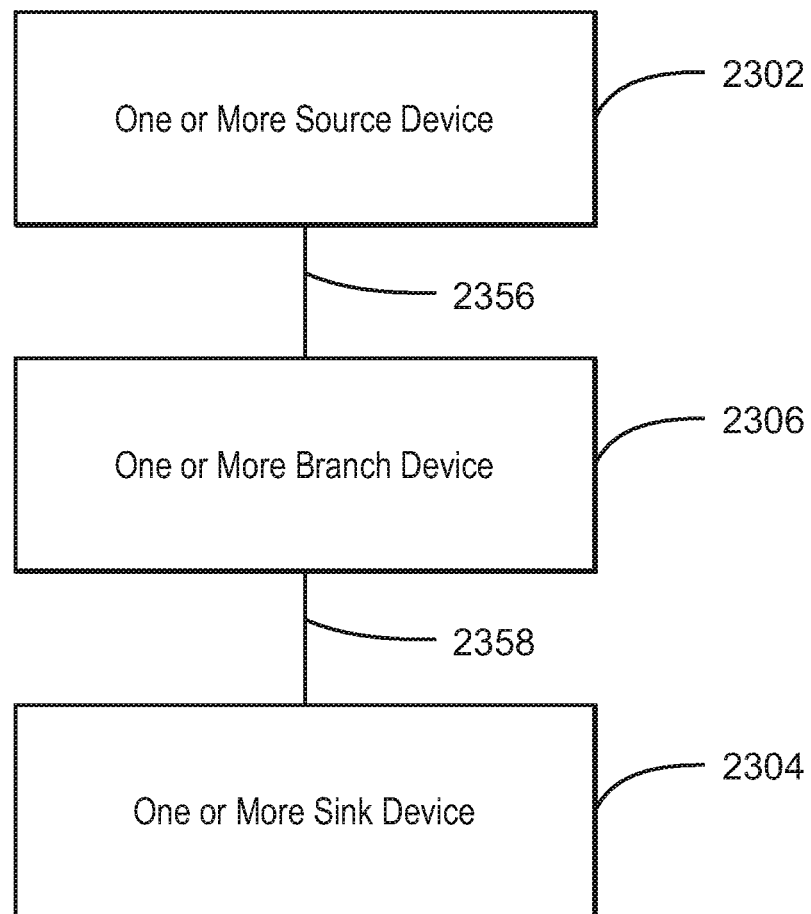
FIG. 23 illustrates a system.

FIG. 23 illustrates a system 2300 including one or more source 2302 and one or more sink 2304. System 2300 also includes one or more branch device 2306 (for example, a hub). In some embodiments, one or more source 2302 can be transport agnostic display (TAD) sources. In some embodiments, one or more sink 2304 can be transport agnostic display (TAD) sinks. In some embodiments, one or more branch 2306 can be transport agnostic display (TAD) branches. In some embodiments, elements in system 200 can be the same as or similar to any other similar devices described herein. For example, any of the source, branch, or sink devices in FIG. 23 can be a computing device such as computing device 2100.

In some embodiments, one or more source 2302 is, for example, one or more originator of one or more stream such as a video stream. In some embodiments, one or more sink 2304 is, for example, a destination of one or more stream such as a video stream. In some embodiments, one or more branch device 2306 can be one or more converter device translating from one protocol to another.

In some embodiments, the one or more branch devices 2306 can be one or more branch devices that receive and also forward streams (for example, with some similar aspects to any sources and/or sinks described herein). One or more source 2302 is coupled to one or more branch device 2306 via a transport topology 2356, and one or more branch device 2306 is coupled to one or more sink device 2304 via a transport topology 2358. Transport topology 2356 and/or transport topology 2358 can be similar to or the same as any other transport topology described or illustrated herein.

In some embodiments, sources and sinks can be coupled directly as described and illustrated elsewhere herein, or via intermediate devices such as a branch or hub device as illustrated in FIG. 23.

In some embodiments, various devices may be used as any of the sources, branches, or sinks illustrated and described herein. For example, sources may include a computing device, integrated or discrete devices, a graphics processing unit (GPU), adapters, GPU adapters, software implementations executed on a processor such as a GPU or a central processing unit (CPU), software implementations including encode being implemented on a processor such as a CPU (which could be streamed on a transport such as USB or wireless. Sink devices and branch devices may include, for example, a computing device, a notebook device, a personal computer (PC), devices with receivers (for example, wireless receivers), mobile devices, tablets, phones such as smart phones (for example, using a screen of the phone as a supplementary screen), set top boxes that drive television screens, smart TVs, computing devices such as PCs, smart phones, notebooks, tablets, etc. driving TVs, monitors, docking stations driven as a peripheral, internet devices such as adapters or docking stations with internet inputs, head mounted displays, automotive computing devices including in vehicle infotainment systems, operating systems, GPUs, converter devices, branch devices, hub devices, etc. The sinks described herein can be a final endpoint destination for a stream, but can also be an intermediate device such as a converter or hub forwarding the stream to another device. For example, in some embodiments, the sink can be a GPU receiving a stream, converting it, and/or providing it to another sink, etc.

In some embodiments, a docking station or converter device can have a receiving device for each of a number of transports (for example, USB controller, wireless receiver, etc.). Once a received stream packet is processed (for example, in firmware), it is decoded and/or decrypted to extract the frame buffer. Once the received frame has been extracted, it can be processed further within that device. For example, a scalar can be used for color enhancement, and/or other processing can be implemented. The stream can then be transcoded by the device to another downstream device (as in FIG. 23, for example). The stream can be sent over a legacy interface such as DisplayPort or HDMI, or over another TAD link. The intermediate device (converter device, hub, branch, etc.) can receive the stream on one interface (or topology) and send it out to a downstream device on another interface (or topology).

In some embodiments, a sink device can include a timing controller (TCON) that can drive pixels onto a screen at the destination.

In some embodiments, the sink device can be the final endpoint for displaying the stream. The sink can also be an intermediate device (or branch device) such as a hub or converter converting the stream to a different protocol (this can be implemented without any change in decode). In some embodiments, the sink device can be a GPU that provides the stream to another GPU that puts the stream on the display. In this scenario, the intermediate GPU can change anything that it wants to change, including the encoding formats.

In some embodiments, a wide variety of diverse transports can be implemented (for example, as the transport topologies described herein). Diverse transports used herein can include DisplayPort, HDMI, a wired isochronous high throughput transport, USB, wireless, Ethernet, PCI Express, wired, block compression, DSC, etc., as well as other transports.

It is noted that various numbering values are described herein (for example, in the tables). In general, a number labelled with a lowercase "b" may be a binary value number, a number labelled with an uppercase "B" may be a byte value, a number labelled by a lowercase "h" may be a hexadecimal value, and other numbers may be decimal values.

Reference in the specification to "one embodiment" or "an embodiment" or "some embodiments" of the disclosed subject matter means that a particular feature, structure, or characteristic described in connection with the embodiment is included in at least one embodiment of the disclosed subject matter. Thus, the phrase "in one embodiment" or "in some embodiments" may appear in various places throughout the specification, but the phrase may not necessarily refer to the same embodiment or embodiments.

Example 1

In some examples, a transport agnostic source includes a streaming device to stream content on diverse transport topologies including isochronous and non-isochronous transports.

Example 2

In some examples, the source of example 1, where the diverse transports include at least two of DisplayPort, HDMI, a wired isochronous high throughput transport, USB, wireless, Ethernet, PCI Express, wired, block compression, DSC, etc.

Example 3

In some examples, a transport agnostic sink includes a receiving device to received streamed content from diverse transport topologies including isochronous and non-isochronous transports.

Example 4

In some examples, the sink of example 3, where the diverse transports include at least two of DisplayPort, HDMI, a wired isochronous high throughput transport, USB, wireless, Ethernet, PCI Express, wired, block compression, DSC, etc.

Example 5

In some examples, a system includes a transport agnostic source including a streaming device to stream content on diverse transport topologies including isochronous and non-isochronous transports, and a receiving device to receive the streamed content from the diverse transport topologies.

Example 6

In some examples, one or more tangible, non-transitory machine readable media include a plurality of instructions that, in response to being executed on at least one processor, cause the at least one processor to stream content in a transport agnostic manner on diverse transport topologies including isochronous and non-isochronous transports.

Example 7

In some examples, one or more tangible, non-transitory machine readable media include a plurality of instructions that, in response to being executed on at least one processor, cause the at least one processor to receive streamed content in a transport agnostic manner from diverse transport topologies including isochronous and non-isochronous transports.

Example 8

In some examples, a method includes streaming content in a transport agnostic manner on diverse transport topologies including isochronous and non-isochronous transports.

Example 9

In some examples, a method includes receiving streamed content in a transport agnostic manner from diverse transport topologies including isochronous and non-isochronous transports.

Example 10

In some examples, a transport agnostic source includes a streaming device to stream video in a transport agnostic manner on diverse transport topologies including isochronous and non-isochronous transports.

Example 11

In some examples, the source of example 10, where the diverse transport topologies include two or more of DisplayPort, HDMI, a wired isochronous high throughput transport, USB, wireless, Ethernet, PCI Express, wired, block compression, and DSC.

Example 12

In some examples, the source of any of examples 10-11, the streaming device to convey a video stream from the source in a manner that is agnostic to encoding of the video.

Example 13

In some examples, the source of any of examples 10-12, the streaming device to convey the video stream in a packetized protocol that allows it to be carried as native traffic with display and non-display over a single transport.

Example 14

In some examples, the source of any of examples 10-13, where the source is one or more of a branch device, a hub, a converter, or a repeater.

Example 15

In some examples, the source of any of examples 10-14, the streaming device to stream video in a transport agnostic manner to two different devices each on a different transport type.

Example 16

In some examples, the source of any of examples 10-15, the streaming device to stream video in a transport agnostic manner to two different devices each on a same transport type.

Example 17

In some examples, the source of any of examples 10-16, the source to receive an upstream video stream on a first transport type and to stream a downstream video stream on a second transport type.

Example 18

In some examples, a transport agnostic sink includes a receiving device to receive streamed video in a transport agnostic manner from diverse transport topologies including isochronous and non-isochronous transports.

Example 19

In some examples, the sink of example 18, where the diverse transport topologies include two or more of DisplayPort, HDMI, a wired isochronous high throughput transport, USB, wireless, Ethernet, PCI Express, wired, block compression, and DSC.

Example 20

In some examples, the sink of any of examples 18-19, the receiving device to receive a video stream from the source in a manner that is agnostic to encoding of the video.

Example 21

In some examples, the sink of any of examples 18-20, the receiving device to receive the video stream in a packetized protocol that allows it to be carried as native traffic with display and non-display over a single transport.

Example 22

In some examples, the sink of any of examples 18-21, where the sink is one or more of a branch device, a hub, a converter, or a repeater.

Example 23

In some examples, the sink of any of examples 18-22, the sink to receive an upstream video stream on a first transport type and to stream a downstream video stream on a second transport type.

Example 24

In some examples, a system includes a transport agnostic source and a transport agnostic sink. The transport agnostic sink includes a streaming device to stream video in a transport agnostic manner on diverse transport topologies including isochronous and non-isochronous transports. The transport agnostic sink includes a receiving device to receive the streamed video in a transport agnostic manner from diverse transport topologies including isochronous and non-isochronous transports.

Example 25

In some examples, the system of example 24, including a branch device to receive the streamed video from the source in a transport agnostic manner from diverse transport topologies including isochronous and non-isochronous transports, and to stream video to the sink in a transport agnostic manner on diverse transport topologies including isochronous and non-isochronous transports.

Example 26

In some examples, the system of any of examples 24-25, where the branch device includes a hub, a converter, or a repeater.

Example 27

In some examples, the system of any of examples 24-26, including a second transport agnostic sink including a receiving device to receive the streamed video in a transport agnostic manner from diverse transport topologies including isochronous and non-isochronous transports.

Example 28

In some examples, the system of any of examples 24-27, where the sink and the second sink each receive the streamed video on a different transport type.

Example 29

In some examples, the system of any of examples 24-28, where the sink and the second sink each receive the streamed video on a same transport type.

Example 30

In some examples, the system of any of examples 24-29, where the diverse transport topologies include two or more of DisplayPort, HDMI, a wired isochronous high throughput transport, USB, wireless, Ethernet, PCI Express, wired, block compression, and DSC.

Example 31

In some examples, the system of any of examples 24-30, the sink to receive a video stream from the source in a manner that is agnostic to encoding of the video.

Example 32

In some examples, the system of any of examples 24-31, the source to send the video stream and the sink to receive the video stream in a packetized protocol that allows it to be carried as native traffic with display and non-display over a single transport.

Example 33

In some examples, the system of any of examples 24-32, where the sink is one or more of a branch device, a hub, a converter, or a repeater.

Example 34

In some examples, the system of any of examples 24-33, including a branch device to receive an upstream video stream from the source on a first transport type and to stream a downstream video stream to the sink on a second transport type.

Example 35

In some examples, one or more tangible, non-transitory machine readable media includes a plurality of instructions that, in response to being executed on at least one processor, cause the at least one processor to stream video in a transport agnostic manner on diverse transport topologies including isochronous and non-isochronous transports.

Example 36

In some examples, the one or more tangible, non-transitory machine readable media of example 35, where the diverse transport topologies include two or more of DisplayPort, HDMI, a wired isochronous high throughput transport, USB, wireless, Ethernet, PCI Express, wired, block compression, and DSC.

Example 37

In some examples, the one or more tangible, non-transitory machine readable media of any of examples 35-36, including a plurality of instructions that, in response to being executed on at least one processor, cause the at least one processor to convey a video stream from the source in a manner that is agnostic to encoding of the video.

Example 38

In some examples, the one or more tangible, non-transitory machine readable media of any of examples 35-37, including a plurality of instructions that, in response to being executed on at least one processor, cause the at least one processor to convey the video stream in a packetized protocol that allows it to be carried as native traffic with display and non-display over a single transport.

Example 39

In some examples, the one or more tangible, non-transitory machine readable media of any of examples 35-38, where the source is one or more of a branch device, a hub, a converter, or a repeater.

Example 40

In some examples, the one or more tangible, non-transitory machine readable media of any of examples 35-39, including a plurality of instructions that, in response to being executed on at least one processor, cause the at least one processor to stream video in a transport agnostic manner to two different devices each on a different transport type.

Example 41

In some examples, the one or more tangible, non-transitory machine readable media of any of examples 35-40, including a plurality of instructions that, in response to being executed on at least one processor, cause the at least one processor to stream video in a transport agnostic manner to two different devices each on a same transport type.

Example 42

In some examples, the one or more tangible, non-transitory machine readable media of any of examples 35-41, including a plurality of instructions that, in response to being executed on at least one processor, cause the at least one processor to receive an upstream video stream on a first transport type and to stream a downstream video stream on a second transport type.

Example 43

In some examples, one or more tangible, non-transitory machine readable media comprising a plurality of instructions that, in response to being executed on at least one processor, cause the at least one processor to receive streamed video in a transport agnostic manner from diverse transport topologies including isochronous and non-isochronous transports.

Example 44

In some examples, the one or more tangible, non-transitory machine readable media of example 43, where the diverse transport topologies include two or more of DisplayPort, HDMI, a wired isochronous high throughput transport, USB, wireless, Ethernet, PCI Express, wired, block compression, and DSC.

Example 45

In some examples, the one or more tangible, non-transitory machine readable media of any of examples 43-44, including a plurality of instructions that, in response to being executed on at least one processor, cause the at least one processor to receive a video stream from the source in a manner that is agnostic to encoding of the video.

Example 46

In some examples, the one or more tangible, non-transitory machine readable media of any of examples 43-45, including a plurality of instructions that, in response to being executed on at least one processor, cause the at least one processor to receive the video stream in a packetized protocol that allows it to be carried as native traffic with display and non-display over a single transport.

Example 47

In some examples, the one or more tangible, non-transitory machine readable media of any of examples 43-46, where the sink is one or more of a branch device, a hub, a converter, or a repeater.

Example 48

In some examples, the one or more tangible, non-transitory machine readable media of any of examples 43-47, including a plurality of instructions that, in response to being executed on at least one processor, cause the at least one processor to receive an upstream video stream on a first transport type and to stream a downstream video stream on a second transport type.

Example 49

In some examples, a method including streaming video in a transport agnostic manner on diverse transport topologies including isochronous and non-isochronous transports.

Example 50

In some examples, the method of example 49, where the diverse transport topologies include two or more of DisplayPort, HDMI, a wired isochronous high throughput transport, USB, wireless, Ethernet, PCI Express, wired, block compression, and DSC.

Example 51

In some examples, the method of any of examples 49-50, including conveying a video stream in a manner that is agnostic to encoding of the video.

Example 52

In some examples, the method of any of examples 49-51, including conveying a video stream in a packetized protocol that allows it to be carried as native traffic with display and non-display over a single transport.

Example 53

In some examples, the method of any of examples 49-52, where the video stream is conveyed by one or more of a source, a branch device, a hub, a converter, or a repeater.

Example 54

In some examples, the method of any of examples 49-53, including streaming video in a transport agnostic manner to two different devices each on a different transport type.

Example 55

In some examples, the method of any of examples 49-54, including streaming video in a transport agnostic manner to two different devices each on a same transport type.

Example 56

In some examples, the method of any of examples 49-55, including receiving an upstream video stream on a first transport type and streaming a downstream video stream on a second transport type.

Example 57

In some examples, a method includes receiving streamed video in a transport agnostic manner from diverse transport topologies including isochronous and non-isochronous transports.

Example 58

In some examples, the method of example 57, where the diverse transport topologies include two or more of DisplayPort, HDMI, a wired isochronous high throughput transport, USB, wireless, Ethernet, PCI Express, wired, block compression, and DSC.

Example 59

In some examples, the method of any of examples 57-58, including receiving a video stream in a manner that is agnostic to encoding of the video.

Example 60

In some examples, the method of any of examples 57-59, including receiving the video stream in a packetized protocol that allows it to be carried as native traffic with display and non-display over a single transport.

Example 61

In some examples, the method of any of examples 57-60, where the receiving is implemented in one or more of a source, a sink, a branch device, a hub, a converter, or a repeater.

Example 62

In some examples, the method of any of examples 57-61, including receiving an upstream video stream on a first transport type and streaming a downstream video stream on a second transport type.

Example 63

A system configured to perform operations of any one or more other example (for example, any one or more of examples 1-62).

Example 64

A method for performing operations of any one or more other example (for example, any one or more of examples 1-62).

Example 65

At least one machine readable storage medium including instructions that, when executed by a machine, cause the machine to perform the operations of any one or more other example (for example, any one or more of examples 1-62).

Example 66

A system comprising means for performing the operations of any one or more other example (for example, any one or more of examples 1-62).

Example 67

An apparatus including means to perform a method as in any other example (for example, any one or more of examples 1-62).

Example 68

Machine-readable storage including machine-readable instructions, when executed, to implement a method or realize and apparatus as in any other example (for example, any one or more of examples 1-62).

Example 69

Any other example, where the source and/or the sink is/are to address and route control and data packets (for example, for transport agnostic video streaming).

Example 70

Any other example, where the source and/or the sink is/are to discover, control, and configure to support diverse transports (for example, to support diverse transports for video streaming).

Although example embodiments of the disclosed subject matter are described with reference to circuit diagrams, flow diagrams, block diagrams etc. in the drawings, persons of ordinary skill in the art will readily appreciate that many other ways of implementing the disclosed subject matter may alternatively be used. For example, the arrangements of the elements in the diagrams, and/or the order of execution of the blocks in the diagrams may be changed, and/or some of the circuit elements in circuit diagrams, and blocks in block/flow diagrams described may be changed, eliminated, or combined. Any elements as illustrated and/or described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, one or more volatile and/or non-volatile memory devices, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine-readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter. For example, in each illustrated embodiment and each described embodiment, it is to be understood that the diagrams of the figures and the description herein is not intended to indicate that the illustrated or described devices include all of the components shown in a particular figure or described in reference to a particular figure. In addition, each element may be implemented with logic, wherein the logic, as referred to herein, can include any suitable hardware (e.g., a processor, among others), software (e.g., an application, among others), firmware, or any suitable combination of hardware, software, and firmware, for example.

What is claimed is:

1. A storage device or storage disk comprising machine-readable instructions that, when executed, cause one or more processors of a streaming device to at least:

determine an encoding format to be used to encode video, the encoding format based at least on capabilities of a transport agnostic display sink to which the video is to be conveyed and an extent to which bandwidth of a transport layer can change;

stream the video in a transport agnostic manner using a protocol able to be hosted on any transport for which a transport-specific adaptation has been defined, and able to use diverse transport topologies including isochronous and non-isochronous transports; and convey the video in a manner that is agnostic to encoding of the video.

2. The storage device or storage disk of claim 1, wherein the instructions are to cause the one or more processors to stream the video using at least one of DisplayPort, High Definition Multimedia Interface (HDMI), a wired isochronous high throughput transport, Universal Serial Bus (USB), wireless, Ethernet, Peripheral Component Interface (PCI) Express, wired, block compression, and Display Stream Compression (DSC).

3. The storage device or storage disk of claim 1, wherein the instructions are to cause the one or more processors to dynamically change the encoding format.

4. The storage device or storage disk of claim 1, wherein the instructions are to cause the one or more processors to convey the video in a packetized protocol, the packetized protocol to facilitate the video to be carried as native traffic with display and non-display over a single transport.

5. The storage device or storage disk of claim 1, wherein the instructions are to cause the one or more processors to stream the video from one or more of a branch device, a hub, a converter, or a repeater.

6. The storage device or storage disk of claim 1, wherein the instructions are to cause the one or more processors to stream the video in the transport agnostic manner to a first device using a first transport type and to a second device using a second transport type.

7. The storage device or storage disk of claim 1, wherein the instructions are to cause the one or more processors to stream the video in the transport agnostic manner to two different devices using a same transport type.

8. The storage device or storage disk of claim 1, wherein the instructions are to cause the one or more processors to receive an upstream video on a first transport type and stream a downstream video on a second transport type.

9. The storage device or storage disk of claim 1, wherein the instructions are to cause the one or more processors to address and route control and data packets.

10. The storage device or storage disk of claim 1, wherein the instructions are to cause the one or more processors to discover, control, and configure to support diverse transports.

11. The storage device or storage disk of claim 1, wherein the instructions are to cause the one or more processors to stream the video in the transport agnostic manner using the protocol by using at least one of a streaming layer, a transport agnostic display layer, a transport-specific adaptation layer, or a transport layer.

12. The storage device or storage disk of claim 1, wherein the instructions are to cause the one or more processors to stream the video in the transport agnostic manner using at least one of:
  (a) a streaming layer to originate, manage, and terminate the video using constructs made available by a transport agnostic display layer, and determine the encoding format used for the video;
  (b) the transport agnostic display layer to receive the video from the streaming layer and convey the video in the transport agnostic manner;
  (c) a transport-specific adaptation layer to adapt a transport-independent stream from the transport agnostic display layer to transport-specific constructs exposed by a transport layer; or
  (d) the transport layer to manage transport topology, link bandwidth, and a physical bus.

13. A storage device or storage disk comprising machine-readable instructions that, when executed, cause one or more processors of a receiving device to at least:
  receive video in a transport agnostic manner using a protocol able to be hosted on any transport for which a transport-specific adaptation has been defined, and able to convey the video from diverse transport topologies including isochronous and non-isochronous transports; and
  receive the video in a manner that is agnostic to encoding of the video, an encoding format of the video based at least on capabilities of a transport agnostic display sink that includes the receiving device and an extent to which bandwidth of a transport layer can change.

14. The storage device or storage disk of claim 13, wherein the instructions are to cause the one or more processors to receive the video when the encoding format is dynamically changed.

15. The storage device or storage disk of claim 13, wherein the instructions are to cause the one or more processors to receive the video in a packetized protocol that allows it to be carried as native traffic with display and non-display over a single transport.

16. The storage device or storage disk of claim 13, wherein the instructions are to cause the one or more processors to receive the video in one or more of a branch device, a hub, a converter, or a repeater.

17. The storage device or storage disk of claim 13, wherein the instructions are to cause the one or more processors to receive an upstream video stream on a first transport type and to stream a downstream video stream on a second transport type.

18. The storage device or storage disk of claim 13, wherein the instructions are to cause the one or more processors to address and route control and data packets.

19. The storage device or storage disk of claim 13, wherein the instructions are to cause the one or more processors to discover, control, and configure to support diverse transports.

20. At least one storage device or storage disk comprising machine-readable instructions that, when executed, cause at least:
  one or more first processors of a streaming device to at least:
    determine an encoding format to be used to encode video, the encoding format determined based at least on capabilities of a transport agnostic display sink to which the video is to be conveyed and an extent to which bandwidth of a transport layer can change;
    stream the video in a transport agnostic manner using a protocol able to be hosted on any transport for which a transport-specific adaptation has been defined, and able to convey the video using diverse transport topologies including isochronous and non-isochronous transports; and
    convey the video in a manner that is agnostic to encoding of the video; and
  one or more second processors of a receiving device to at least:
    receive the video in the transport agnostic manner using the protocol; and
    receive the video in the manner that is agnostic to the encoding of the video.

21. The at least one storage device or storage disk of claim 20, wherein the instructions are to cause one or more third processors of a branch device to receive the video in the transport agnostic manner from the diverse transport topologies including the isochronous and non-isochronous transports and to stream the video to the receiving device in the transport agnostic manner on the diverse transport topologies including the isochronous and non-isochronous transports.

22. The at least one storage device or storage disk of claim 21, wherein the instructions are to cause the one or more third processors of the branch device to receive the video in at least one of a hub, a converter, or a repeater.

23. The at least one storage device or storage disk of claim 20, wherein the receiving device is a first receiving device, the instructions are to cause one or more third processors of a second receiving device to receive the video in the transport agnostic manner from the diverse transport topologies including the isochronous and non-isochronous transports.

24. The at least one storage device or storage disk of claim 23, wherein the instructions are to cause the one or more second processors of the first receiving device to receive the video on a first transport type and the one or more third processors of the second receiving device to receive the video on a second transport type.

25. The at least one storage device or storage disk of claim 24, wherein the instructions are to cause the one or more second processors of the first receiving device and the one or more third processors of the second receiving device to receive the video on a same transport type.

26. The at least one storage device or storage disk of claim 20, wherein the instructions are to cause one or more third processors of a branch device to receive an upstream video stream from the streaming device on a first transport type and to stream a downstream video stream to the receiving device on a second transport type.

27. The at least one storage device or storage disk of claim 20, wherein the instructions are to cause at least one of (a) the one or more first processors of the streaming device or (b) the one or more second processors of the receiving device to address and route control and data packets.

28. The at least one storage device or storage disk of claim 20, wherein the instructions are to cause at least one of (a) the one or more first processors of the streaming device or (b) the one or more second processors of the receiving device to discover, control, and configure to support diverse transports.

29. The at least one storage device or storage disk of claim 20, wherein the instructions are to cause the one or more first processors of the streaming device to dynamically change the encoding format.

30. An apparatus comprising:

at least one memory;

instructions in the apparatus; and processor circuitry to execute the instructions to:

determine an encoding format to be used to encode video, the encoding format based at least on capabilities of a transport agnostic display sink to which the video is to be conveyed and an extent to which bandwidth of a transport layer can change;

stream the video in a transport agnostic manner using a protocol able to be hosted on any transport for which a transport-specific adaptation has been defined, and able to use diverse transport topologies including isochronous and non-isochronous transports; and convey the video in a manner that is agnostic to encoding of the video.

31. The apparatus of claim 30, wherein the processor circuitry is to execute the instructions to stream the video in the transport agnostic manner to a first device using a first transport type and to a second device using a second transport type.

32. The apparatus of claim 30, wherein the processor circuitry is to execute the instructions to stream the video in the transport agnostic manner to two different devices using a same transport type.

33. An apparatus comprising:

at least one memory;

instructions in the apparatus; and processor circuitry to execute the instructions to:

receive video in a transport agnostic manner using a protocol able to be hosted on any transport for which a transport-specific adaptation has been defined, and able to convey the video from diverse transport topologies including isochronous and non-isochronous transports; and receive the video in a manner that is agnostic to encoding of the video, an encoding format of the video based at least on capabilities of a transport agnostic display sink that includes a receiving device and an extent to which bandwidth of a transport layer can change.

34. The apparatus of claim 33, wherein the processor circuitry is to execute the instructions to receive the video when the encoding format is dynamically changed.

35. The apparatus of claim 33, wherein the processor circuitry is to execute the instructions to receive the video in a packetized protocol that allows it to be carried as native traffic with display and non-display over a single transport.

\* \* \* \* \*